United States Patent
Pan et al.

(10) Patent No.: US 11,871,465 B2
(45) Date of Patent: Jan. 9, 2024

(54) METHOD AND APPARATUS FOR ESTABLISHING SIDELINK RADIO BEARER FOR UE-TO-UE RELAY COMMUNICATION IN A WIRELESS COMMUNICATION SYSTEM

(71) Applicant: ASUSTek Computer Inc., Taipei (TW)

(72) Inventors: Li-Te Pan, Taipei (TW); Li-Chih Tseng, Taipei (TW); Richard Lee-Chee Kuo, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 17/357,404

(22) Filed: Jun. 24, 2021

(65) Prior Publication Data

US 2022/0007445 A1 Jan. 6, 2022

Related U.S. Application Data

(60) Provisional application No. 63/173,061, filed on Apr. 9, 2021, provisional application No. 63/057,138, filed on Jul. 27, 2020, provisional application No. 63/046,901, filed on Jul. 1, 2020.

(51) Int. Cl.
*H04W 76/15* (2018.01)
*H04L 69/22* (2022.01)
*H04W 40/22* (2009.01)

(52) U.S. Cl.
CPC ............. *H04W 76/15* (2018.02); *H04L 69/22* (2013.01); *H04W 40/22* (2013.01)

(58) Field of Classification Search
CPC ........ H04W 76/15; H04W 40/22; H04L 69/22
See application file for complete search history.

(56) References Cited

U.S. PATENT DOCUMENTS

| | | | |
|---|---|---|---|
| 2018/0192457 A1 | 7/2018 | Yi et al. | |
| 2021/0289571 A1* | 9/2021 | Akl | H04W 72/566 |
| 2022/0295375 A1* | 9/2022 | Wang | H04W 40/22 |
| 2022/0377822 A1* | 11/2022 | Wang | H04W 76/20 |

FOREIGN PATENT DOCUMENTS

| | | |
|---|---|---|
| CN | 106162512 A | 11/2016 |
| CN | 108029148 A | 5/2018 |
| CN | 108307472 A | 7/2018 |

(Continued)

OTHER PUBLICATIONS

Notice of Office Action from Korean Intellectual Property Office in corresponding KR Application No. 10-2021-0082306, dated Jul. 19, 2022.

(Continued)

*Primary Examiner* — Saad A. Waqas
(74) *Attorney, Agent, or Firm* — Skaar Ulbrich Macari, P.A.

(57) ABSTRACT

A method and device are disclosed from the perspective of a first remote User Equipment (UE). In one embodiment, the method includes the first remote UE establishing a first Sidelink (SL) Data Radio Bearer (DRB) for transmission to a second remote UE via a relay UE, wherein the first SL DRB is identified by a Radio Bearer (RB) Identity (ID). The method further includes the first remote UE ciphering a sidelink packet to be sent to the second remote UE on the first SL DRB based on at least the RB ID.

9 Claims, 28 Drawing Sheets

(56) References Cited

FOREIGN PATENT DOCUMENTS

| CN | 110661772 | A | | 1/2020 | |
|---|---|---|---|---|---|
| CN | 110679190 | A | | 1/2020 | |
| CN | 110771257 | A | | 2/2020 | |
| CN | 111901847 | | | 11/2020 | |
| CN | 111901847 | A | * | 11/2020 | ............ H04W 40/22 |
| WO | 2017022958 | A1 | | 2/2017 | |
| WO | 2017166138 | A1 | | 10/2017 | |

OTHER PUBLICATIONS

3rd Generation Partnership Project; Technical Specification Group Services and System Aspects; Study on system enhancement for Proximity based Services (ProSe) in the 5G System (5GS) (Release 17); 3GPP TR 23.752 V1.4.0 (Jun. 2020); 650 Route des Lucioles-Sophia Antipolis, Valbonne-France; Internet: http://www.3gpp.org.

3rd Generation Partnership Project; Technical Specification Group Radio Access Network; NR; Radio Resource Control (RRC) Protocol Specification (Release 16); 3GPP TS 38.331 V16.0.0 (Mar. 2020); 650 Route des Lucioles-Sophia Antipolis, Valbonne-France; Internet: http://www.3gpp.org. pp. 1-836, Only pp. 1-21 included.

3rd Generation Partnership Project; Technical Specification Group Radio Access Network; NR; NR and NG-RAN Overall Description; Stage 2 (Release 16); 3GPP TS 38.300 V16.1.0 (Mar. 2020); 650 Route des Lucioles-Sophia Antipolis, Valbonne-France; Internet: http://www.3gpp.org. pp. 1-129.

Huawei, HiSilicon "On potential RAN2 impacts related to security design for NR SL", Discussion and Decision; Agenda Item: 6.4.5; 3GPP TSG-RAN WG2 Meeting #108, Reno, USA, Nov. 18-22, 2019; R2-1915975.

Huawei, HiSilicon "Outer header for Uu adaptation layer", Discussion and Decision; Agenda Item: 9.1.2.1; 3GPP TSG-RAN WG2 #97, Athens, Greece, Feb. 13-17, 2017; R2-1701134.

"38300_CR0153r8_(Rel-16)_R2-2002407"; 3GPP tsg_ran\tsg_ran; Feb. 24-Mar. 6, 2020; 17 pages.

"Draft_r2-200xxx_38331_rel-16_cr1528_rev1_misc_corrections_nru_v2"; 3GPP tsg_ran\wg2_r12; Apr. 20-30, 2020; 90 pages.

Office Action to the corresponding Chinese Patent Application rendered by the State Intellectual Property Office (SIPO) dated Aug. 1, 2023, 19 pages.

* cited by examiner

METHOD AND APPARATUS FOR ESTABLISHING SIDELINK RADIO BEARER FOR UE-TO-UE RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/046,901 filed on Jul. 1, 2020, U.S. Provisional Patent Application Ser. No. 63/057,138 filed on Jul. 27, 2020, and U.S. Provisional Patent Application Ser. No. 63/173,061 filed on Apr. 9, 2021, the entire disclosures of which are incorporated herein in their entirety by reference.

FIELD

This disclosure generally relates to wireless communication networks, and more particularly, to a method and apparatus for establishing sidelink radio bearer for User Equipment-to-User Equipment (UE-to-UE) Relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first remote User Equipment (UE). In one embodiment, the method includes the first remote UE establishing a first Sidelink (SL) Data Radio Bearer (DRB) for transmission to a second remote UE via a relay UE, wherein the first SL DRB is identified by a Radio Bearer (RB) Identity (ID). The method further includes the first remote UE ciphering a sidelink packet to be sent to the second remote UE on the first SL DRB based on at least the RB ID.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.287 V16.4.0, "Architecture enhancements for 5G System (5GS) to support Vehicle-to-Everything (V2X) services (Release 16)"; C1-202875, "PC5 unicast link security establishment", Qualcomm Incorporated; TS 24.587 V16.0.0, "Vehicle-to-Everything (V2X) services in 5G System (5GS); Stage 3 (Release 16)"; TS 38.331 V16.4.1, "NR; Radio Resource Control (RRC) protocol specification (Release 16)"; TS 38.300 V16.1.0, "Radio Resource Control (RRC) protocol specification; Stage 2 (Release 16)"; TR 23.752 V2.0.0, "Study on system enhancement for Proximity based services (ProSe) in the 5G System (5GS) (Release 17)"; TS 38.323 V16.2.0, "Packet Data Convergence Protocol (PDCP) specification (Release 16)"; and TR 38.836 V17.0.0, "Study on NR sidelink relay; (Release 17)". The standards and documents listed above are hereby expressly incorporated by reference in their entirety.

Figure 1:
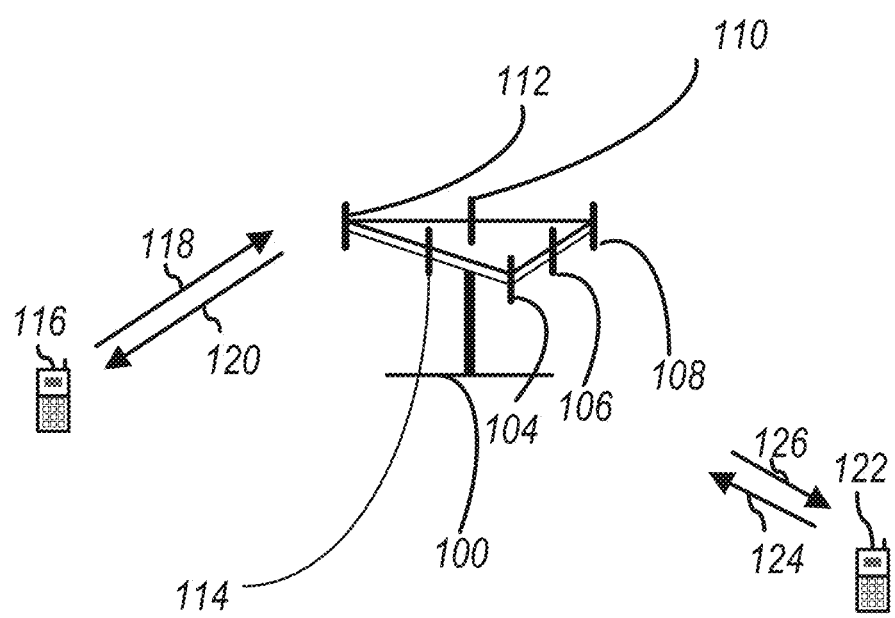
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
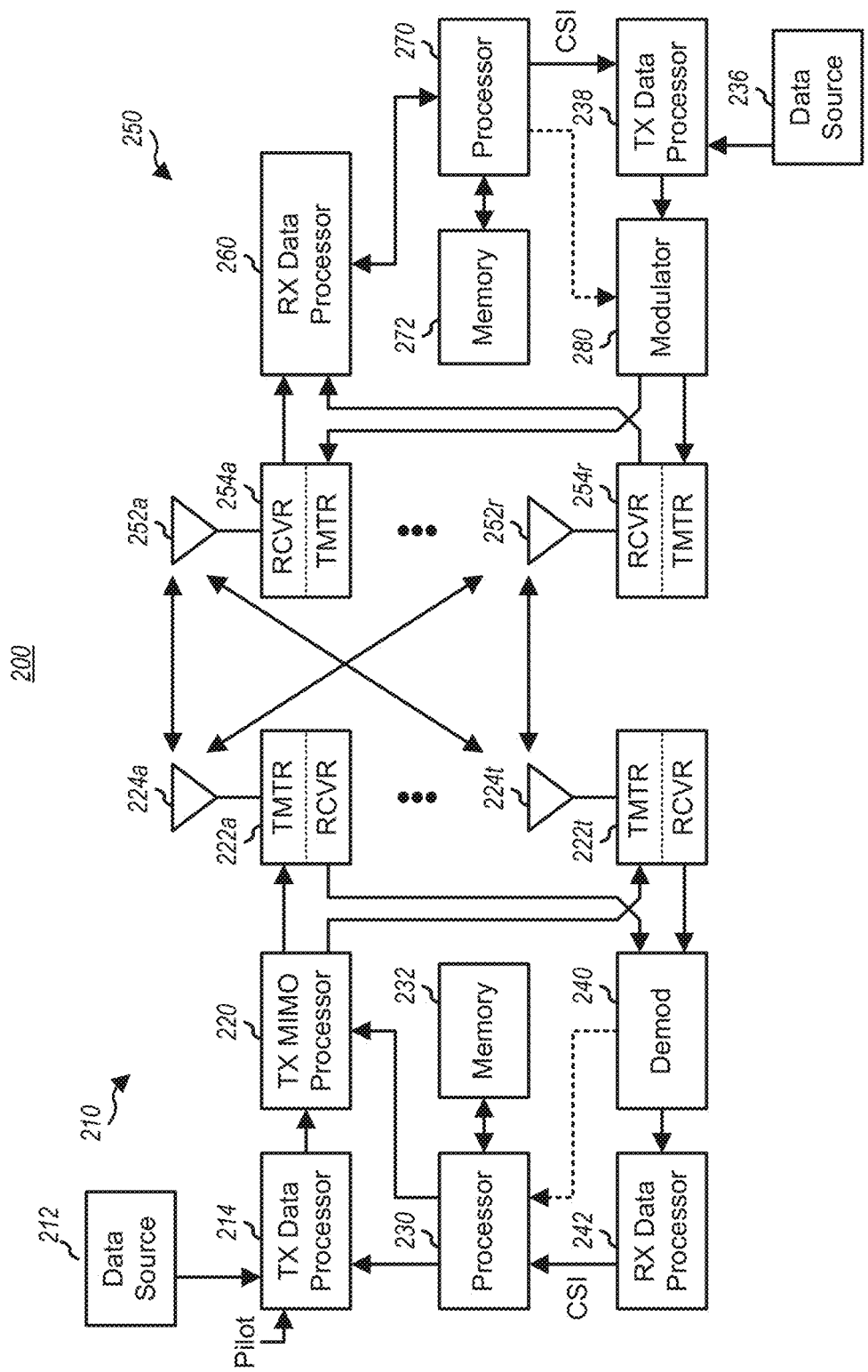
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
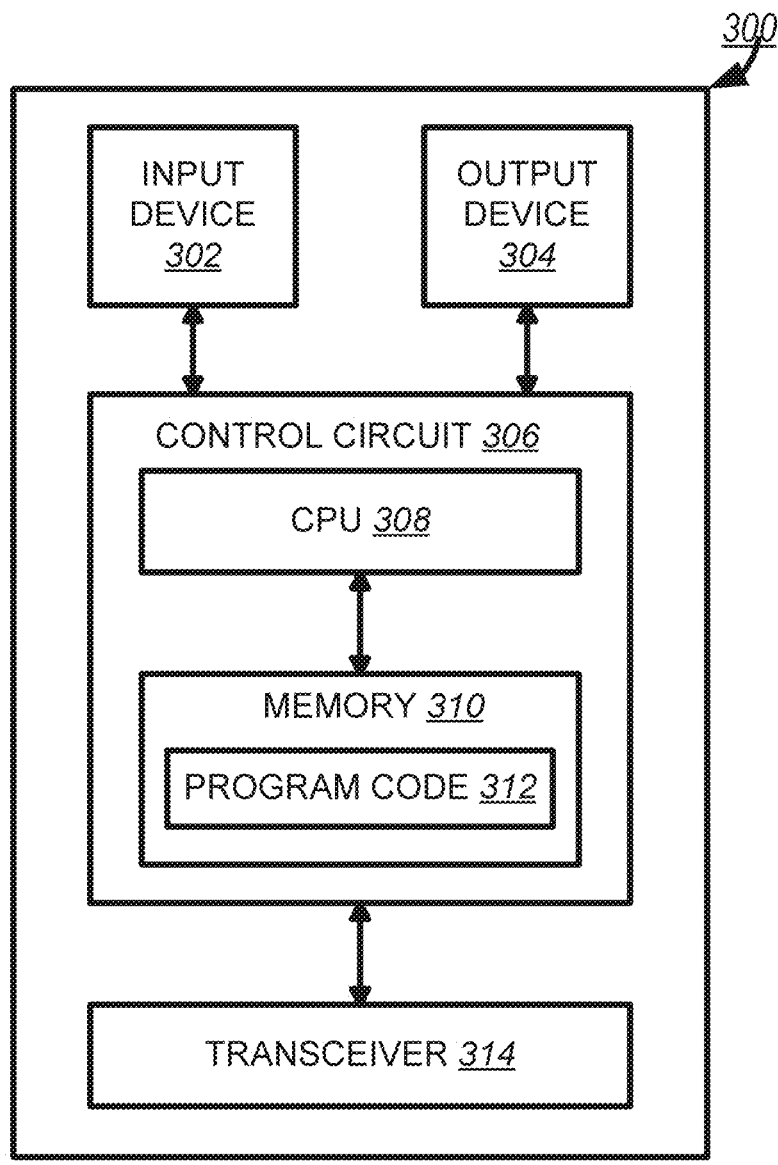
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
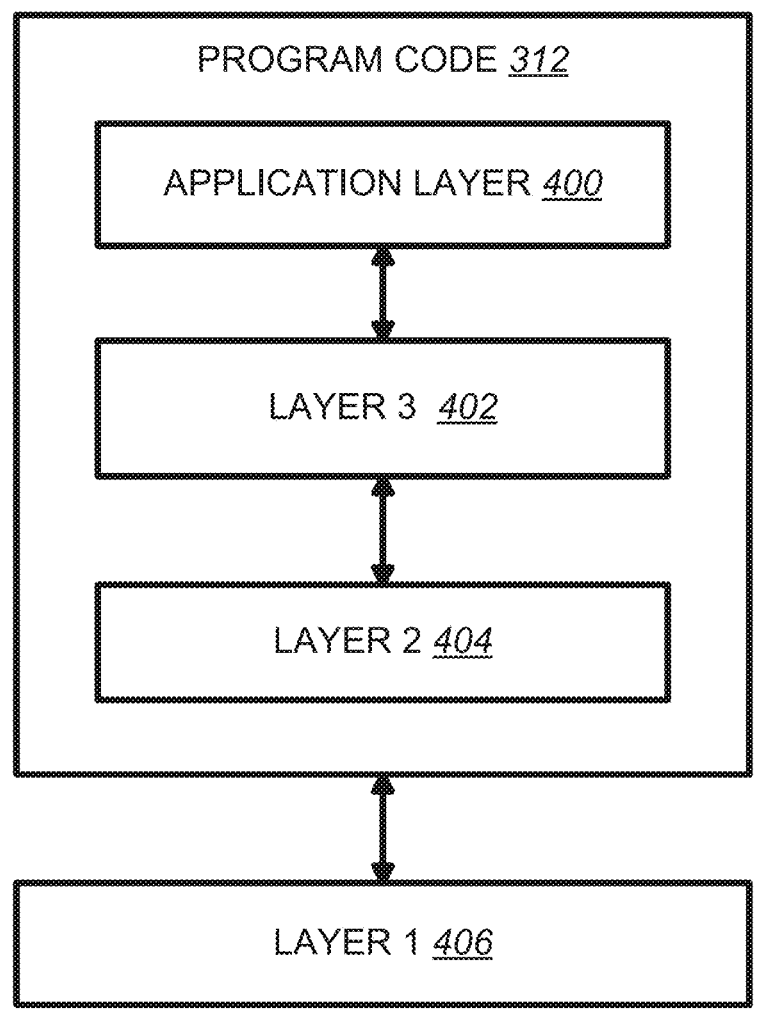
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP C1-202875 introduced security establishment procedure for PC5 unicast communication as follows:

6.1.2.6 PC5 Unicast Link Authentication Procedure 6.1.2.6.1 General

The PC5 unicast link authentication procedure is used to perform mutual authentication of UEs establishing a PC5 unicast link and to derive a new $K_{NRP}$ shared between two UEs during a PC5 unicast link establishment procedure or a PC5 unicast link re-keying procedure. After successful completion of the PC5 unicast link authentication procedure, the new $K_{NRP}$ is used for security establishment during the PC5 unicast link security mode control procedure as specified in clause 6.1.2.7. The UE sending the DIRECT LINK AUTHENTICATION REQUEST message is called the "initiating UE" and the other UE is called the "target UE".

6.1.2.6.2 PC5 unicast link authentication procedure initiation by the initiating UE The initiating UE shall meet one of the following preconditions before initiating the PC5 unicast link authentication procedure:
  a) the target UE has initiated a PC5 unicast link establishment procedure toward the initiating UE by sending a DIRECT LINK ESTABLISHMENT REQUEST message and:
    1) the DIRECT LINK ESTABLISHMENT REQUEST message:
      1) includes a target user info IE which includes the application layer ID of the initiating UE; or
      2) does not include a target user info IE and the initiating UE is interested in the V2X service identified by the V2X service identifier in the DIRECT LINK ESTABLISHMENT REQUEST message; and
    2) the $K_{NRP}$ ID is not included in the DIRECT LINK ESTABLISHMENT REQUEST message or the initiating UE does not have an existing $K_{NRP}$ for the $K_{NRP}$ ID included in DIRECT LINK ESTABLISHMENT REQUEST message or the initiating UE wishes to derive a new $K_{NRP}$, derive a new $K_{NRP}$; or
  b) the target UE has initiated a PC5 unicast link re-keying procedure toward the initiating UE by sending a DIRECT LINK REKEYING REQUEST message and the DIRECT LINK REKYING REQUEST message includes a Re-authentication indication.

In order to initiate the PC5 unicast link authentication procedure, the initiating UE shall create a DIRECT LINK AUTHENTICATION REQUEST message. In this message, the initiating UE:
  a) shall include the Key establishment information container.
  NOTE: The Key establishment information container is provided by upper layers.

After the DIRECT LINK AUTHENTICATION REQUEST message is generated, the initiating UE shall pass this message to the lower layers for transmission along with the initiating UE's layer-2 ID for unicast communication and the target UE's layer-2 ID for unicast communication.

The initiating UE shall start timer T5aaa. The UE shall not send a new DIRECT LINK AUTHENTICATION REQUEST message to the same target UE while timer T5aaa is running.

Figure 5:
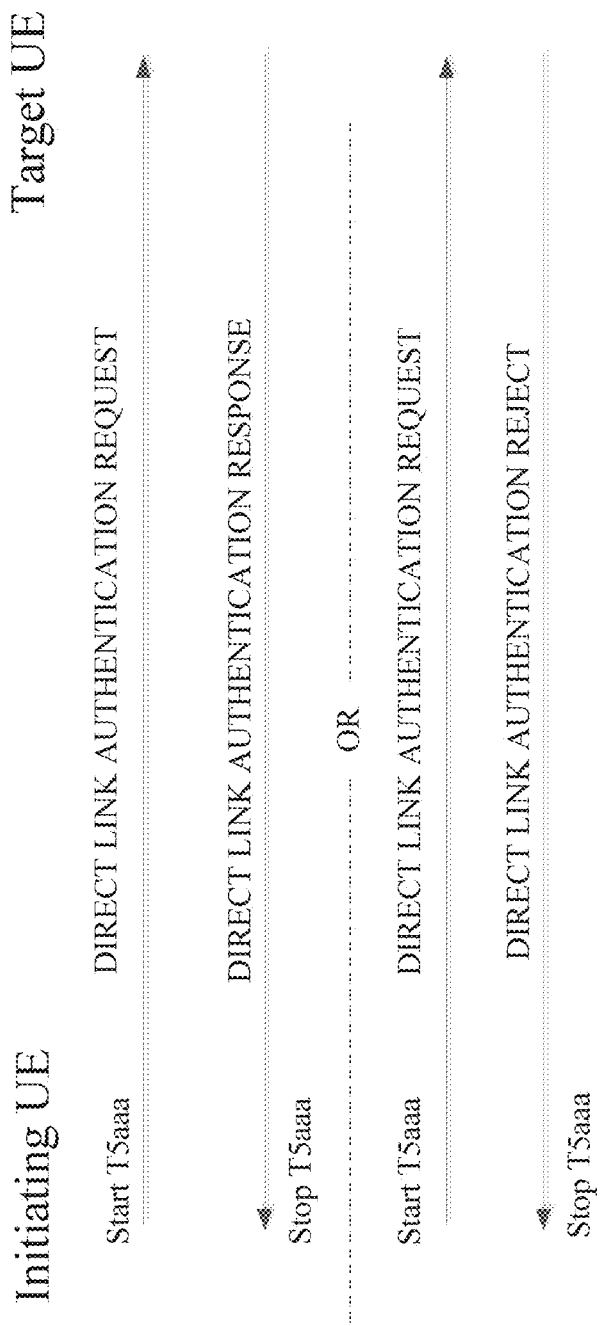
FIG. 5 is a reproduction of FIG. 6.1.2.6.2 of 3GPP C1-202875.
Figure 6:
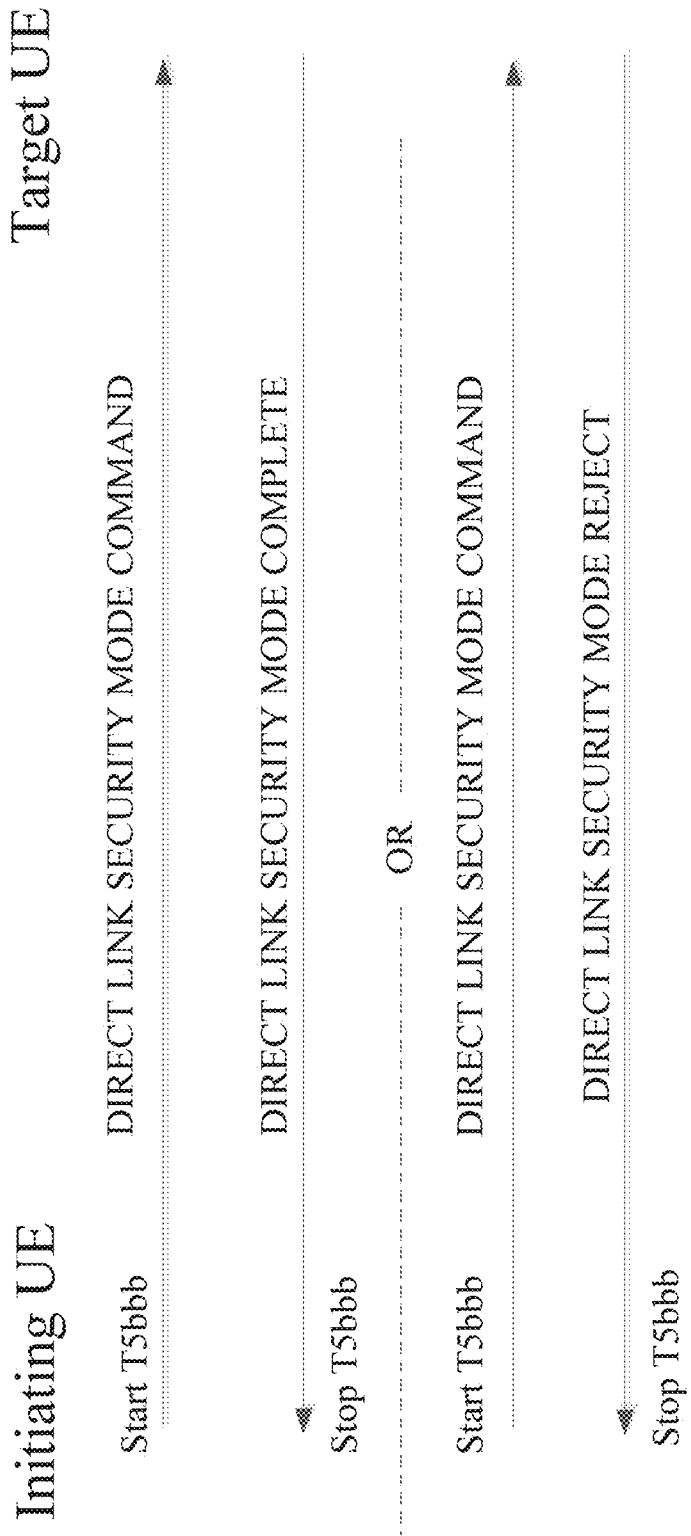
FIG. 6 is a reproduction of FIG. 6.1.2.7.2 of 3GPP C1-202875.

FIG. 6.1.2.6.2 of 3GPP C1-202875, Entitled "PC5 Unicast Link Authentication Procedure", is Reproduced as FIG. 5

6.1.2.6.3 PC5 unicast link authentication procedure accepted by the target UE

Upon receipt of a DIRECT LINK AUTHENTICATION REQUEST message, if the target UE determines that the DIRECT LINK AUTHENTICATION REQUEST message can be accepted, the target UE shall create a DIRECT LINK AUTHENTICATION RESPONSE message. In this message, the target UE:
  a) shall include the Key establishment information container.
  NOTE: The Key establishment information container is provided by upper layers.

After the DIRECT LINK AUTHENTICATION RESPONSE message is generated, the target UE shall pass this message to the lower layers for transmission along with the target UE's layer-2 ID for unicast communication and the initiating UE's layer-2 ID for unicast communication.

6.1.2.6.4 PC5 Unicast Link Authentication Procedure Completion by the Initiating UE Upon receiving a DIRECT LINK AUTHENTICATION RESPONSE message, the initiating UE shall stop timer T5aaa.

NOTE: When the initiating UE derives the new $K_{NRP}$ during the PC5 unicast link authentication procedure depends on the authentication method in use.

6.1.2.7 PC5 Unicast Link Security Mode Control Procedure 6.1.2.7.1 General

The PC5 unicast link security mode control procedure is used to establish security between two UEs during a PC5 unicast link establishment procedure or a PC5 unicast link re-keying procedure. After successful completion of the PC5 unicast link security mode control procedure, the selected security algorithms and keys are used to integrity protect and cipher all PC5 signalling messages exchanged between the UEs and the security context can be used to protect all PC5 user plane data exchanged between the UEs. The UE sending the DIRECT LINK SECURITY MODE COMMAND message is called the "initiating UE" and the other UE is called the "target UE".

Editor's note: It is FFS whether the user plane is protected by the security association.

6.1.2.7.2 PC5 Unicast Link Security Mode Control Procedure Initiation by the Initiating UE The initiating UE shall meet the following pre-conditions before initiating the PC5 unicast link security mode control procedure:

a) the target UE has initiated a PC5 unicast link establishment procedure toward the initiating UE by sending a DIRECT LINK ESTABLISHMENT REQUEST message and:

1) the DIRECT LINK ESTABLISHMENT REQUEST message:
   i) includes a target user info IE which includes the application layer ID of the initiating UE; or
   ii) does not include a target user info IE and the initiating UE is interested in the V2X service identified by the V2X service identifier in the DIRECT LINK ESTABLISHMENT REQUEST message; and 2) the initiating UE has either identified an existing $K_{NRP}$ based on the $K_{NRP}$ ID included in the DIRECT LINK ESTABLISHMENT REQUEST message or derived a new $K_{NRP}$; or b) the target UE has initiated a PC5 unicast link re-keying procedure toward the initiating UE by sending a DIRECT LINK REKEYING REQUEST message and:

1) if the target UE has included a Re-authentication indication in the DIRECT LINK REKEYING REQUEST message, the initiating UE has derived a new $K_{NRP}$.

If a new $K_{NRP}$ has been derived by the initiating UE, the initiating UE shall generate the 16 MSBs of $K_{NRP}$ ID to ensure that the resultant $K_{NRP}$ ID will be unique in the initiating UE.

Then the initiating UE shall:

a) generate a 128-bit Nonce_2 value;
b) derive $K_{NRP\text{-}sess}$ from $K_{NRP}$, Nonce_2 and Nonce_1 received in the DIRECT LINK ESTABLISHMENT REQUEST message as specified in 3GPP TS 33.536 [yy];

c) derive the NR PC5 encryption key NRPEK and the NR PC5 integrity key NRPIK from $K_{NRP\text{-}sess}$ and the selected security algorithms as specified in 3GPP TS 33.536 [yy], and d) create a DIRECT LINK SECURITY MODE COMMAND message. In this message, the initiating UE:

1) shall include the Key establishment information container if a new $K_{NRP}$ has been derived at the initiating UE and the authentication method used to generate $K_{NRP}$ requires sending information to complete the authentication procedure;

NOTE: The Key establishment information container is provided by upper layers.

2) shall include the MSBs of $K_{NRP}$ ID if a new $K_{NRP}$ has been derived at the initiating UE;
3) shall include a Nonce_2 set to the 128-bit nonce value generated by the initiating UE for the purpose of session key establishment over this PC5 unicast link;
4) shall include the selected security algorithms;
5) shall include the UE security capabilities received from the target UE in the DIRECT LINK ESTABLISHMENT REQUEST message or DIRECT LINK REKEYING REQUEST message; and
6) shall include the 8 LSBs of $K_{NPR\text{-}sess}$ ID chosen by the initiating UE as specified in 3GPP TS 33.536 [yy].

Editor's note: If the PC5 unicast link security mode control procedure was triggered during a PC5 unicast link establishment procedure, whether the initiating UE includes the UE PC5 unicast signalling security policy received from the target UE in the DIRECT LINK ESTABLISHMENT REQUEST message is FFS.

The initiating UE shall form the $K_{NPR\text{-}sess}$ ID from the 8 MSBs of $K_N$PR-sess ID received in the DIRECT LINK ESTABLISHMENT REQUEST message or DIRECT LINK REKEYING REQUEST message and the 8 LSBs of $K_{NPR\text{-}sess}$ ID included in the DIRECT LINK SECURITY MODE COMMAND message. The initiating UE shall not cipher the DIRECT LINK SECURITY MODE COMMAND message but shall integrity protect it with the new security context.

After the DIRECT LINK SECURITY MODE COMMAND message is generated, the initiating UE shall pass this message to the lower layers for transmission along with the initiating UE's layer-2 ID for unicast communication and the target UE's layer-2 ID for unicast communication, and start timer T5bbb. The UE shall not send a new DIRECT LINK SECURITY MODE COMMAND message to the same target UE while timer T5bbb is running.

FIG. 6.1.2.7.2 of 3GPP C1-202875, Entitled "PC5 Unicast Link Security Mode Control Procedure", is Reproduced as FIG. 6

6.1.2.7.3 PC5 Unicast Link Security Mode Control Procedure Accepted by the Target UE Upon receipt of a DIRECT LINK SECURITY MODE COMMAND message, if the PC5 unicast link security mode control procedure was triggered during a PC5 unicast link establishment procedure, the target UE shall check that the 8 LSBs of $K_{NPR\text{-}sess}$ ID included in the DIRECT LINK SECURITY MODE COMMAND message are not set to the same value as those received from another UE in response to the target UE's DIRECT LINK ESTABLISHMENT REQUEST message.

Then the target UE shall:
a) derive $K_{NRP-sess}$ from $K_{NRP}$, Nonce_1 and Nonce_2 received in the DIRECT LINK SECURITY MODE COMMAND message as specified in 3GPP TS 33.536 [yy]; and
b) derive NRPEK and NRPIK from $K_{NRP-sess}$ and the selected security algorithms as specified in 3GPP TS 33.536 [yy].

The target UE shall determine whether or not the DIRECT LINK SECURITY MODE COMMAND message can be accepted by:
a) checking the integrity of the DIRECT LINK SECURITY MODE COMMAND message using NRPIK; and
b) checking that the received UE security capabilities have not been altered compared to the values that the target UE sent to the initiating UE in the DIRECT LINK ESTABLISHMENT REQUEST message or DIRECT LINK REKEYING REQUEST message.

Editor's note: Whether the target UE needs to perform checks related to UE signalling security policy is FFS.

If the target UE did not include a $K_{NRP}$ ID in the DIRECT LINK ESTABLISHMENT REQUEST message, the target UE included a Re-authentication indication in the DIRECT LINK REKEYING REQUEST message or the initiating UE has chosen to derive a new $K_{NRP}$, the target UE shall derive $K_{NRP}$ as specified in 3GPP TS 33.536 [yy]. The target UE shall choose the 16 LSBs of $K_{NRP}$ ID to ensure that the resultant $K_{NRP}$ ID will be unique in the target UE. The target UE shall form $K_{NRP}$ ID from the received MSBs of $K_{NRP}$ ID and its chosen LSBs of $K_{NRP}$ ID and shall store the complete $K_{NRP}$ ID with $K_{NRP}$.

If the target UE accepts the DIRECT LINK SECURITY MODE COMMAND message, the target UE shall create a DIRECT LINK SECURITY MODE COMPLETE message. In this message, the target UE:
a) shall include the PQFI and the corresponding PC5 QoS parameters;
b) if IP communication is used, shall include an IP address configuration IE set to one of the following values:
   1) "IPv6 router" if only IPv6 address allocation mechanism is supported by the target UE, i.e. acting as an IPv6 router; or
   2) "IPv6 address allocation not supported" if IPv6 address allocation mechanism is not supported by the target UE;
c) if IP communication is used and the IP address configuration IE is set to "IPv6 address allocation not supported", shall include a link local IPv6 address IE formed locally based on IETF RFC 4862 [6]; and
d) if a new $K_{NRP}$ was derived, shall include the 16 LSBs of $K_{NRP}$ ID.

Editor's note: Whether the target UE includes its UE PC5 unicast user plane security policy in the DIRECT LINK SECURITY MODE COMPLETE is FFS.

The target UE shall form the $K_{NPR-sess}$ ID from the 8 MSBs of $K_{NPR-sess}$ ID it had sent in the DIRECT LINK ESTABLISHMENT REQUEST message or DIRECT LINK REKEYING REQUEST message and the 8 LSBs of $K_{NPR-sess}$ ID received in the DIRECT LINK SECURITY MODE COMMAND message.

The target UE shall cipher and integrity protect the DIRECT LINK SECURITY MODE COMPLETE message with the new security context.

After the DIRECT LINK SECURITY MODE COMPLETE message is generated, the target UE shall pass this message to the lower layers for transmission along with the target UE's layer-2 ID for unicast communication and the initiating UE's layer-2 ID for unicast communication.

6.1.2.7.4 PC5 Unicast Link Security Mode Control Procedure Completion by the Initiating UE Upon receiving a DIRECT LINK SECURITY MODE COMPLETE message, the initiating UE shall stop timer T5bbb and check the integrity of the DIRECT LINK SECURITY MODE COMPLETE message. If the integrity check passes, the initiating UE shall then continue the procedure which triggered the PC5 unicast link security mode control procedure.

[ . . . ]

3GPP TS 23.287 states:

5.2.1.4 Unicast Mode Communication Over PC5 Reference Point

Unicast mode of communication is only supported over NR based PC5 reference point. FIG. 5.2.1.4-1 illustrates an example of PC5 unicast links.

Figure 7:
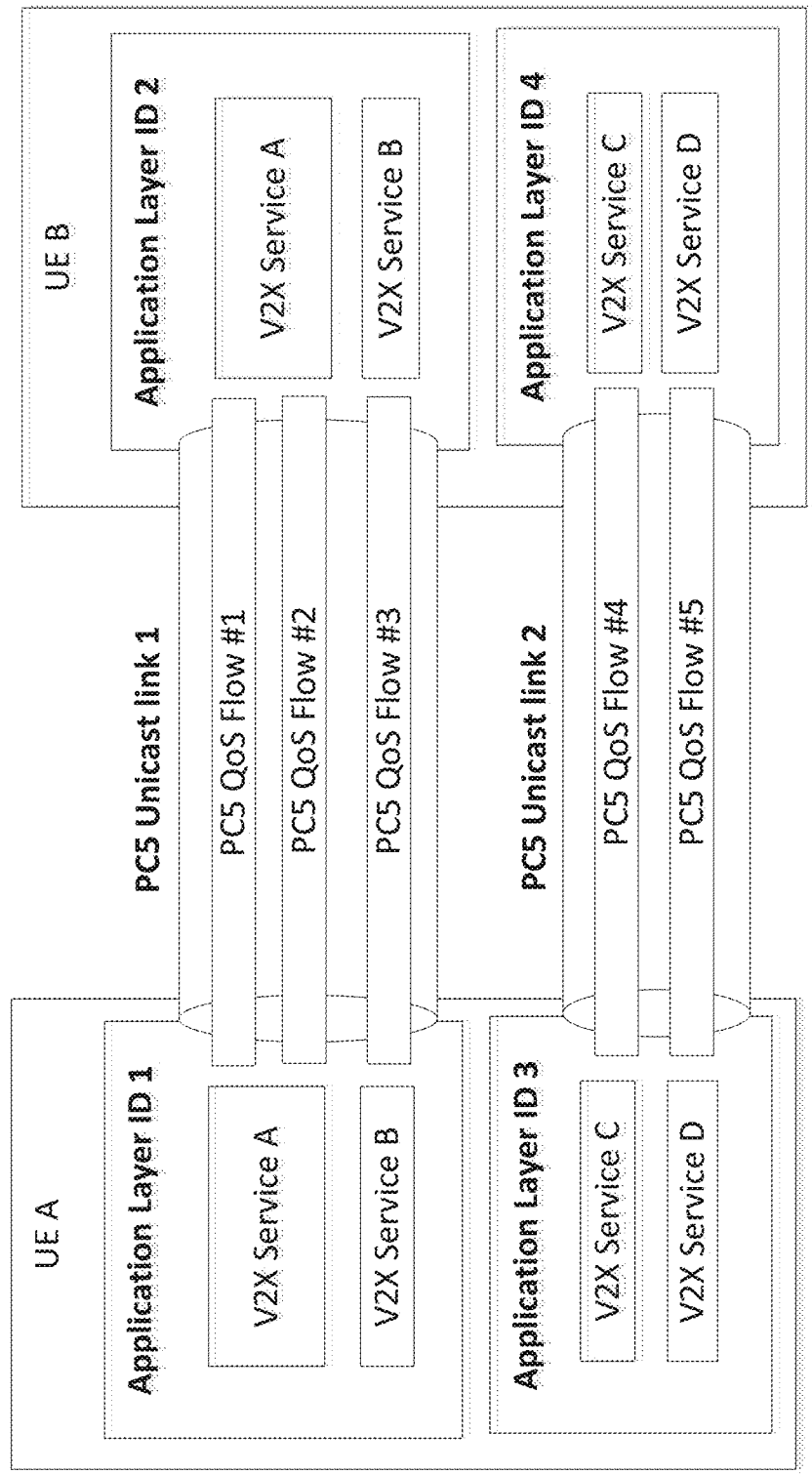
FIG. 7 is a reproduction of FIG. 5.2.1.4-1 of 3GPP 23.287 V16.4.0.

FIG. 5.2.1.4-1 of 3GPP 23.287 V16.4.0, Entitled "Example of PC5 Unicast Links", is Reproduced as FIG. 7

The following principles apply when the V2X communication is carried over PC5 unicast link:
A PC5 unicast link between two UEs allows V2X communication between one or more pairs of peer V2X services in these UEs. All V2X services in the UE using the same PC5 unicast link use the same Application Layer ID.
NOTE 1: An Application Layer ID can change in time as described in clauses 5.6.1.1 and 6.3.3.2, due to privacy. This does not cause a re-establishment of a PC5 unicast link. The UE triggers a Link Identifier Update procedure as specified in clause 6.3.3.2.
One PC5 unicast link supports one or more V2X service types) if these V2X service types are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
NOTE 2: A source UE is not required to know whether different target Application Layer IDs over different PC5 unicast links belong to the same target UE.
A PC5 unicast link supports V2X communication using a single network layer protocol e.g. IP or non-IP.
A PC5 unicast link supports per-flow QoS model as specified in clause 5.4.1.
If multiple V2X service types use a PC5 unicast link, one PC5 QoS Flow identified by PFI may be associated with more than one V2X service types.

When the Application layer in the UE initiates data transfer for a V2X service type which requires unicast mode of communication over PC5 reference point:
the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service type as specified in clause 6.3.3.4; otherwise
the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response/Ack, Disconnect Request/Response, Link Modification Request/Accept, Keep-alive/Ack) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:

Application Layer ID and Layer-2 ID of UE A; and
Application Layer ID and Layer-2 ID of UE B; and
network layer protocol used on the PC5 unicast link; and
the information about PC5 QoS Flow(s). For each PC5 QoS Flow, the PC5 QoS Context and the PC5 QoS Rule(s) as defined in clause 5.4.1.1.3.

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one V2X service type (e.g. the UE establishes multiple unicast links with multiple UEs for a same V2X service type).

The Unicast Link Profile shall be updated accordingly after a Layer-2 link modification for an established PC5 unicast link as specified in clause 6.3.3.4 or Layer-2 link identifier update as specified in clause 6.3.3.2.

Upon receiving an indication from the AS layer that the PC5-RRC connection was released due to RLF, the V2X layer in the UE locally releases the PC5 unicast link associated with this PC5-RRC connection. The AS layer uses PC5 Link Identifier to indicate to the V2X layer the PC5 unicast link whose PC5-RRC connection was released.

When the PC5 unicast link has been released as specified in clause 6.3.3.3, the V2X layer of each UE for the PC5 unicast link informs the AS layer that the PC5 unicast link has been released. The V2X layer uses PC5 Link Identifier to indicate the released unicast link.

[ . . . ]

5.6.1.4 Identifiers for Unicast Mode V2X Communication Over PC5 Reference Point

For unicast mode of V2X communication over PC5 reference point, the destination Layer-2 ID used depends on the communication peer. The Layer-2 ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the V2X service type configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

Based on privacy configuration as specified in clause 5.1.2.1, the update of the new identifiers of a source UE to the peer UE for the established unicast link may cause the peer UE to change its Layer-2 ID and optionally IP address/prefix if IP communication is used as defined in clause 6.3.3.2.

A UE may establish multiple PC5 unicast links with a peer UE and use the same or different source Layer-2 IDs for these PC5 unicast links.

[ . . . ]

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 8:
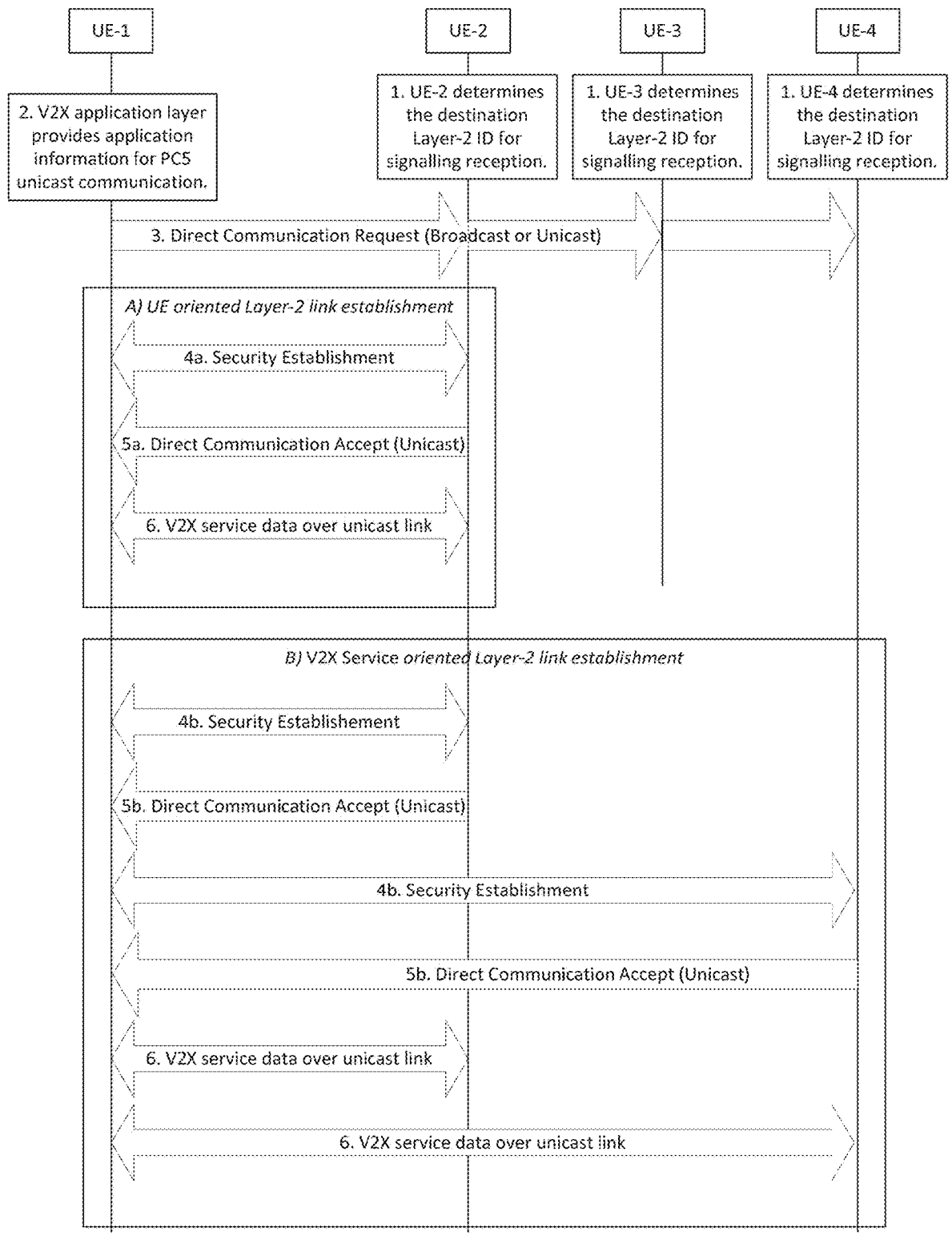
FIG. 8 is a reproduction of FIG. 6.3.3.1-1 of 3GPP 23.287 V16.4.0.

FIG. 6.3.3.1-1 of 3GPP 23.287 V16.4.0, Entitled "Layer-2 Link Establishment Procedure", is Reproduced as FIG. 8

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type (s) and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:
    Source User Info: the initiating UE's Application Layer ID (i.e. UE-1's Application Layer ID).
    If the V2X application layer provided the target UE's Application Layer ID in step 2, the following information is included:
        Target User Info: the target UE's Application Layer ID (i.e. UE-2's Application Layer ID).

V2X Service Info: the information about V2X service type(s) requesting Layer-2 link establishment.

Security Information: the information for the establishment of security.

NOTE 1: The Security Information and the necessary protection of the Source User Info and Target User Info are defined in TS 33.536 [26].

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X service type(s) over a PC5 unicast link with UE-1 responds by establishing the security with UE-1.

NOTE 2: The signalling for the Security Procedure is defined in TS 33.536 [26].

When the security protection is enabled, UE-1 sends the following information to the target UE:

If IP communication is used:

IP Address Configuration: For IP communication, IP address configuration is required for this link and indicates one of the following values:

"IPv6 Router" if IPv6 address allocation mechanism is supported by the initiating UE, i.e., acting as an IPv6 Router; or "IPv6 address allocation not supported" if IPv6 address allocation mechanism is not supported by the initiating UE.

Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and the associated V2X service type(s).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in FIG. 6.3.3.1-1).

The Direct Communication Accept message includes:

Source User Info: Application Layer ID of the UE sending the Direct Communication Accept message.

QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and the associated V2X service type(s).

If IP communication is used:

IP Address Configuration: For IP communication, IP address configuration is required for this link and indicates one of the following values:

"IPv6 Router" if IPv6 address allocation mechanism is supported by the target UE, i.e., acting as an IPv6 Router; or "IPv6 address allocation not supported" if IPv6 address allocation mechanism is not supported by the target UE.

Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID) and the corresponding PC5 QoS parameters. This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

3GPP TS 38.331 introduced sidelink Radio Resource Control (RRC) procedures as follows:

5.8 Sidelink
5.8.1 General

NR sidelink communication consists of unicast, groupcast and broadcast. For unicast, the PC5-RRC connection is a logical connection between a pair of a Source Layer-2 ID and a Destination Layer-2 ID in the AS. The PC5-RRC signalling, as specified in sub-clause 5.8.9, can be initiated after its corresponding PC5 unicast link establishment (TS 23.287 [55]). The PC5-RRC connection and the corresponding sidelink SRBs and sidelink DRB(s) are released when the PC5 unicast link is released as indicated by upper layers.

For each PC5-RRC connection of unicast, one sidelink SRB (i.e. SL-SRB0) is used to transmit the PC5-S message(s) before the PC5-S security has been established. One sidelink SRB (i.e. SL-SRB1) is used to transmit the PC5-S messages to establish the PC5-S security. One sidelink SRB (i.e. SL-SRB2) is used to transmit the PC5-S messages after the PC5-S security has been established, which is protected. One sidelink SRB (i.e. SL-SRB3) is used to transmit the PC5-RRC signalling, which is protected and only sent after the PC5-S security has been established.

For unicast of NR Sidelink communication, AS security comprises of integrity protection and ciphering of PC5 signaling (SL-SRB1, SL-SRB2 and SL-SRB3) and user data (SL-DRBs). The ciphering and integrity protection algorithms and parameters for a PC5 unicast link are exchanged by PC5-S messages in the upper layers as specified in TS 33.536 [60], and apply to the corresponding PC5-RRC connection in the AS. Once AS security is activated for a PC5 unicast link in the upper layers as specified in TS 33.536 [60], all messages on SL-SRB2 and SL-SRB3 and/or user data on SL-DRBs of the corresponding PC5-RRC connection are integrity protected and/or ciphered by the PDCP.

For unicast of NR Sidelink communication, if the change of the key is indicated by the upper layers as specified in TS 24.587 [57], UE re-establishes the PDCP entity of the SL-SRB1, SL-SRB2, SL-SRB3 and SL-DRBs on the corresponding PC5-RRC connection.

NOTE 1: In case the configurations for NR sidelink communication are acquired via the E-UTRA, the configurations for NR sidelink communication in SIB12 and sl-ConfigDedicatedNR within RRCReconfiguration used in subclause 5.8 are provided by the configurations in SysteminformationBlockType28 and sl-ConfigDedicatedNR within RRCConnectionReconfiguration as specified in TS 36.331 [10], respectively.

NOTE 2: In this release, there is one-to-one correspondence between the PC5-RRC connection and the PC5 unicast link as specified in TS 38.300[2].

NOTE 3: All SL-DRBs related to the same PC5-RRC connection have the same activation/deactivation setting for ciphering and the same activation/deactivation setting for integrity protection as in TS 33.536 [60].

Figure 9:
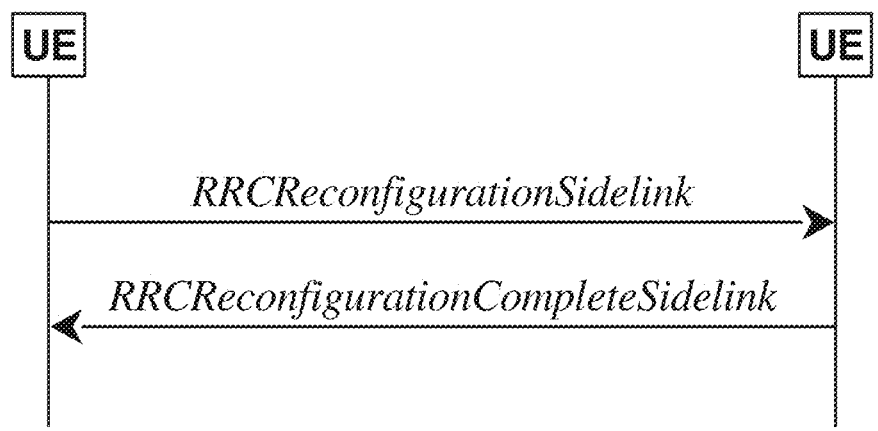
FIG. 9 is a reproduction of FIG. 5.8.9.1.1-1of 3GPP TS 38.331 V16.4.1.

5.8.9 Sidelink RRC Procedure
5.8.9.1 Sidelink RRC reconfiguration
5.8.9.1.1 General FIG. 5.8.9.1.1-1 of 3GPP TS 38.331 V16.4.1, Entitled "Sidelink RRC Reconfiguration, Successful", is Reproduced as FIG. 9

[ . . . ]

The purpose of this procedure is to modify a PC5-RRC connection, e.g. to establish/modify/release sidelink DRBs, to (re-)configure NR sidelink measurement and reporting, to (re-)configure sidelink CSI reference signal resources and CSI reporting latency bound.

The UE may initiate the sidelink RRC reconfiguration procedure and perform the operation in sub-clause 5.8.9.1.2 on the corresponding PC5-RRC connection in following cases:

the release of sidelink DRBs associated with the peer UE, as specified in sub-clause 5.8.9.1a.1;

the establishment of sidelink DRBs associated with the peer UE, as specified in sub-clause 5.8.9.1a.2;

the modification for the parameters included in SLRB-Config of sidelink DRBs associated with the peer UE, as specified in sub-clause 5.8.9.1a.2;

the (re-)configuration of the peer UE to perform NR sidelink measurement and report.

the (re-)configuration of the sidelink CSI reference signal resources and CSI reporting latency bound.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the NR sidelink communications parameters provided in the old state.

5.8.9.1.2 Actions Related to Transmission of RRCReconfigurationSidelink Message

The UE shall set the contents of RRCReconfigurationSidelink message as follows:

1> for each sidelink DRB that is to be released, according to sub-clause 5.8.9.1a.1.1, due to configuration by sl-ConfigDedicatedNR, SIB12, SidelinkPreconfigNR or by upper layers:

2> set the SLRB-PC5-ConfigIndex included in the slrb-ConfigToReleaseList corresponding to the sidelink DRB;

1> for each sidelink DRB that is to be established or modified, according to sub-clause 5.8.9.1a.2.1, due to receiving sl-ConfigDedicatedNR, SIB12 or SidelinkPreconfigNR:

2> set the SLRB-Config included in the slrb-ConfigToAddModList, according to the received sl-RadioBearerConfig and s-RLC-BearerConfig corresponding to the sidelink DRB;

1> set the sl-MeasConfig as follows:

2> If the frequency used for NR sidelink communication is included in sl-FreqInfoToAddModList in sl-ConfigDedicatedNR within RRCReconfiguration message or included in sl-ConfigCommonNR within SIB12:

3> if UE is in RRC_CONNECTED:
  4> set the sl-MeasConfig according to stored NR sidelink measurement configuration information for this destination;
3> if UE is in RRC_IDLE or RRC_INACTIVE:
  4> set the sl-MeasConfig according to stored NR sidelink measurement configuration received from SIB12;
2> else:
  3> set the sl-MeasConfig according to the sl-MeasPreconfig in SidelinkPreconfigNR;
1> start timer T400 for the destination associated with the sidelink DRB;
1> set the sl-CSI-RS-Config;
1> set the sl-LatencyBoundCSI-Report,
NOTE 1: How to set the parameters included in sl-CSI-RS-Config and sl-LatencyBoundCS1-Report is up to UE implementation.

The UE shall submit the RRCReconfigurationSidelink message to lower layers for transmission.

5.8.9.1.3 Reception of an RRCReconfigurationSidelink by the UE

The UE shall perform the following actions upon reception of the RRCReconfigurationSidelink:
1> if the RRCReconfigurationSidelink includes the sl-ResetConfig:
  2> perform the sidelink reset configuration procedure as specified in 5.8.9.1.10;
1> if the RRCReconfigurationSidelink includes the slrb-ConfigToReleaseList:
  2> for each SLRB-PC5-ConfigIndex value included in the slrb-ConfigToReleaseList that is part of the current UE sidelink configuration;
    3> perform the sidelink DRB release procedure, according to sub-clause 5.8.9.1a.1;
1> if the RRCReconfigurationSidelink includes the slrb-ConfigToAddModList:
  2> for each slrb-PC5-ConfigIndex value included in the slrb-ConfigToAddModList that is not part of the current UE sidelink configuration:
    3> if sl-MappedQoS-FlowsToAddList is included:
      4> apply the SL-PQFI included in sl-MappedQoS-FlowsToAddList;
    3> perform the sidelink DRB addition procedure, according to sub-clause 5.8.9.1a.2;
  2> for each slrb-PC5-ConfigIndex value included in the slrb-ConfigToAddModList that is part of the current UE sidelink configuration:
    3> if sl-MappedQoS-FlowsToAddList is included:
      4> add the SL-PQFI included in sl-MappedQoS-FlowsToAddList to the corresponding sidelink DRB;
    3> if sl-MappedQoS-FlowsToReleaseList is included:
      4> remove the SL-PQFI included in sl-MappedQoS-FlowsToReleaseList from the corresponding sidelink DRB;
    3> if the sidelink DRB release conditions as described in sub-clause 5.8.9.1a.1.1 are met:
      4> perform the sidelink DRB release procedure according to sub-clause 5.8.9.1a.1.2;
    3> else if the sidelink DRB modification conditions as described in sub-clause 5.8.9.1a.2.1 are met:
      4> perform the sidelink DRB modification procedure according to sub-clause 5.8.9.1a.2.2;
1> if the RRCReconfigurationSidelink message includes the sl-MeasConfig:
  2> perform the sidelink measurement configuration procedure as specified in 5.8.10;
1> if the RRCReconfigurationSidelink message includes the sl-CSI-RS-Config:
  2> apply the sidelink CSI-RS configuration;
1> if the RRCReconfigurationSidelink message includes the sl-LatencyBoundCSI-Report:
  2> apply the configured sidelink CSI report latency bound;
1> if the UE is unable to comply with (part of) the configuration included in the RRCReconfigurationSidelink (i.e. sidelink RRC reconfiguration failure):
  2> continue using the configuration used prior to the reception of the RRCReconfigurationSidelink message;
  2> set the content of the RRCReconfigurationFailureSidelink message;
    3> submit the RRCReconfigurationFailureSidelink message to lower layers for transmission;
1> else:
  2> set the content of the RRCReconfigurationCompleteSidelink message;
    3> submit the RRCReconfigurationCompleteSidelink message to lower layers for transmission;
NOTE 1: When the same logical channel is configured with different RLC mode by another UE, the UE handles the case as sidelink RRC reconfiguration failure.

[ . . . ]

5.8.9.1.9 Reception of an RRCReconfigurationCompleteSidelink by the UE

The UE shall perform the following actions upon reception of the RRCReconfigurationCompleteSidelink:
1> stop timer T400 for the destination, if running;
1> consider the configurations in the corresponding RRCReconfigurationSidelink message to be applied.

[ . . . ]

5.8.9.1a Sidelink Radio Bearer Management

[ . . . ]

5.8.9.1a.2 Sidelink DRB Addition/Modification 5.8.9.1a.2.1 Sidelink DRB Addition/Modification Conditions For NR sidelink communication, a sidelink DRB addition is initiated only in the following cases:
1> if any sidelink QoS flow is (re)configured by sl-ConfigDedicatedNR, SIB12, SidelinkPreconfigNR and is to be mapped to one sidelink DRB, which is not established; or
1> if any sidelink QoS flow is (re)configured by RRCReconfigurationSidelink and is to be mapped to a sidelink DRB, which is not established;

For NR sidelink communication, a sidelink DRB modification is initiated only in the following cases:
1> if any of the sidelink DRB related parameters is changed by sl-ConfigDedicatedNR, SIB12, SidelinkPreconfigNR or RRCReconfigurationSidelink for one sidelink DRB, which is established;

5.8.9.1a.2.2 Sidelink DRB Addition/Modification Operations

For the sidelink DRB, whose sidelink DRB addition conditions are met as in sub-clause 5.8.9.1a.2.1, the UE capable of NR sidelink communication that is configured by upper layers to perform NR sidelink communication shall:

1> for groupcast and broadcast; or
1> for unicast, if the sidelink DRB addition was triggered due to the reception of the RRCReconfigurationSidelink message; or
1> for unicast, after receiving the RRCReconfigurationCompleteSidelink message, if the sidelink DRB addition was triggered due to the configuration received within the sl-ConfigDedicatedNR, SIB12, SidelinkPreconfigNR or indicated by upper layers:
  2> if an SDAP entity for NR sidelink communication associated with the destination and the cast type of the sidelink DRB does not exist:
    3> establish an SDAP entity for NR sidelink communication as specified in TS 37.324 [24] clause 5.1.1;
  2> (re)configure the SDAP entity in accordance with the sl-SDAP-ConfigPC5 received in the RRCReconfigurationSidelink or sl-SDAP-Config received in sl-ConfigDedicatedNR, SIB12, SidelinkPreconfigNR, associated with the sidelink DRB;
  2> establish a PDCP entity for NR sidelink communication and configure it in accordance with the si-PDCP-ConfigPC5 received in the RRCReconfigurationSidelink or sl-PDCP-Config received in sl-ConfigDedicatedNR, SIB12, SidelinkPreconfigNR, associated with the sidelink DRB;
  2> establish a RLC entity for NR sidelink communication and configure it in accordance with the sl-RLC-ConfigPC5 received in the RRCReconfigurationSidelink or sl-RLC-Config received in sl-ConfigDedicatedNR, SIB12, SidelinkPreconfigNR, associated with sidelink DRB;
  2> if this procedure was due to the reception of a RRCReconfigurationSidelink message:
    3> configure the MAC entity with a logical channel in accordance with the si-MAC-LogicalChannelConfigPC5 received in the RRCReconfigurationSidelink associated with the sidelink DRB, and perform the sidelink UE information procedure in sub-clause 5.8.3 for unicast if need;
  2> else:
    3> configure the MAC entity with a logical channel associated with the sidelink DRB, by assigning a new logical channel identity, in accordance with the si-MAC-LogicalChannelConfig received in the sl-ConfigDedicatedNR, SIB12, SidelinkPreconfigNR.

NOTE 1: When a sidelink DRB addition is due to the configuration by RRCReconfigurationSidelink, it is up to UE implementation to select the sidelink DRB configuration as necessary transmitting parameters for the sidelink DRB, from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

[ ... ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3

RLC-SAP: AM

Logical channel: DCCH

Direction: Network to UE

RRCReconfiguration Message

```
-- ASN1START
-- TAG-RECONFIGURATION-START
....
RRCReconfiguration-v1610-IEs ::=   SEQUENCE {
    ...
    sl-ConfigDedicatedNR-r16         SetupRelease {SL-ConfigDedicatedNR-r16}      OPTIONAL, -- Need M
    ...
}
```

S-ConfigDedicatedNR

The IE SL-ConfigDedicatedNR specifies the dedicated configuration information for NR sidelink communication.

SL-ConfigDedicatedNR information element

```
-- ASN1START
-- TAG-SL-CONFIGDEDICATEDNR-START
SL-ConfigDedicatedNR-r16 ::=         SEQUENCE {
    sl-PHY-MAC-RLC-Config-r16            SL-PHY-MAC-RLC-Config-r16       OPTIONAL,       -- Need M
    sl-RadioBearerToReleaseList-r16      SEQUENCE (SIZE (1..maxNrofSLRB-r16)) OF SLRB-Uu-ConfigIndex-r16       OPTIONAL,       -- Need N
    sl-RadioBearerToAddModList-r16       SEQUENCE (SIZE (1..maxNrofSLRB-r16)) OF SL-RadioBearerConfig-r16       OPTIONAL,       -- Need N
    sl-MeasConfigInfoToReleaseList-r16   SEQUENCE (SIZE (1..maxNrofSL-Dest-r16)) OF SL-DestinationIndex-r16       OPTIONAL,       -- Need N
    sl-MeasConfigInfoToAddModList-r16    SEQUENCE (SIZE (1..maxNrofSL-Dest-r16)) OF SL-
```

-continued

```
    MeasConfigInfo-r16           OPTIONAL,         -- Need N
    t400-r16                                       ENUMERATED {ms100, ms200, ms300, ms400, m600, ms1000,
ms1500, ms2000} OPTIONAL,      -- Need M
    ...
}
SL-DestinationIndex-r16 ::=                       INTEGER (0..maxNrofSL-Dest-1-r16)
SL-PHY-MAC-RLC-Config-r16::=                      SEQUENCE {
    sl-ScheduleConfig-r16                             SetupRelease { SL-ScheduledConfig-r16 }
OPTIONAL,          -- Need M
    sl-UE-SelectedConfig-r16                          SetupRelease { SL-UE-SelectedConfig-r16 }
OPTIONAL,          -- Need M
    sl-FreqInfoToReleaseList-r16                      SEQUENCE (SIZE (1..maxNrofFreqSL-r16)) OF SL-Freq-Id-r16
OPTIONAL,          -- N
    sl-FreqInfoToAddModList-r16                       SEQUENCE (SIZE (1..maxNrofFreqSL-r16)) OF SL-FreqConfig-
r16                            OPTIONAL,   -- Need R
    sl-RLC-BearerToReleaseList-r16                    SEQUENCE (SIZE (1..maxSL-LCID-r16)) OF SL-RLC-
BearerConfigIndex-r16        OPTIONAL,         -- NeeD N
    sl-RLC-BearerToAddModList-r16                     SEQUENCE (SIZE (1..maxSL-LCID-r16)) OF SL-RLC-
BearerConfig-r16             OPTIONAL,         -- Need N
    sl-MaxNumConsecutiveDTX-r16                       ENUMERATED {n1, n2, n3, n4, n6, n8, n16, n32}
OPTIONAL,          -- Need M
    sl-CSI-Acquisition-r16                            ENUMERATED {enabled}
OPTIONAL,          -- Need R
    sl-CSI-SchedulingRequestId-r16                    SetupRelease {SchedulingRequestId}
OPTIONAL,          -- Need M
    sl-SSB-PriorityNR-r16                             INTEGER (1..8)
OPTIONAL,          -- NeeD P
    networkControlledSyncTx-r16                       ENUMERATED {on, off}
OPTIONAL           -- Need M
}
-- TAG-SL-CONFIGDEDICATEDNR-STOP
-- ASN1STOP
```

| SL-ConfigDedicatedNR field descriptions |
|---|
| sl-MeasConfigInfoToAddModList<br>This field indicates the RSRP measurement configurations for unicast destinations to add and/or modify.<br>sl-MeasConfigInfoToReleaseList<br>This field indicates the RSRP measurement configurations for unicast destinations to remove.<br>sl-PHY-MAC-RLC-Config<br>This field indicates the lower layer sidelink radio bearer configurations.<br>sl-RadioBearerToAddModList<br>This field indicates one or multiple sidelink radio bearer configurations to add and/or modify.<br>sl-RadioBearerToReleaseList<br>This field indicates one or multiple sidelink radio bearer configurations to remove. |

| SL-PHY-MAC-RLC-Config field descriptions |
|---|
| networkControlledSyncTx<br>This field indicates whether the UE shall transmit synchronisation information (i.e. become synchronisation source). Value on indicates the UE to transmit synchronisation information while value off indicates the UE to not transmit such information.<br>sl-MaxNumConsecutiveDTX<br>This field indicates the maximum number of consecutive HARQ DTX before triggering sidelink RLF. Value n1 corresponds to 1, value n2 corresponds to 2, and so on.<br>sl-FreqInfoToAddModList<br>This field indicates the NR sidelink communication configuration on some carrier frequency (ies) to add and/or modify. In this release, only one entry can be configured in the list.<br>sl-FreqInfoToReleaseList<br>This field indicates the NR sidelink communication configuration on some carrier frequency (ies) to remove. In this release, only one entry can be configured in the list.<br>sl-RLC-BearerToAddModList<br>This field indicates one or multiple sidelink RLC bearer configurations to add and/or modify.<br>sl-RLC-BearerToReleaseList<br>This field indicates one or multiple sidelink RLC bearer configurations to remove.<br>sl-ScheduledConfig<br>Indicates the configuration for UE to transmit NR sidelink communication based on network scheduling. This field is not configured simultaneously with sl-UE-SelectedConfig.<br>sl-UE-SelectedConfig<br>Indicates the configuration used for UE autonomous resource selection. This field is not configured simultaneously with sl-ScheduledConfig.<br>sl-CSI-Acquisition<br>Indicates whether CSI reporting is enabled in sidelink unicast. If the field is absent, sidelink CSI reporting is disabled.<br>sl-CSI-SchedulingRequestId<br>If present, it indicates the scheduling request configuration applicable for sidelink CSI report MAC CE, as specified in TS 38.321 [3].<br>sl-SSB-PriorityNR<br>This field indicates the priority of NR sidelink SSB transmission and reception. |

SL-RadioBearerConfig
The IE SL-RadioBearerConfig specifies the sidelink DRB configuration information for NR sidelink communication.

SL-RadioBearerConfig Information Element

```
-- ASN1START
-- TAG-SL-RADIOBEARERCONFIG-START
SL-RadioBearerConfig-r16 ::=      SEQUENCE {
    slrb-Uu-ConfigIndex-r16         SLRB-Uu-ConfigIndex-r16,
    sl-SDAP-Config-r16              SL-SDAP-Config-r16                                          OPTIONAL,       -- Cond SLRBSetup
    sl-PDCP-Config-r16              SL-PDCP-Config-r16                                          OPTIONAL,       -- Cond SLRBSetup
    sl-TransRange-r16               ENUMERATED {m20, m50, m80, m120, m150, m180, m200, m220, m250, m270, m300, m350, m370,
                                    m400, m420, m450, m480, m500, m550, m600, m700, m1000, spare9, spare8, spare7, spare6,
                                    spare5, spare4, spare3, spare2, spare1}   OPTIONAL,       -- Need R
    ...
}
-- TAG-SL-RADIOBEARERCONFIG-STOP
-- ASN1STOP
```

| SL-RadioBearerCoonfig field descriptions |
|---|
| sl-PDCP-Config<br>This field indicates the PDCP parameters for the sidelink DRB.<br>sl-SDAP-Config<br>This field indicates how to map sidelink QoS flows to sidelink DRB.<br>slrb-Uu-ConfigIndex<br>This field indicates the index of sidelink DRB configuration.<br>sl-TransRange<br>This field indicates the transmission range of the sidelink DRB. The unit is meter. |

SL-PDCP-Config
The IE SL-PDCP-Config is used to set the configurable PDCP parameters for a sidelink radio bearer.

SL-PDCP-Config Information Element

```
-- ASN1START
-- TAG-SL-PDCP-CONFIG-START
SL-PDCP-Config-r16 ::=          SEQUENCE {
    sl-DiscardTimer-r16             ENUMERATED {ms3, ms10, ms20, ms25, ms30, ms40, ms50, ms60, ms75, ms100, ms150, ms200,
                                    ms250, ms300, ms500, ms750, ms1500, infinity}
                                    OPTIONAL,       -- Cond Setup
    sl-PDCP-SN-Size-r16             ENUMERATED {len12bits, len18bits}
                                    OPTIONAL,       -- Cond Setup2
    sl-OutOfOrderDelivery           ENUMERATED { true }
                                    OPTIONAL,       -- Need R
    ...
}
-- TAG-SL-PDCP-CONFIG-STOP
-- ASN1STOP
```

| SL-PDCP-Config field descriptions |
| --- |
| sl-DiscardTimer<br>Value in ms of discardTimer specified in<br>TS 38.323 [5]. Value ms50 corresponds<br>to 50 ms, value ms100 corresponds to 100 ms and so on.<br>sl-OutOfOrderDelivery<br>Indicates whether or not outOfOrderDelivery<br>specified in TS 38.323 [5] is configured.<br>This field should be either always present or<br>always absent, after the radio bearer is established.<br>sl-PDCP-SN-Size<br>PDCP sequence number size for unicast<br>NR sidelink communication, 12 or 18 bits,<br>as specified in TS 38.323 [5]. For<br>groupcast and broadcast NR sidelink<br>communication, only 12 bits is<br>applicable, as specified in 9.1.1.5. |

SL-SDAP-Config

The IE SL-SDAP-Config is used to set the configurable SDAP parameters for a Sidelink DRB.

SL-SDAP-Config Information Element

```
-- ASN1START
-- TAG-SL-SDAP-CONFIG-START
SL-SDAP-Config-r16 ::=            SEQUENCE {
    sl-SDAP-Header-r16                ENUMERATED {present, absent},
    sl-DefaultRB-r16                  BOOLEAN,
    sl-MappedQoS-Flows-r16            CHOICE {
        sl-MappedQos-FlowsList-r16        SEQUENCE (SIZE (1..maxNrofSL-QFIs-r16)) OF SL-
QoS-Profile-r16,
        sl-MappedQoS-FlowsListDedicated-r16  SL-MappedQoS-FlowsListDedicated-r16
    }
OPTIONAL,          -- Need M
    sl-CastType-r16                   ENUMERATED {broadcast, groupcast, unicast, spare1}
OPTIONAL,          -- Need M
    ...
}
SL-MappedQoS-FlowsListDedicated-r16 ::=  SEQUENCE {
    sl-MappedQoS-FlowsToAddList-r16       SEQUENCE (SIZE (1..maxNrofSL-QFIs-r16)) OF SL-QoS-
FlowIdentity-r16         OPTIONAL,      -- Need N
    sl-MappedQoS-FlowsToReleaseList-16    SEQUENCE (SIZE (1..maxNrofSL-QFIs-r16)) OF SL-QoS-
FlowIdentity-r16         OPTIONAL       -- Need N
}
-- TAG-SL-SDAP-CONFIG-STOP
-- ASN1STOP
```

| SL-SDAP-Config field descriptions |
| --- |
| sl-DefaultRB<br>Indicates whether or not this is the default<br>sidelink DRB for this NR sidelink communication<br>transmission destination. Among all configured<br>instances of SL-SDAP-Config for this destination,<br>this field shall be set to true in at most one<br>instance of SL-SDAP-Config and to false in all other<br>instances.<br>sl-MappedQoS-Flows<br>Indicates QoS flows to be mapped to the<br>sidelink DRB. If the field is included in<br>dedicated signalling, it is set to sl-MappedQoS-<br>FlowsListDedicated; otherwise, it is set fo<br>sl-MappedQoS-FlowsList.<br>sl-MappedQoS-FlowsList<br>Indicates the list of QoS profiles of the NR<br>sidelink communication transmission destination<br>mapped to this sidelink DRB.<br>sl-MappedQoS-FlowsToAddList<br>Indicates the list of SL QoS flows ID of the<br>NR sidelink communication transmission destination<br>to be additionally mapped to this sidelink DRB.<br>sl-MappedQoS-FlowsToReleaseList |

| -continued |
| --- |
| SL-SDAP-Config field descriptions |
| Indicates the list of SL QoS flows ID of the NR<br>sidelink communication transmission destination<br>to be released from existing QoS flow to<br>SLRB mapping of this sidelink DRB.<br>sl-SDAP-Header<br>Indicates whether or not a SDAP header is<br>present on this sidelink DRB. The field cannot be<br>changed after a sidelink DRB is established.<br>This field is set to present if the field sl-DefaultRB is<br>set to true. |

SL-RLC-BearerConfig

The IE SL-RLC-BearerConfig specifies the SL RLC bearer configuration information for NR sidelink communication.

SL-RLC-BearerConfig Information Element

```
-- ASN1START
-- TAG-SL-RLC-BEARERCONFIG-START
SL-RLC-BearerConfig-r16 ::=        SEQUENCE {
    sl-RLC-BearerConfigIndex-r16       SL-RLC-BearerConfigIndex-r16,
    sl-ServerRadioBearer-r16           SLRB-Uu-ConfigIndex-r16
OPTIONAL,                          -- Cond LCH-SetupOnly
    sl-RLC-Config-r16                  SL-RLC-Config-r16
OPTIONAL,                          -- Cond LCH-Setup
    sl-MAC-LogicalChannelConfig-r16    SL-LogicalChannelConfig-r16
OPTIONAL,                          -- Cond LCH-Setup
    ...
}
-- TAG-SL-RLC-BEARERCONFIG-STOP
-- ASN1STOP
```

| SL-RLC-BearerConfig field descriptions |
| --- |
| sl-MAC-LogicalChannelConfig<br>The field is used to configure MAC SL logical channel paramenters.<br>sl-RLC-BearerConfigIndex<br>The index of the RLC bearer configuration.<br>sl-RLC-Config<br>Determines the RLC mode (UM, AM) and provides corresponding parameters.<br>sl-ServedRadioBearer<br>Associates the sidelink RLC Bearer with a sidelink DRB. It indicates the index of SL radio bearer |

-continued

| SL-RLC-BearerConfig field descriptions |
| --- |
| configuration, which is corresponding to the RLC bearer configuration. |

SL-LogicalChannelConfig

The IE SL-LogicalChannelConfig is used to configure the sidelink logical channel parameters.

SL-LogicalChannelConfig Information Element

```
-- ASN1START
-- TAG-SL-LOGICALCHANNELCONFIG-START
SL-LogicalChannelConfig-r16 ::=    SEQUENCE {
    sl-Priority-r16                    INTEGER (1..8),
    sl-PerioritisedBitRate-r16         ENUMERATED {kBps0, kBps8, kBps16, kBps32, kBps64,
kBps128, kBps256, kBps512,
                                       kBps1024, kBps2048, kBps4096, kBps8192, kBps16384,
kBps32768, kBps65536, infinity},
    sl-BucketSizeDuration-r16          ENUMERATED {ms5, ms10, ms20, ms50, ms100, ms150,
ms300, ms500, ms1000,
                                       spare7, spare6, spare5, spare4, spare3, spare2,
spare1},
    sl-ConfiguredGrantType1Allowed-r16  ENUMERATED {true}
OPTIONAL,  -- Need R
    sl-HARQ-FeedbackEnabled-r16        ENUMERATED {enabled, disabled }
OPTIONAL,  -- Need R
    sl-AllowedCG-List-r16              SEQUENCE (SIZE (0.. maxNrofCG-SL-r16-1)) OF SL-
ConfigIndexCG-r16
OPTIONAL,  -- Need R
    sl-AllowedSCS-List-r16             SEQUENCE (SIZE (1..maxSCSs)) OF SubcarrierSpacing
OPTIONAL,  -- Need R
    sl-MaxPUSCH-Duration-r16           ENUMERATED {ms0p02, ms0p04, ms0p0625, ms0p125,
ms0p25, ms0p5, spare2, spare1}
OPTIONAL,  -- Need R
    sl-LogicalChannelGroup-r16         INTEGER (0..maxLCG-ID)
OPTIONAL,  -- Need P
    sl-SchedulingRequestId-r16         SchedulingRequestId
OPTIONAL,  -- Need P
    sl-LogicalChannelSR-DelayTimerApplied-r16  BOOLEAN
OPTIONAL,  -- Need R
    ...
}
-- TAG-SL-LOGICALCHANNELCONFIG-STOP
-- ASN1STOP
```

RRCReconfigurationSidelink

The RRCReconfigurationSidelink message is the command to AS configuration of the PC5 RRC connection. It is only applied to unicast of NR sidelink communication.

Signalling radio bearer: SL-SRB3
RLC-SAP: AM
Logical channel: SCCH
Direction: UE to UE

RRCReconfigurationSidelink Message

```
-- ASN1START
-- TAG-RRCRECONFIGURATIONSIDELINK-START
RRCReconfigurationSidelink ::=          SEQUENCE {
    rrc-TransactionIdentifier-r16           RRC-TransactionIdentifier,
    criticalExtensions                      CHOICE {
        rrcReconfigurationSidelink-r16          RRCReconfigurationSidelink-IEs-r16,
        criticalExtensionsFuture                SEQUENCE { }
    }
}
RRCReconfigurationSidelink-IEs-r16 ::=  SEQUENCE {
    slrb-ConfigToAddModList-r16             SEQUENCE (SIZE (1..maxNrofSLRB-r16)) OF SLRB-Config-
r16                     OPTIONAL,       -- Need N
    slrb-ConfigToReleaseList-r16            SEQUENCE (SIZE (1..maxNrofSLRB-r16)) OF SLRB-PC5-
ConfigIndex-r16         OPTIONAL,       -- Need N
    sl-MeasConfig-r16                       SetupRelease {SL-MeasConfig-r16}
OPTIONAL,       -- Need M
    sl-CSI-RS-Config-r16                    SetupRelease {SL-CSI-RS-Config-r16}
OPTIONAL,       -- Need M
    sl-ResetConfig-r16                      ENUMERATED {true}
OPTIONAL,       -- Need N
    sl-LatencyBoundCSI-Report-r16           INTEGER (3..160)
OPTIONAL,       -- Need M
    lateNonCriticalExtension                OCTET STRING
OPTIONAL,
    nonCriticalExtension                    SEQUENCE { }
OPTIONAL
}
SLRB-Config-r16::=                      SEQUENCE {
    slrb-PC5-ConfigIndex-r16                SLRB-PC5-ConfigIndex-r16,
    sl-SDAP-ConfigPC5-r16                   SL-SDAP-ConfigPC5-r16
OPTIONAL,       -- Need M
    sl-PDCP-ConfigPC5-r16                   SL-PDCP-ConfigPC5-r16
OPTIONAL,       -- Need M
    sl-RLC-ConfigPC5-r16                    SL-RLC-ConfigPC5-r16
OPTIONAL,       -- Need M
    sl-MAC-LogicalChannelConfigPC5-r16      SL-LogicalChannelConfigPC5-r16
OPTIONAL,       -- Need M
    ...
}
SLRB-PC5-ConfigIndex-r16 ::=            INTEGER (1..maxNrofSLRB-r16)
SL-SDAP-ConfigPC5-r16 ::=               SEQUENCE {
    sl-MappedQoS-FlowsToAddList-r16         SEQUENCE (SIZE (1.. maxNrofSL-QFIsPerDest-r16)) OF
SL-PQFI-r16             OPTIONAL,       -- Need N
    sl-MappedQoS-FlowsToReleaseList-r16     SEQUENCE (SIZE (1.. maxNrofSL-QFIsPerDest-r16)) OF
SL-PQFI-r16             OPTIONAL,       -- Need M
    sl-SDAP-Header-r16                      ENUMERATED {present, absent},
    ...
}
SL-PDCP-ConfigPC5-r16 ::=               SEQUENCE {
    sl-PDCP-SN-Size-r16                     ENUMERATED {len12bits, len18bits}
OPTIONAL,       -- Need M
    sl-OutOfOrderDelivery-r16               ENUMERATED { true }
OPTIONAL,       -- Need P
    ...
}
SL-RLC-ConfigPC5-r16 ::=                CHOICE {
    sl-AM-RLC-r16                           SEQUENCE {
        sl-SN-FieldLengthAM-r16                 SN-FieldLengthAM
OPTIONAL,       -- Need M
        ...
    },
    sl-UM-Bi-Directional-RLC-r16            SEQUENCE {
        sl-SN-FieldLengthUM-r16                 SN-FieldLengthUM
OPTIONAL,       -- Need M
        ...
    },
    sl-UM-Uni-Directional-RLC-r16           SEQUENCE {
        sl-SN-FieldLengthUM-r16                 SN-FieldLengthUM
OPTIONAL,       -- Need M
        ...
    }
}
```

```
SL-LogicalChannelConfigPC5-r16 ::=    SEQUENCE {
    sl-LogicalChannelIdentity-r16         LogicalChannelIdentity,
    ...
}
SL-PQFI-r16 ::=                       INTEGER (1..64)
SL-CSI-RS-Config-r16 ::=              SEQUENCE {
    sl-CSI-RS-FreqAllocation-r16         CHOICE {
        sl-OneAntennaPort-r16                BIT STRING (SIZE (12)),
        sl-TwoAntennaPort-r16                BIT STRING (SIZE (6))
    }
OPTIONAL,         -- Need M
    sl-CSI-RS-FirstSymbol-r16            INTEGER (3..12)
OPTIONAL,         -- Need M
    ...
}
-- TAG-RRCRECONFIGURATIONSIDELINK-STOP
-- ASN1STOP
```

| RRCReconfigurationSidelink field descriptions |
|---|
| sl-CSI-RS-FreqAllocation<br>Indicates the frequency domain position for sidelink CSI-RS.<br>sl-CSI-RS-FirstSymbol<br>Indicates the position of first symbol of sidelink CSI-RS.<br>sl-Resetconfig<br>Indicates that the full configuration should be applicable for the RRCReconfigurationSidelink message.<br>sl-LatencyBoundCSI-Report<br>Indicate the latency bound of SL CSI report from the associated SL CSI triggering in terms of number of slots.<br>sl-LogicalChannelIdentity<br>Indicates the identity of the sidelink logical channel.<br>sl-MappedQoS-FlowsToAddList<br>Indicate the QoS flows to be mapped to the configured sidelink DRB. Each entry is indicated by the SL-PQFI, which is used between UEs, as defined in TS 23.287 [55].<br>sl-MappedQoS-FlowsToReleaseList<br>Indicate the QoS flows to be released from the configured sidelink DRB. Each entry is indicated by the SL-PQFI, which is used between UEs, as defined in TS 23.287 [55].<br>sl-MeasConfig<br>Indicates the sidelink measurement configuration for the unicast destination.<br>sl-OutOfOrderDelivery<br>Indicates whether or not outOfOrderDelivery specified in TS 38.323 [5] is configured. This field should be either always present or always absent, after the sidelink radio bearer is established.<br>sl-PDCP-SN-Size<br>Indicates the PDCP SN size of the configured sidelink DRB.<br>sl-SDAP-Header<br>Indicates whether or not a SDAP header is present on this sidelink DRB. |

```
maxNrofSL-QFIs-r16       INTEGER ::= 2048  -- Maximum number of QoB flow for NP
sidelink communication per UE
maxNrofSL-QFIsPerDest-r16 INTEGER ::= 64    -- Maximum number of QoB flow per
destination for NR sidelink communication
maxNrofSL-Dest-r16       INTEGER ::= 32    -- Maximum number of destination for
NR sidelink communication
```

3GPP TS 23.752 states:

6.8 Solution #8: UE-to-UE Relay Selection without Relay Discovery 6.8.1 Description When a source UE wants to communicate with a target UE, it will first try to find the target UE by either sending a Direct Communication Request or a Solicitation message with the target UE info. If the source UE cannot reach the target UE directly, it will try to discover a UE-to-UE relay to reach the target UE which may also trigger the relay to discover the target UE. To be more efficient, this solution tries to integrate target UE discovery and UE-to-UE relay discovery and selection together, including two alternatives:

Alternative 1: UE-to-UE relay discovery and selection can be integrated into the unicast link establishment procedure as described in clause 6.3.3 of TS 23.287 [5].

Alternative 2: UE-to-UE relay discovery and selection is integrated into Model B direct discovery procedure.

A new field is proposed to be added in the Direct Communication Request or the Solicitation message to indicate whether relays can be used in the communication. The field can be called relay_indication. When a UE wants to broadcast a Direct Communication Request or a Solicitation message, it indicates in the message whether a UE-to-UE relay could be used. For Release 17, it is assumed that the value of the indication is restricted to single hop.

When a UE-to-UE relay receives a Direct Communication Request or a Solicitation message with the relay_indication set, then it shall decide whether to forward the message (i.e. modify the message and broadcast it in its proximity), according to e.g. Relay Service Code if there is any, Application ID, authorization policy (e.g. relay for specific ProSe Service), the current traffic load of the relay, the radio conditions between the source UE and the relay UE, etc.

It may exist a situation where multiple UE-to-UE relays can be used to reach the target UE or the target UE may also directly receive the Direct Communication Request or Solicitation message from the source UE. The target UE may choose which one to reply according to e.g. signal strength, local policy (e.g. traffic load of the UE-to-UE relays), Relay Service Code if there is any or operator policies (e.g. always prefer direct communication or only use some specific UE-to-UE relays).

The source UE may receive the responses from multiple UE-to-UE relays and may also from the target UE directly, the source UE chooses the communication path according to e.g. signal strength or operator policies (e.g. always prefer direct communication or only use some specific UE-to-UE relays).

6.8.2 Procedures 6.8.2.1 UE-to-UE relay discovery and selection is integrated into the unicast link establishment procedure (Alternative 1)

Figure 10:
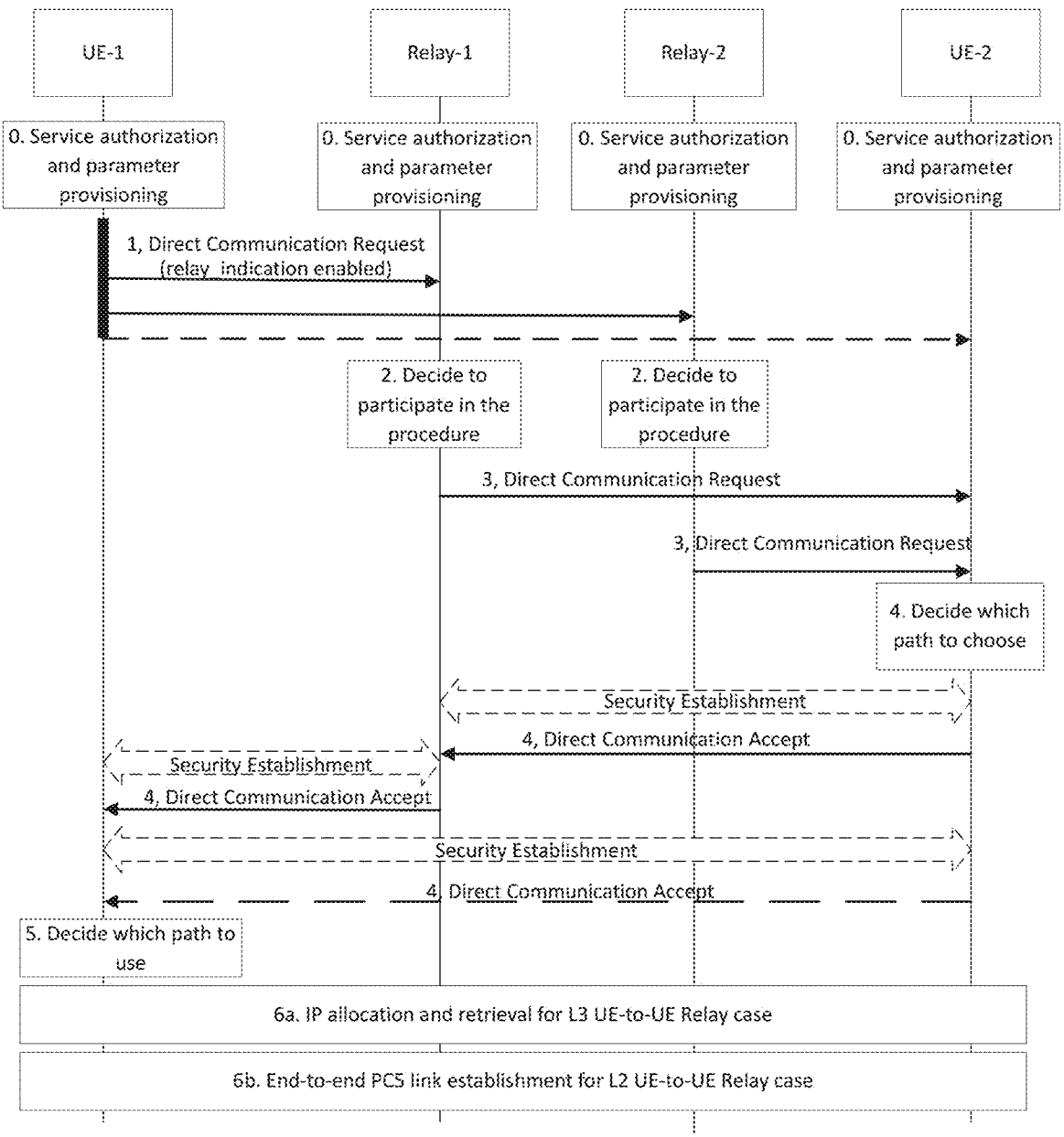
FIG. 10 is a reproduction of FIG. 6.8.2.1-1 of 3GPP TR 23.752 V2.0.0.

FIG. 6.8.2.1-1 of 3GPP TR 23.752 V2.0.0, Entitled "5G ProSe UE-to-UE Relay Selection (Alternative 1)", is Reproduced as FIG. 10

FIG. 6.8.2.1-1 illustrates the procedure of the proposed method.

0. UEs are authorized to use the service provided by the UE-to-UE relays. UE-to-UE relays are authorized to provide service of relaying traffic among UEs. The authorization and the parameter provisioning can use solutions for KI #8, e.g. Sol #36. The authorization can be done when UEs/relays are registered to the network. Security related parameters may be provisioned so that a UE and a relay can verify the authorization with each other if needed.
1. UE-1 wants to establish unicast communication with UE-2 and the communication can be either through direct link with UE-2 or via a UE-to-UE relay. Then UE-1 broadcasts Direct Communication Request with relay_indication enabled. The message will be received by relay-1, relay-2. The message may also be received by UE-2 if it is in the proximity of UE-1. UE-1 includes source UE info, target UE info, Application ID, as well as Relay Service Code if there is any. If UE-1 does not want relay to be involved in the communication, then it will made relay_indication disabled.
NOTE 1: The data type of relay_indication can be determined in Stage 3. Details of Direct Communication Request/Accept messages will be determined in stage 3.
2. Relay-1 and relay-2 decide to participate in the procedure. They broadcast a new Direct Communication Request message in their proximity without relay_indication enabled. If a relay receives this message, it will just drop it. When a relay broadcasts the Direct Communication Request message, it includes source UE info, target UE info and Relay UE info (e.g. Relay UE ID) in the message and use Relay's L2 address as the source Layer-2 ID. The Relay maintains association between the source UE information (e.g. source UE L2 ID) and the new Direct Communication Request.
3. UE-2 receives the Direct Communication Requests from relay-1 and relay-2. UE-2 may also receive Direct Communication Request message directly from the UE-1 if the UE-2 is in the communication range of UE-1.
4. UE-2 chooses relay-1 and replies with Direct Communication Accept message. If UE-2 directly receives the Direct Communication Request from UE-1, it may choose to setup a direct communication link by sending the Direct Communication Accept message directly to UE-1. After receiving Direct Communication Accept, a UE-to-UE relay retrieves the source UE information stored in step 2 and sends the Direct Communication Accept message to the source UE with its Relay UE info added in the message.

After step 4, UE-1 and UE-2 have respectively setup the PC5 links with the chosen UE-to-UE relay.

NOTE 2: The security establishment between the UE1 and Relay-1, and between Relay-1 and UE-2 are performed before the Relay-1 and UE-2 send Direct Communication Accept message. Details of the authentication/security establishment procedure are determined by SA WG3. The security establishment procedure can be skipped if there already exists a PC5 link between the source (or target) UE and the relay which can be used for relaying the traffic.

5. UE-1 receives the Direct Communication Accept message from relay-1. UE-1 chooses path according to e.g. policies (e.g. always choose direct path if it is possible), signal strength, etc. If UE-1 receives Direct Communication Accept/Response message request accept directly from UE-2, it may choose to setup a direct PC5 L2 link with UE-2 as described in clause 6.3.3 of TS 23.287 [5], then step 6 is skipped.
6a. For the L3 UE-to-UE Relay case, UE-1 and UE-2 finish setting up the communication link via the chosen UE-to-UE relay. The link setup information may vary depending on the type of relay, e.g. L2 or L3 relaying. Then UE-1 and UE-2 can communicate via the relay. Regarding IP address allocation for the source/remote UE, the addresses can be either assigned by the relay or by the UE itself (e.g. link-local IP address) as defined in clause 6.3.3 of TS 23.287 [5].
6b. For the Layer 2 UE-to-UE Relay case, the source and target UE can setup an end-to-end PC5 link via the relay. UE-1 sends a unicast E2E Direct Communication Request message to UE-2 via the Relay-1, and UE-2 responds with a unicast E2E Direct Communication Accept message to UE-1 via the Relay-1. Relay-1 transfers the messages based on the identity information of UE-1/UE-2 in the Adaptation Layer.
NOTE 3: How Relay-1 can transfer the messages based on the identity information of UE-1/UE-2 in the Adaptation Layer requires cooperation with RAN2 during the normative phase.
NOTE 4: In order to make a relay or path selection, the source UE can setup a timer after sending out the Direct Communication Request for collecting the corresponding response messages before making a decision. Similarly, the target UE can also setup a timer after receiving the first copy of the Direct Communication Request/message for collecting multiple copies of the message from different paths before making a decision.
NOTE 5: In the first time when a UE receives a message from a UE-to-UE relay, the UE needs to verify if the relay is authorized be a UE-to-UE relay. Similarly, the UE-to-UE relay may also need to verify if the UE is authorized to use the relay service. The verification details and the how to secure the communication between two UEs through a UE-to-UE relay is to be defined by SA WG3.

6.8.2.2 UE-to-UE Relay Discovery and Selection is Integrated into Model B direct discovery procedure (Alternative 2)

Depicted in FIG. 6.8.2.2-1 is the procedure for UE-UE Relay discovery Model B, and the discovery/selection procedure is separated from hop by hop and end-to-end link establishment.

Figure 11:
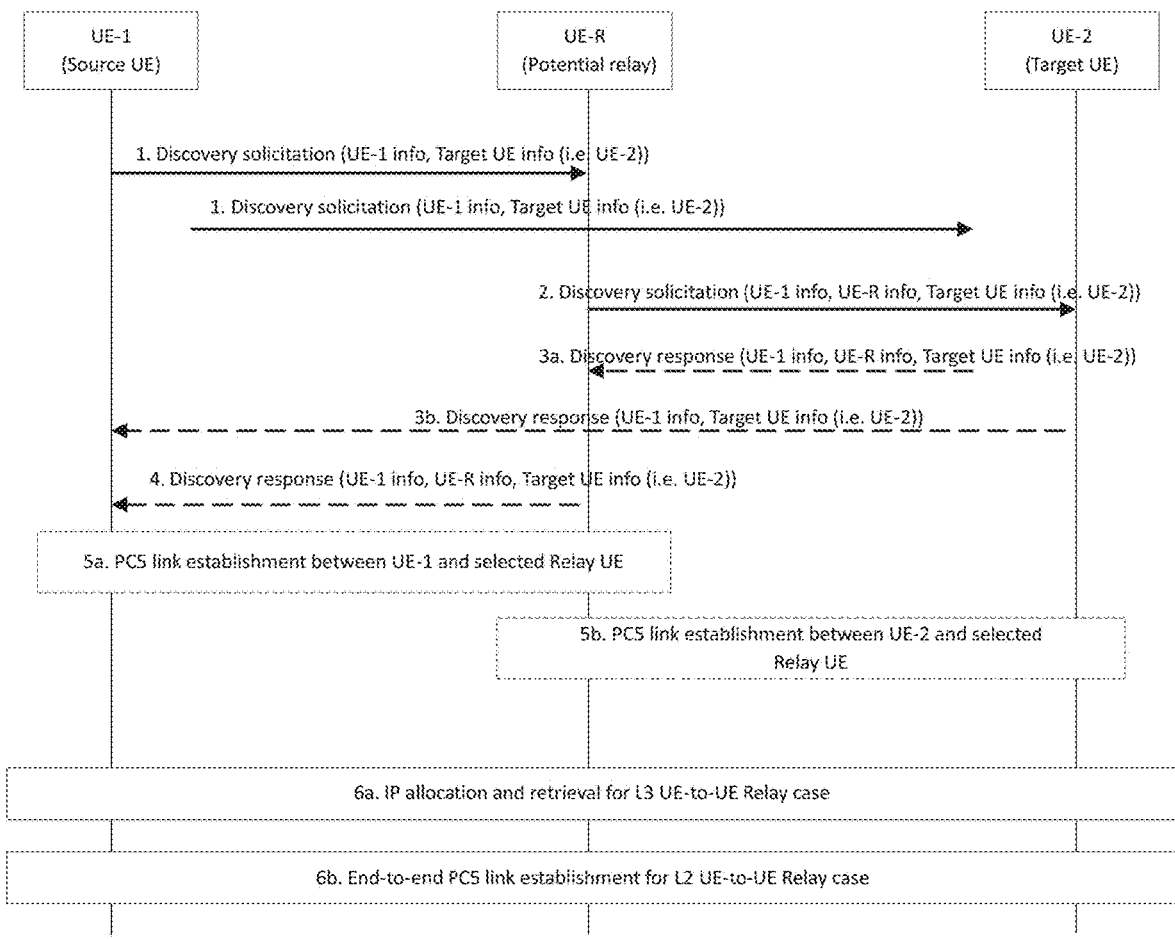
FIG. 11 is a reproduction of FIG. 6.8.2.2-1 of 3GPP TR 23.752 V2.0.0.

FIG. 6.8.2.2-1 6.9.2.1.1-1of 3GPP TR 23.752 V2.0.0, entitled "5G ProSe UE-to-UE relay selection (Alternative 2)", is reproduced as FIG. 11

1. UE-1 broadcasts discovery solicitation message carrying UE-1 info, target UE info (UE-2), Application ID, Relay Service Code if any, the UE-1 can also indicate relay_indication enabled.
2. On reception of discovery solicitation, the candidate Relay UE-R broadcasts discovery solicitation carrying UE-1 info, UE-R info, Target UE info. The Relay UE-R uses Relay's L2 address as the source Layer-2 ID.
3. The target UE-2 responds the discovery message. If the UE-2 receives discovery solicitation message in step 1, then UE-2 responds discovery response in step 3b with UE-1 info, UE-2 info. If not and UE-2 receives discovery solicitation in step 2, then UE-2 responds discovery response message in step 3a with UE-1 info, UE-R info, UE-2 info.
4. On reception of discovery response in step 3a, UE-R sends discovery response with UE-1 info, UE-R info, UE-2 info. If more than one candidate Relay UEs responding discovery response message, UE-1 can select one Relay UE based on e.g. implementation or link qualification.
5. The source and target UE may need to setup PC5 links with the relay before communicating with each other. Step 5a can be skipped if there already exists a PC5 link between the UE-1 and UE-R which can be used for relaying. Step 5b can be skipped if there already exists a PC5 link between the UE-2 and UE-R which can be used for relaying.
6a. Same as step 6a described in clause 6.8.2.1.
6b. For the Layer-2 UE-to-UE Relay, the E2E unicast Direct Communication Request message is sent from UE1 to the selected Relay via the per-hop link (established in steps 5a) and the Adaptation layer info identifying the peer UE (UE3) as the destination. The UE-to-UE Relay transfers the E2E messages based on the identity information of peer UE in the Adaptation Layer. The initiator (UE1) knows the Adaptation layer info identifying the peer UE (UE3) after a discovery procedure. UE3 responds with E2E unicast Direct Communication Accept message in the same way.
NOTE 1: For the Layer 2 UE-to-UE Relay case, whether step 5b is performed before step 6b or triggered during step 6b will be decided at normative phase.
NOTE 2: How Relay-1 can transfer the messages based on the identity information of UE-1/UE-2 in the Adaptation Layer requires cooperation with RAN2 during the normative phase.

6.8.3 Impacts on Services, Entities and Interfaces

UE impacts to support new Relay related functions.

6.9 Solution #9: Connection Establishment Via UE-to-UE Layer-2 Relay

6.9.1 Description

6.9.1.1 General

Using the solution described in this clause, a UE-to-UE Relay enables the discovery of a source UE by a target UE. A UE-to-UE Relay is authorized to relay messages between two UEs over the PC5 interface via authorization and provisioning, as defined in clause 6.36 Solution for Key Issue #4: UE-to-UE Relay Authorization and Provisioning.

The source UE announces its supported applications or discovers a target UE using a known discovery mechanism, e.g. using user-oriented or service-oriented methods as defined in TS 23.287 [5].

The UE-to-UE Relay listens for ProSe applications advertisements (e.g. Direct Discovery or Direct Communication Request messages) from surrounding UEs and if a broadcasted application matches one of the applications from its provisioned relay policy/parameters, the UE-to-UE Relay advertises it as a relayed application by adding a relay indication to the message.

A target UE discovers a source UE via a UE-to-UE Relay. The target UE receives a broadcast Direct Communication Request message with a relay indication.

A secured "extended" PC5 link is set up between the source UE and the target UE via the UE-to-UE Relay. Source/Target UEs send messages to the UE-to-UE Relay and receive messages through the UE-to-UE Relay. However, the security association and the PC5 unicast link are established directly between the source UE and target UE. The UE-to-UE Relay forwards the messages in opaque mode, without the ability to read, modify their content or replay them, with the exception of the Discovery messages and Direct Communication Request message that are sent in cleartext (i.e. without security protection), visible to the UE-to-UE Relay, and are modified to add the relay indication. The source/target UEs detect that the link establishment is going through a UE-to-UE Relay upon detecting a relay indication included in the received messages.

The UE-to-UE Relay maintains a management connection between the Relay UE and each Source/Target UE, and also maintains 1 or more "extended" end-to-end PC5 unicast links between a Source UE and Target UE(s). The UE-to-UE Relay forwards messages between the Source UEs and Target UEs using an Adaption Layer. The details of the identity information of Source UE and Target UE used to forward or route messages in the Adaption Layer will be defined in cooperation with RAN WGs during normative phase.

NOTE: Additional security-related parameters and procedures may be needed for the protection of relay related messages. Their definitions need to be coordinated with SA WG3.

Link management (i.e. keepalive, link modification, link identifier update and link release) is supported over direct unicast links and needs to be supported over extended PC5 links as well. Since the security association of extended PC5 links is between the peer UEs, all messages sent over the extended PC5 link, including link management (i.e. PC5-S) messages, may only be processed by those two UEs.

6.9.1.2 Control and User Plane Protocol Stacks

The control and user plane protocols stacks are based on the architectural reference model described in Annex A.

6.9.2 Procedures

6.9.2.1 Connection Establishment

Connection establishment for L2 UE-to-UE relay includes two cases:

Connection establishment integrating UE-to-UE relay discovery and selection, and Connection establishment after UE-to-UE relay discovery and selection

6.9.2.1.1 Connection Establishment Integrating UE-to-UE Relay Discovery and Selection The two methods defined in TS 23.287 [5], i.e. service-oriented and user-oriented are supported using the procedure described in this clause.

FIG. 6.9.2.1.1-1 shows the peer discovery and unicast link establishment over PC5 reference point via a UE-to-UE Relay.

Figure 12:
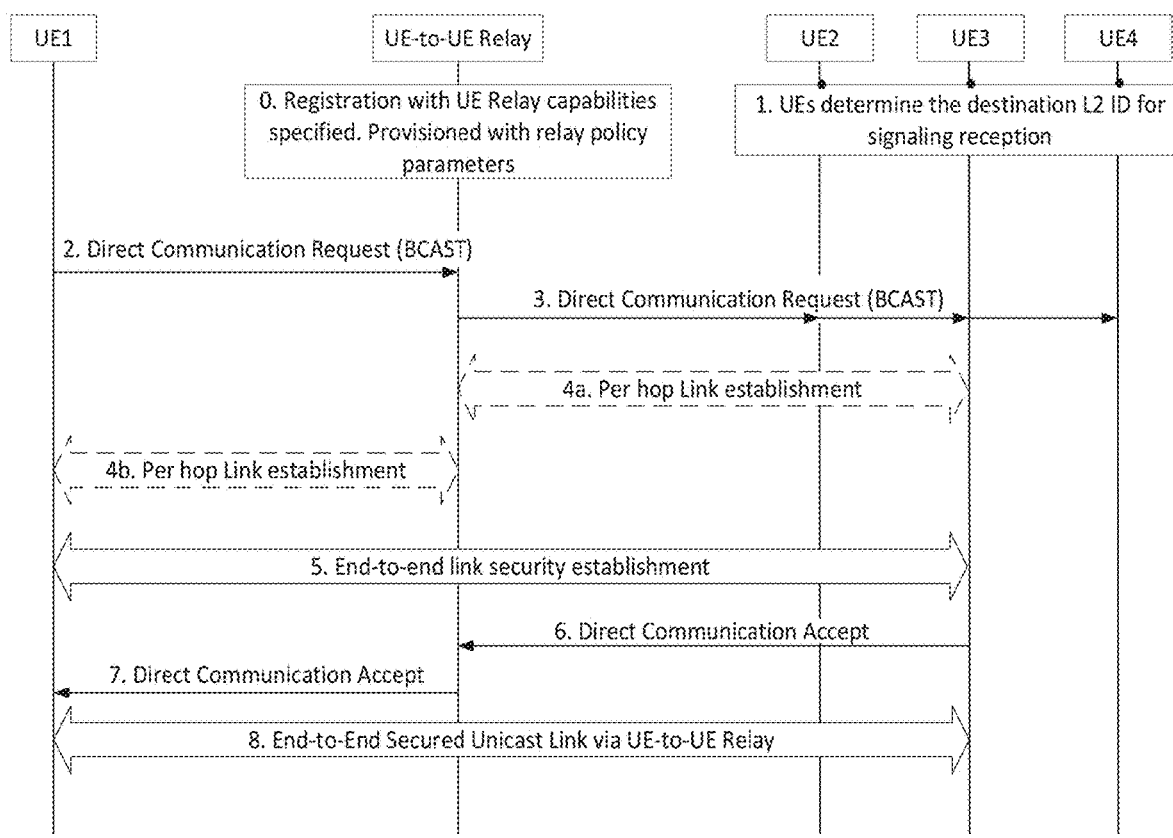
FIG. 12 is a reproduction of FIG. 6.9.2.1.1-1 of 3GPP TR 23.752 V2.0.0.

FIG. 6.9.2.1.1-1 of 3GPP TR 23.752 V2.0.0, Entitled "Connection Establishment Procedure Integrating UE-to-UE Relay Discovery and Selection", is Reproduced as FIG. 12

0. UE-to-UE Relay registers with the network and has provided its UE-to-UE Relay capabilities. The authorization and the parameter provisioning can use solutions for KI #8, and the UE-to-UE Relay is provisioned with relay policy parameters.
NOTE 1: Step 0 is optional and the policy parameters may be pre-configured.
1. The target UEs (i.e. UE2, UE3 and UE4) determine the destination Layer-2 ID for signalling reception for PC5 unicast link establishment as specified in TS 23.287 [5] clause 5.6.1.4. The destination Layer-2 ID is configured with the target UEs as specified in TS 23.287 [5] clause 5.1.2.1.
2. On the source UE (i.e. UE1), the application layer provides information to the ProSe layer for PC5 unicast communication (e.g. broadcast Layer-2 ID, ProSe Application ID, UE's Application Layer ID, target UE's Application Layer ID, relay applicable indication), as specified in TS 23.287 [5] clause 6.3.3.1.
   ProSe layer triggers the peer UE discovery mechanism by sending an E2E broadcast Direct Communication Request message. The message is sent using the source Layer-2 ID and broadcast Layer-2 ID as destination, and includes other parameters related to the application offered, as specified in TS 23.287 [5] clause 6.3.3.1.
3. The UE-to-UE Relay receives the broadcast Direct Communication Request message and verifies if it's configured to relay this application, i.e. it compares the announce ProSe Application ID with its provisioned relay policy/parameters
   The UE-to-UE Relay forwards the E2E broadcast Direct Communication Request message by using its own Layer-2 ID as Source L2 ID, and additionally includes the Relay UE's ID in the message and specifies info identifying UE1 in Adaptation layer.
NOTE 2: The UE-to-UE Relay handles this E2E broadcast message in the ProSe layer, and forwards any subsequent E2E PC5-S message based on adaptation layer info.
NOTE 3: UEs, e.g. UE-3, may receive Direct Communication Request message directly from UE1 (without adaptation layer info) or Direct Communication Request message via UE-to-UE relay (with adaptation layer info).
4a. Target UE3 is interested in the announced application, it triggers the per-hop link establishment with the UE-to-UE Relay if there is not existing per-hop link between UE3 and UE-to-UE Relay. UE3 sends a per-hop link establishment procedure message with its Layer-2 ID as the source and the Layer-2 ID from the relay as the destination.
NOTE 4: Whether per-hop link update is performed if there is existing per-hop link can be determined in normative phase.
4b. The per-hop link establishment procedure is performed between the UE-to-UE relay and UE1, if there is not an existing per-hop link between the UE-to-UE relay and UE1. UE1 puts its Layer-2 ID as the source and Relay Layer-2 ID as the destination.
5. If step 4a is successful, E2E Authentication and security establishment messages are exchanged between UE1 and UE3 via the UE-to-UE Relay. including the Adaptation layer identifying the source and/or destination UE. At the reception of this first message from UE3 via the Relay, the per-hop link establishment procedure is performed between the UE-to-UE relay and UE1, if there is not an existing per-hop link between the UE-to-UE relay and UE1.
Editor's note: The Details of the authentication and security procedure will be investigated by SA WG3 group.
NOTE 5: Step4b is triggered by step 5 when the UE-1 receives first security message from UE-3.
6. Once the end-to-end security is established between UE3 and UE1, UE3 completes the end-to-end link establishment between UE3 and UE1 by sending an E2E unicast Direct Communication Accept message including the Adaptation layer info identifying UE1.
7. UE-to-UE Relay forwards the E2E unicast Direct Communication Accept message, including the Adaptation layer info identifying UE3.
NOTE 6: The details of the Adaptation layer information identifying the Source UE and Target UEs, and how to differentiate the E2E PC5-S message from the per-hop PC5-S message will be defined in cooperation with RAN WGs during normative phase.
8. An "extended" unicast link has been established between UE1 and UE3, via the UE-to-UE Relay. The extended link is secured end to end, i.e. a security association has been created between UE1 and UE3. Confidentiality and/or integrity/replay protected messages (i.e. data or PC5-S) may be exchanged between UE1 and UE3. The UE-to-UE Relay is not involved in the security association thus it cannot read nor modify the secured portion of the message (which excludes the source and destination fields).

In addition, the UE-to-UE Layer-2 Relay operation is also supported with the following principles:
UE-to-UE Relay selection.
  It may be the situation where multiple UE-to-UE relays can be used to achieve the indirect communication between the target UE and source UE. The selection of the UE-to-UE Relay may be based on local configured rules on the UE, or based on other UE-to-UE Relay selection solutions, e.g. "UE-to-UE Relay Selection Without Relay Discovery" described in clause 6.8.
QoS handling.
  During the process of the connection establishment between the Source UE1 and the Target UE3, the Source UE1 negotiates the PC5 QoS parameters with Target UE3 for fulfilling E2E QoS requirements. After the E2E QoS negotiations as part of the E2E extended unicast link establishment/setup, as described in Solution #31, PC5 QoS parameters for PC5 link between the Source UE and UE-to-UE Relay UE and PC5 link between the UE-to-UE Relay UE and Target UE are determined. AS layer configurations for PC5 QoS parameters in each PC5 link can be achieved according to legacy mechanisms in Rel-16 V2X.

QoS flow concept in particular can be reused between the Source UE and the Target UE, where the UE-to-UE Relay UE performs the necessary adaptation between two PC5 interfaces, i.e. PC5 for the Source UE and UE-to-UE Relay UE and PC5 for the UE-to-UE Relay UE and Target UE.

Editor's note: The details of the adaptation between two PC5 interfaces are confirmed by RAN WG2.

Charging support.

The charging for Source UE and Target UE can be based on charging usage information configuration and UE reporting usage information. Solution for charging usage information configuration can reuse the PCF based solution, i.e., Solution #14. Solution for UE reporting usage information can reuse SMF based or AMF based solution, i.e., Solution #13 or Solution #15.

6.9.2.1.2 Connection Establishment after UE-to-UE Relay Discovery and Selection

FIG. 6.9.2.1.2-1 shows the connection establishment procedure after UE-to-UE relay discovery and selection. The UE-to-UE relay discovery can be Model A or Model B. For the Model B, this procedure corresponds to the Alternative 2 in Clause 6.8.2.2 of Solution #8, where the UE-to-UE relay discovery and selection is integrated into Model B direct discovery procedure.

Figure 13:
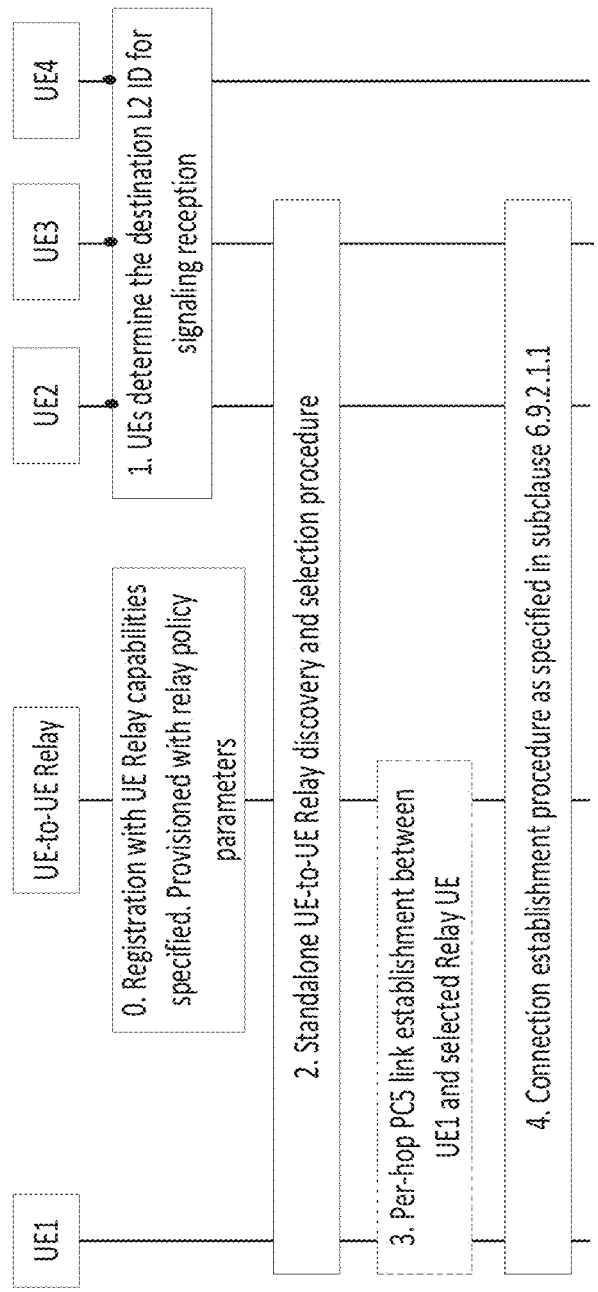
FIG. 13 is a reproduction of FIG. 6.9.2.1.2-1 of 3GPP TR 23.752 V2.0.0.

FIG. 6.9.2.1.2-1 of 3GPP TR 23.752 V2.0.0, Entitled "Connection Establishment Procedure after UE-to-UE Relay Discovery and Selection", is Reproduced as FIG. 13

The Step 0 and Step 1 are same as the steps described in clause 6.9.2.1.1.

2. The standalone UE-to-UE relay discovery and relay selection is performed, including the Model A or Model B.
3. If there is not an existing per-hop link between the UE1 and the selected Relay UE, UE1 establishes a new per-hop link with the selected Relay UE.
4. The E2E unicast Direct Communication Request message is sent from UE1 to the selected Relay via the per-hop link (established in steps 3) and the Adaptation layer info identifying the peer UE (UE3) as the destination. The UE-to-UE Relay transfers the E2E messages based on the identity information of peer UE in the Adaptation Layer. The initiator (UE1) knows the Adaptation layer info identifying the peer UE (UE3) after a discovery procedure. UE3 responds with E2E unicast Direct Communication Accept message in the same way. If there is not existing per-hop link between the Relay and UE3, the UE3 establishes per-hop.

NOTE: Whether per-hop link establishment between the Relay and UE3 can be triggered by UE3 or Relay will be determined in normative phase.

6.9.2.2 Connection Management 6.9.2.2.1 Link Identifier Update via a Management Link with the UE-to-UE Relay FIG. 6.9.2.2-1 shows the link identifier update procedure when an extended PC5 link is used. The procedure uses a management link established between UE1 and the UE-to-UE Relay serving this extended link and another management link established between UE2 and the same UE-to-UE Relay.

NOTE: The details of the link identifier update procedure can be aligned during normative phase.

Figure 14:
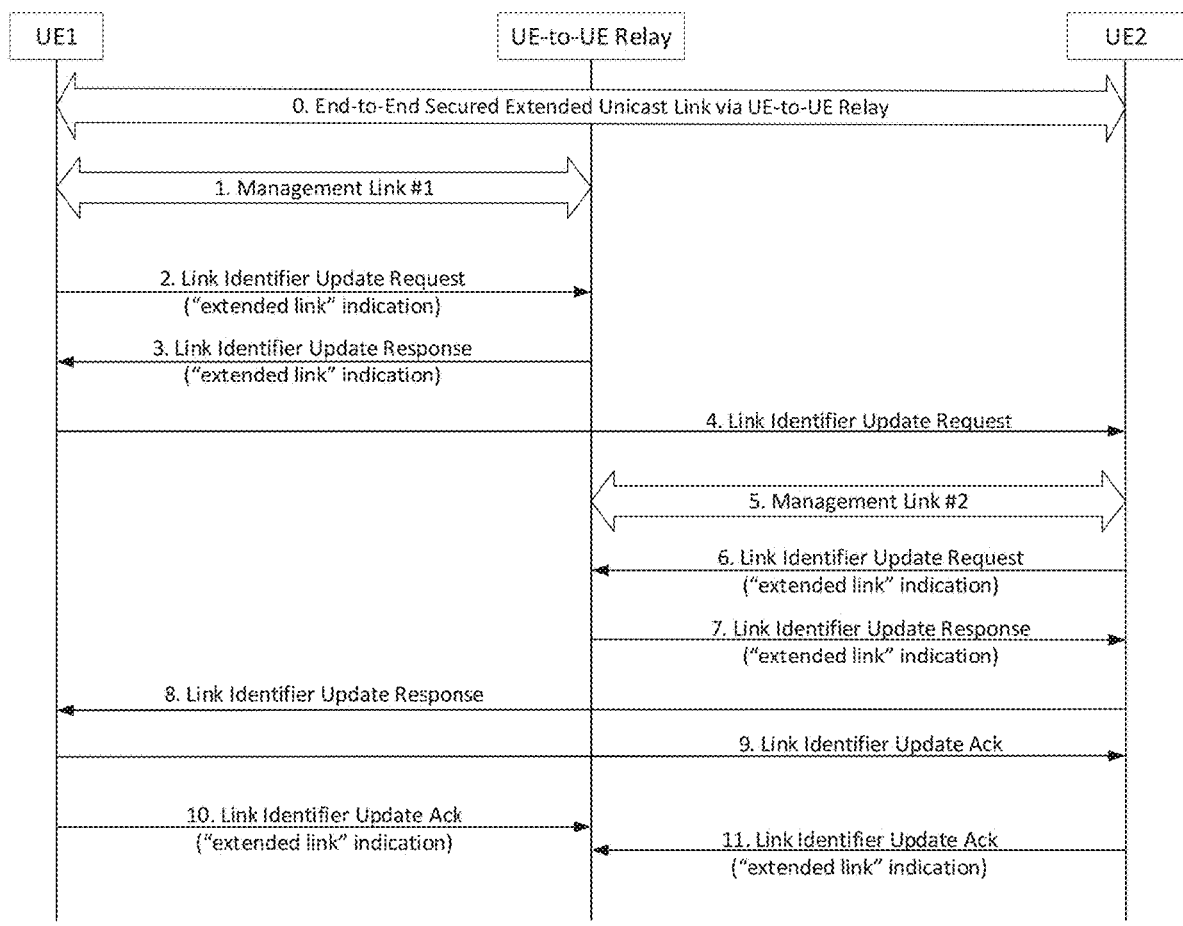
FIG. 14 is a reproduction of FIG. 6.9.2.1.2-1 of 3GPP TR 23.752 V2.0.0.

FIG. 6.9.2.2-1 of 3GPP TR 23.752 V2.0.0, Entitled "Link Identifier Update Procedure Via a Management Link with a UE-to-UE Relay", is Reproduced as FIG. 14

0) An "extended" unicast link is established between two peer UEs via a UE-to-UE Relay, i.e. as described in clause 6.9.2.1 with end-to-end security enabled.
1) UE1 receives a trigger (e.g. privacy timer expiry or Application Layer ID change) to update its identifiers (i.e. Layer-2 ID, security information, Application Layer ID or IP address/prefix) associated to the extended link with UE2. The management link between UE1 and UE-to-UE Relay has already been established.
2) UE1 updates its identifiers (i.e. Layer-2 ID, security information and optionally Application Layer ID and IP address/prefix) and sends a Link Identifier Update Request message to the UE-to-UE Relay via the management link. The message includes UE1's new Layer-2 ID and an indication (e.g. "extended link" indication) which specifies that the message is related to an extended link, i.e. it does not apply to the management link per se. The message also includes the UE-to-UE Relay's Layer-2 ID and UE1's Layer-2 ID used to identify the extended link.
   a. Other identifiers (i.e. security info, Application Layer ID and IP address/prefix) are not included since they are not used by the UE-to-UE Relay and should not be exposed to the UE-to-UE Relay.
3) UE-to-UE Relay saves UE1's new Layer-2 ID in its mapping table, while preserving the current one, and updates its own Layer-2 ID to replace the current UE-to-UE Relay L2 ID used on the extended link and known by UE2. It replies with Link Identifier Update Response message including its new UE-to-UE Relay Layer-2 ID and the "extended link" indication.
4) UE1 sends a Link Identifier Update Request message to UE2 including the new UE-to-UE Relay L2 ID received at step 3, UE1's updated security information and optionally new Application Layer ID and IP address/prefix.
   a. The Link Identifier Update Request message is used as usual, except for the new L2 ID parameter that carries the new UE-to-UE Relay L2 ID to be used by UE2.
5) UE2 keeps track of the received parameters. The management link between UE2 and the UE-to-UE Relay has already been established.
6) As for UE1 in step 2, UE2 updates its identifiers associated to the extended link with UE1 and sends a Link Identifier Update Request message to UE-to-UE Relay via the management link. The Link Identifier Update Request message includes the "extended link" indication, the current UE-to-UE Relay's Layer-2 ID and UE2's Layer-2 ID (to identify the extended link) as well as UE2's new Layer-2 ID associated to the extended link.
7) UE-to-UE Relay saves UE2's new Layer-2 ID in its mapping table, while preserving the current one, and updates its own Layer-2 ID to replace the current UE-to-UE Relay L2 ID used on the extended link and known by UE1. It replies with Link Identifier Update Response message including its new UE-to-UE Relay Layer-2 ID and the "extended link" indication.

8) UE2 sends a Link Identifier Update Response message to UE1 including the new UE-to-UE Relay L2 ID received at step 7, UE2's updated security information and optionally new Application Layer ID and IP address/prefix. UE2 also includes the parameters received on the Link Identifier Update Request message at step 4.
9) UE1 keeps track of the received updated parameters from UE2 and sends a Link Identifier Update Ack message to UE2, including the parameters received on the Link Identifier Update Response message at step 8.
10) UE1 sends a Link Identifier Update Ack message to the UE-to-UE Relay, including the new UE-to-UE Relay Layer-2 ID received at step 3 and the "extended link" indication. UE2 sends a Link Identifier Update Ack message to the UE-to-UE Relay, including the new UE-to-UE Relay Layer-2 ID received at step 7 and the "extended link" indication. All UEs (i.e. UE1, UE2 and UE-to-UE Relay) start using the new Layer-2 IDs, new security information and optionally new Application Layer ID and new IP address/prefix.

6.9.3 Impacts on Services, Entities and Interfaces

The solution has impacts in the following entities:

UE:
  Needs to support procedures for ProSe 5G UE-to-UE Relay and communications via a ProSe 5G UE-to-UE Relay.
  Needs to support procedures for extended communication management, via communication with a ProSe 5G UE-to-UE Relay.

3GPP TS 38.323 states:

5.8 Ciphering and Deciphering

The ciphering function includes both ciphering and deciphering and is performed in PDCP, if configured. The data unit that is ciphered is the MAC-I (see clause 6.3.4) and the data part of the PDCP Data PDU (see clause 6.3.3) except the SDAP header and the SDAP Control PDU if included in the PDCP SDU. The ciphering is not applicable to PDCP Control PDUs.

For downlink and uplink, the ciphering algorithm and key to be used by the PDCP entity are configured by upper layers TS 38.331 [3] and the ciphering method shall be applied as specified in TS 33.501 [6].

The ciphering function is activated/suspended/resumed by upper layers TS 38.331 [3]. When security is activated and not suspended, the ciphering function shall be applied to all PDCP Data PDUs indicated by upper layers TS 38.331 [3] for the downlink and the uplink, respectively.

For DAPS bearers, the PDCP entity shall perform the ciphering or deciphering for the PDCP SDU using the ciphering algorithm and key either configured for the source cell or configured for the target cell, based on to/from which cell the PDCP SDU is transmitted/received.

For downlink and uplink ciphering and deciphering, the parameters that are required by PDCP for ciphering are defined in TS 33.501 [6] and are input to the ciphering algorithm. The required inputs to the ciphering function include the COUNT value, and DIRECTION (direction of the transmission: set as specified in TS 33.501 [6]). The parameters required by PDCP which are provided by upper layers TS 38.331 [3] are listed below:
  BEARER (defined as the radio bearer identifier in TS 33.501 [6]. It will use the value RB identity-1 as in TS 38.331 [3]);
  KEY (the ciphering keys for the control plane and for the user plane are $K_{RRCenc}$ and $K_{UPenc}$, respectively).

For NR sidelink communication, the ciphering algorithm and key to be used by the PDCP entity are configured by upper layers as specified in TS 24.587 [16] and the ciphering method shall be applied as specified in TS 33.536 [14].

For NR sidelink communication, the ciphering function is activated for sidelink SRBs (except for SL-SRB0) and/or sidelink DRBs for a PC5 unicast link by upper layers, as specified in TS 38.331 [3]. When security is activated for sidelink SRBs, the ciphering function shall be applied to all PDCP Data PDUs (except for carrying Direct Security Mode Command message as specified in TS 33.536 [14]) for the sidelink SRBs which belong to the PC5 unicast link. When security is activated for sidelink DRBs, the ciphering function shall be applied to all PDCP Data PDUs for the sidelink DRBs which belong to the PC5 unicast link.

For NR sidelink communication, the ciphering and deciphering function as specified in TS 33.536 [14] is applied with KEY (NRPEK), COUNT, BEARER (LSB 5 bits of LCID as specified in TS 38.321 [4]) and DIRECTION (which value shall be set is specified in TS 33.536 [14]) as input.

3GPP TR 38.836 states:

5 Sidelink-Based UE-to-UE Relay 5.1 Scenario, Assumption and Requirement

The UE-to-UE Relay enables the coverage extension of the sidelink transmissions between two sidelink UEs and power saving. The coverage scenarios considered in this study are the following:
  1) All UEs (Source UE, Relay UE, Destination UE) are in coverage.
  2) All UEs (Source UE, Relay UE, Destination UE) are out-of-coverage.
  3) Partial coverage whereby at least one of the UEs involved in relaying (Source UE, Relay UE, Destination UE) is in-coverage, and at least one of the UEs involved in relaying is out-of-coverage.

RAN2 will strive for a common solution to the in- and out-of-coverage cases. For the UE-to-UE Relay, the scenario where UEs can be in coverage of the different cell is supported.

FIGS. 5.1-1 shows the scenarios considered for UE-to-UE Relay. In FIGS. 5.1-1, coverage implies that the Source/Destination UE and/or UE-to-UE Relay UE are in coverage and can access the network on Uu.

Figure 15:
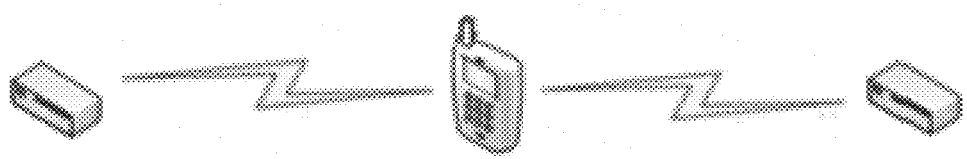
FIG. 15 is a reproduction of FIGS. 5.1-1 of 3GPP TR 38.836 V17.0.0.

FIGS. 5.1-1 of 3GPP TR 38.836 V17.0.0, Entitled "Scenarios for UE-to-UE Relay (where the Coverage Status is not Shown)", is Reproduced as FIG. 15

NR sidelink is assumed on PC5 between the Remote UE(s) and the UE-to-UE Relay.

Cross-RAT configuration/control of Source UE, UE-to-UE Relay and Destination UE is not considered, i.e., eNB/ng-eNB do not control/configure an NR Source UE, Destination UE or UE-to-UE Relay UE. For UE-to-UE Relay, this study focuses on unicast data traffic between the Source UE and the Destination UE.

Configuring/scheduling of a UE (Source UE, Destination UE or UE-to-UE Relay UE) by the SN to perform NR sidelink communication is out of scope of this study.

For UE-to-UE Relay, it is assumed that the Remote UE has an active end-to-end connection via only a single Relay UE at a given time.

Relaying of data between a Source UE and a Destination UE can occur once a PC5 link is established between the Source UE, UE-to-UE Relay, and Destination UE.

No restrictions are assumed on the RRC states of any UEs involved in UE-to-UE Relaying.

The requirement of service continuity is only for UE-to-Network Relay, but not for UE-to-UE Relay, during mobility in this release.

5.2 Discovery

Model A and model B discovery model as defined in clause 5.3.1.2 of TS 23.303 [3] are supported for UE-to-UE Relay, and integrated PC5 unicast link establishment procedure can be supported based on SA2 conclusion. The protocol stack of discovery message is described in FIGS. 5.2-1.

Figure 16:
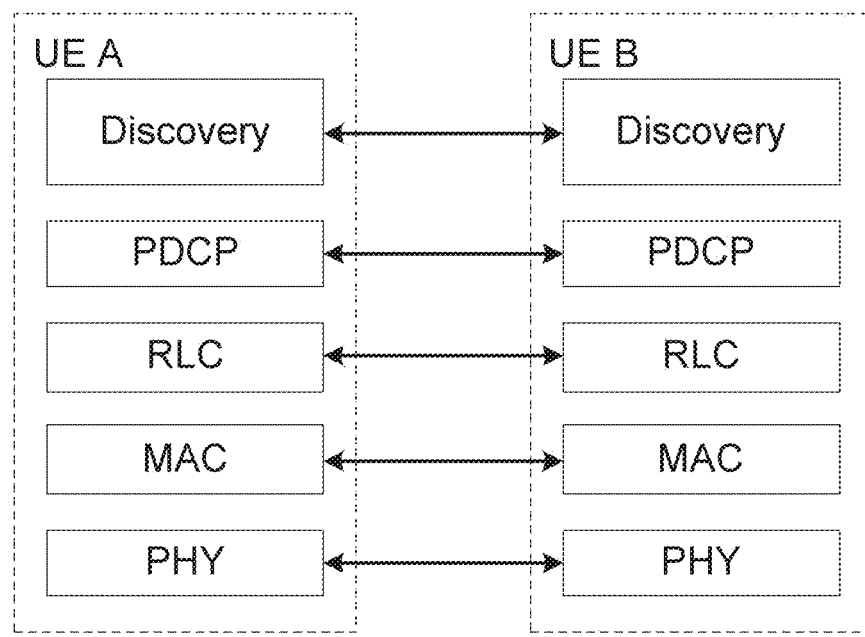
FIG. 16 is a reproduction of FIGS. 5.2-1 of 3GPP TR 38.836 V17.0.0.

FIGS. 5.2-1 of 3GPP TR 38.836 V17.0.0, Entitled "Protocol Stack of Discovery Message for UE-to-UE Relay", is Reproduced as FIG. 16

Relay UE or Remote UE is allowed to transmit discovery message when triggered by upper layer.

Both Remote UE and Relay UE can rely on pre-configuration unless relevant radio configuration is provided by network, either via system information or dedicated signalling.

Resource pool to transmit discovery message can be either shared with or separated from resource pool for data transmission.

For both shared resource pool and separated resource pool, a new LCID is introduced for discovery message i.e. discovery message is carried by a new SL SRB.

Within separated resource pool discovery messages are treated equally with each other during LCP procedure.

5.3 Relay (Re-)Selection Criteria and Procedure

The baseline solution for relay (re-)selection is as follow:

Radio measurements at PC5 interface are considered as part of relay (re)selection criteria.

Remote UE at least uses the radio signal strength measurements of sidelink discovery messages to evaluate whether PC5 link quality of a Relay UE satisfies relay selection and reselection criterion.

When Remote UE is connected to a Relay UE, it may use SL-RSRP measurements on the sidelink unicast link to evaluate whether PC5 link quality with the Relay UE satisfies relay reselection criterion.

Further details on the PC5 radio measurements criteria, e.g., in case of no transmission on the sidelink unicast link can be discussed in WI phase. How to perform RSRP measurement based on RSRP of discovery message and/or SL-RSRP if Remote UE has PC5-RRC connection with Relay UE can be decided in WI phase.

For relay (re-)selection, Remote UE compares the PC5 radio measurements of a Relay UE with the threshold which is configured by gNB or preconfigured. Higher layer criteria also need to be considered by Remote UE for relay (re-)selection, but details can be left to SA2 to decide. Relay (re-)selection can be triggered by upper layers of Remote UE.

Relay reselection should be triggered if the NR Sidelink signal strength of current Sidelink relay is below a (pre) configured threshold. Also, relay reselection may be triggered if RLF of PC5 link with current Relay UE is detected by Remote UE.

The above-described baseline for relay (re)selection apply to both L2 and L3 relay solutions.

Additional AS layer criteria can be considered in WI phase for both L2 and L3 UE-to-UE Relay solutions.

For relay (re-)selection, when Remote UE has multiple suitable Relay UE candidates which meet all AS-layer & higher layer criteria and Remote UE need to select one Relay UE by itself, it is up to UE implementation to choose one Relay UE.

As captured in TR 23.752, solution #8 and solution #50 in TR 23.752 are taken as baseline solution for L2 and L3 UE-to-UE Relay reselection, and solution #8 and solution #11 in TR 23.752 are taken as baseline solution for L3 UE-to-UE Relay selection.

5.4 Relay/Remote UE Authorization

RAN2 concludes that authorization of both Relay UE and Remote UE has no RAN2 impact.

5.5 Layer-2 Relay 5.5.1 Architecture and Protocol Stack

For L2 UE-to-UE Relay architecture, the protocol stacks are similar to L2 UE-to-Network Relay other than the fact that the termination points are two Remote UEs. The protocol stacks for the user plane and control plane of L2 UE-to-UE Relay architecture are described in FIG. 5.5.1-1 and FIG. 5.5.1-2.

An adaptation layer is supported over the second PC5 link (i.e. the PC5 link between Relay UE and Destination UE) for L2 UE-to-UE Relay. For L2 UE-to-UE Relay, the adaptation layer is put over RLC sublayer for both CP and UP over the second PC5 link. The sidelink SDAP/PDCP and RRC are terminated between two Remote UEs, while RLC, MAC and PHY are terminated in each PC5 link.

Figure 17:
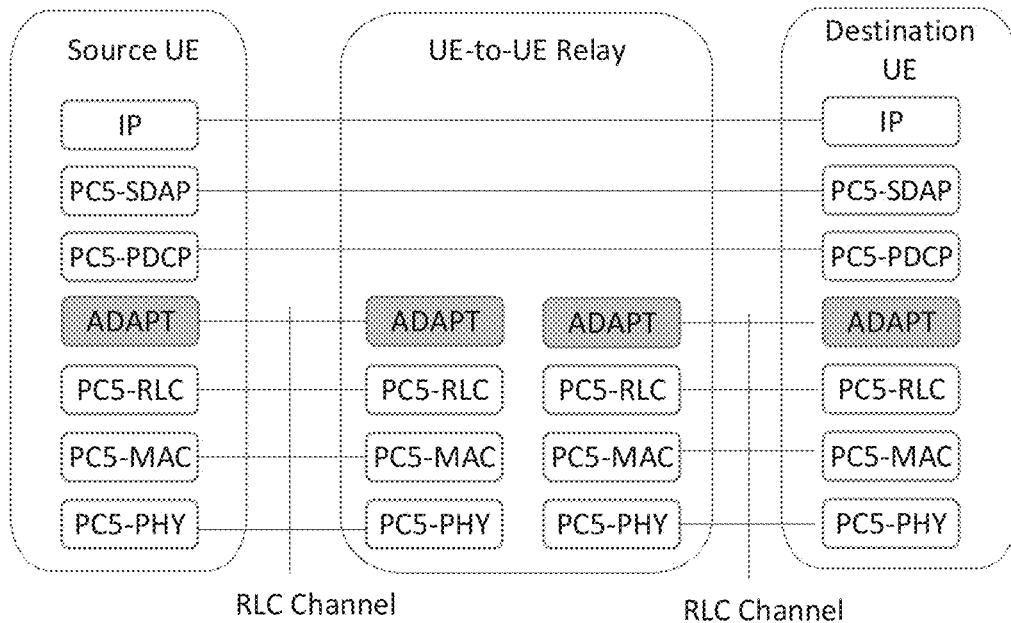
FIG. 17 is a reproduction of FIG. 5.5.1-1 of 3GPP TR 38.836 V17.0.0.

FIG. 5.5.1-1 of 3GPP TR 38.836 V17.0.0, Entitled "User Plane Protocol Stack for L2 UE-to-UE Relay", is Reproduced as FIG. 17

Figure 18:
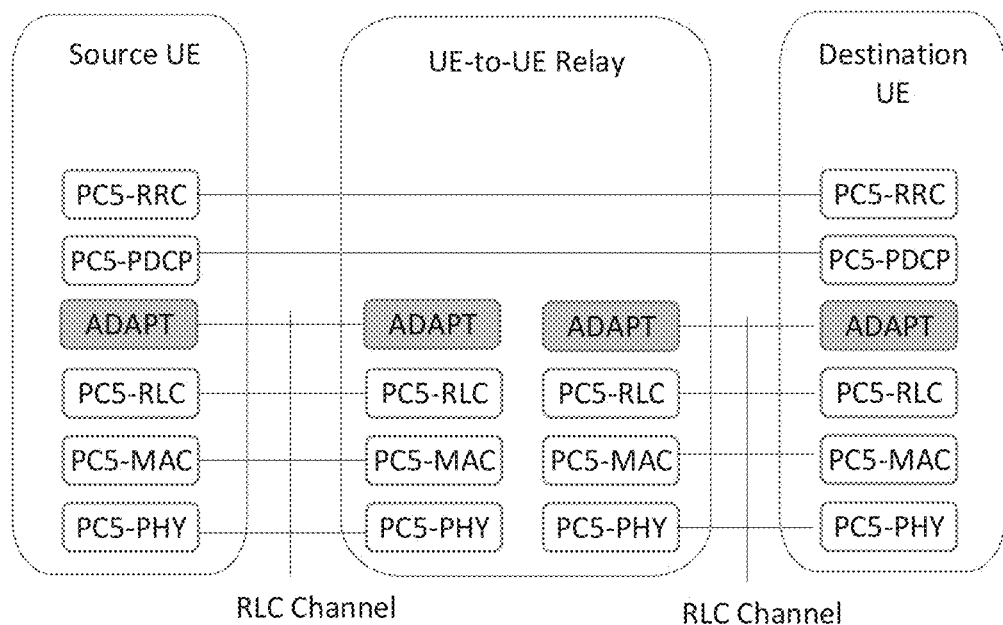
FIG. 18 is a reproduction of FIG. 5.5.1-2 of 3GPP TR 38.836 V17.0.0.

FIG. 5.5.1-2 of 3GPP TR 38.836 V17.0.0, entitled "Control plane protocol stack for L2 UE-to-UE Relay", is reproduced as FIG. 18

For the first hop of L2 UE-to-UE Relay:

The N:1 mapping is supported by first hop PC5 adaptation layer between Remote UE SL Radio Bearers and first hop PC5 RLC channels for relaying.

The adaptation layer over first PC5 hop between Source Remote UE and Relay UE supports to identify traffic destined to different Destination Remote UEs.

For the second hop of L2 UE-to-UE Relay:

The second hop PC5 adaptation layer can be used to support bearer mapping between the ingress RLC channels over first PC5 hop and egress RLC channels over second PC5 hop at Relay UE.

PC5 Adaptation layer supports the N:1 bearer mapping between multiple ingress PC5 RLC channels over first PC5 hop and one egress PC5 RLC channel over second PC5 hop and supports the Remote UE identification function.

For L2 UE-to-UE Relay:

The identity information of Remote UE end-to-end Radio Bearer is included in the adaptation layer in first and second PC5 hop.

In addition, the identity information of Source Remote UE and/or the identity information of Destination Remote UE are candidate information to be included in the adaptation layer, which are to be decided in WI phase.

5.5.2 QoS

QoS handling for L2 UE-to-UE Relay is subject to upper layer, e.g. solution #31 in TR 23.752 studied by SA2.

5.5.3 Security

As described in clause 6.9.1.2 (Solution #9) of TR 23.752, in case of L2 UE-to-UE Relay, the security is established at PDCP layer in an end to end manner between UE1 and UE2. Security aspects require confirmation from SA3.

5.5.4 Control Plane Procedure

RAN2 consider the SA2 solution in TR 23.752[6] as baseline. Further RAN2 impacts can be discussed in WI phase, if any.

According to 3GPP TS 23.287, a UE (e.g. UE1) may perform a PC5 unicast link establishment procedure (e.g. Layer-2 link establishment) with a peer UE (e.g. UE2) for establishing a unicast link between these two UEs. Basically, the Layer-2 ID of the peer UE, identified by the Application Layer ID of the peer UE, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link (i.e. Direct Communication Request) may use the known Layer-2 ID of the peer UE, or a default destination Layer-2 ID associated with the V2X service type (e.g. PSID/ITS-AID) configured for PC5 unicast link establishment. During the PC5 unicast link establishment procedure, Layer-2 IDs of the two UEs could be exchanged and used for future communication between the two UEs.

In addition, according to 3GPP C1-202875, the two UEs could exchange security information to each other during the PC5 unicast link establishment so that the two UEs could use the negotiated security algorithm and/or key(s) for protection of the content of traffic (including e.g. PC5-S signalling, PC5-RRC signalling, and/or PC5 user plane data) sent over the PC5 unicast link.

Figure 19:
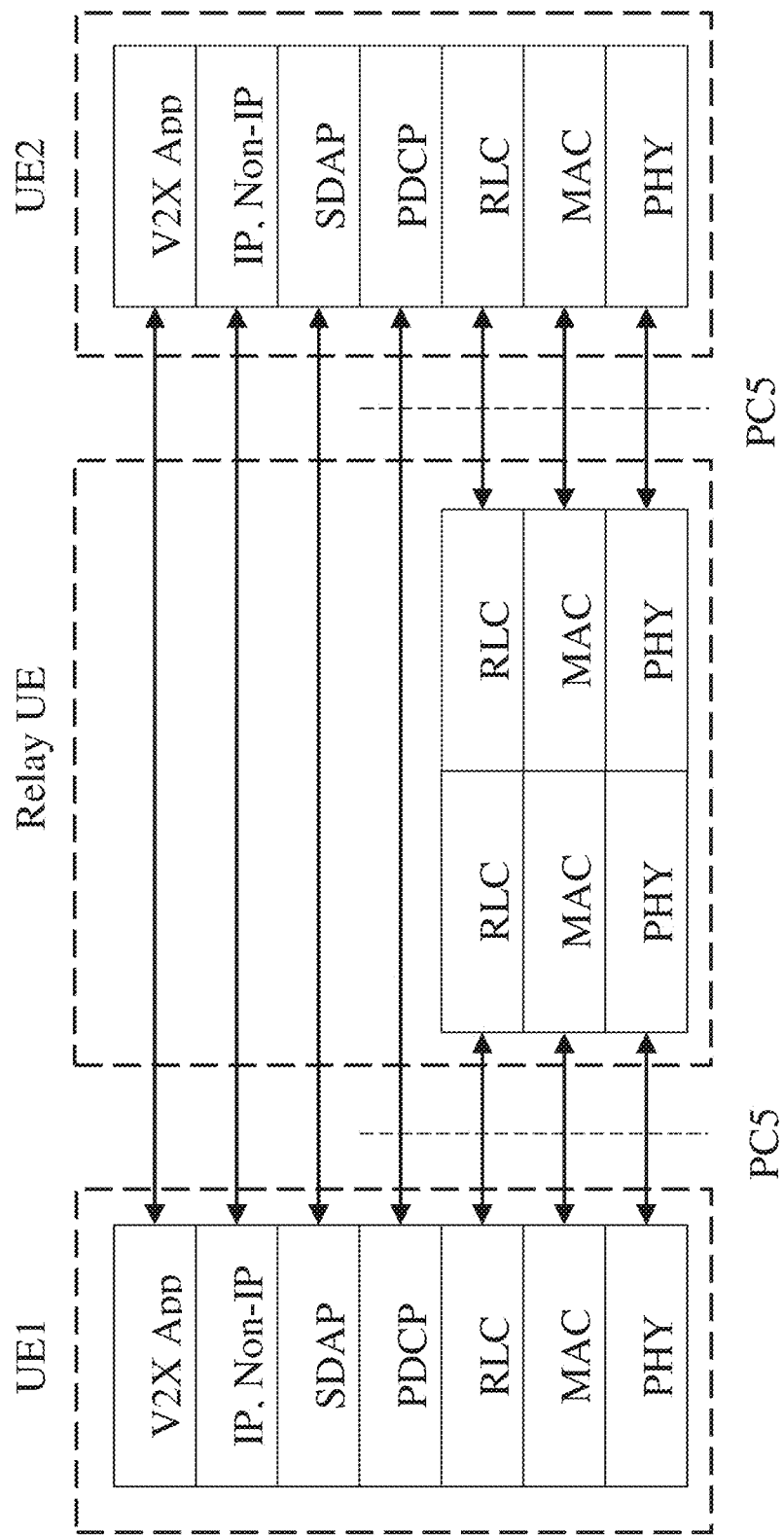
FIG. 19 illustrates an example of user plane protocol stacks for User Equipment-to-User Equipment (UE-to-UE) Relay communication according to one exemplary embodiment.
Figure 20:
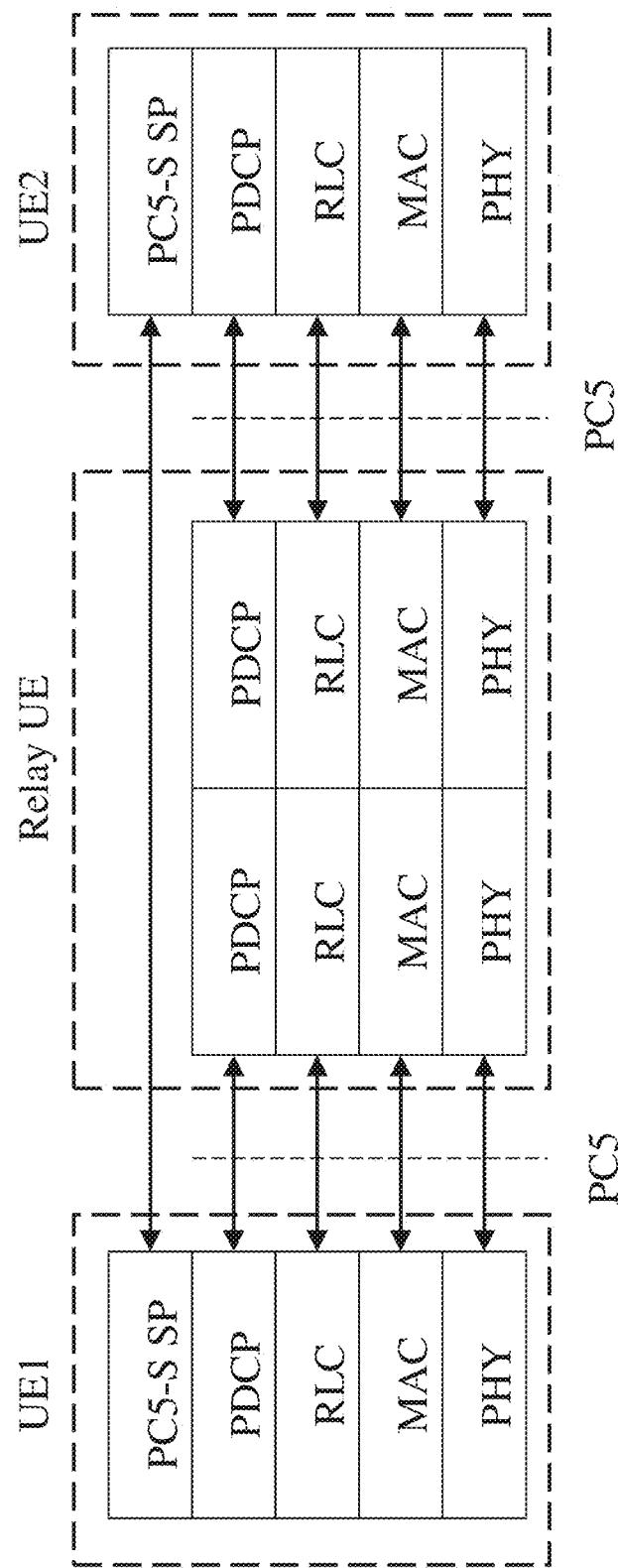
FIG. 20 illustrates an example of control plane protocol stacks for UE-to-UE Relay communication according to one exemplary embodiment.

According to 3GPP TS 23.752, the UE-to-UE Relay will be supported for sidelink communication, which means one or more than one relay UEs may be used to support data communication between two UEs in case these two UEs cannot communicate with each other directly. For privacy, the content of traffic communicated between the two UEs cannot be read or known by Relay UE(s). Therefore, it is supposed that a security context for protection of user plane (session traffic sent on SL DRB(s)) over the two UEs should be isolated from a security context established between a Relay UE and each of these two UEs. It is also supposed that some PC5-S signalling not related to the Relay UE (i.e. these PC5-S signalling sent on SL SRB(s) may be exchanged between UE1 and UE2) could be also protected by the security context established for protection of user plane. With this consideration, an example of protocol stacks for user plane and control plane could be illustrated in FIG. 19 and FIG. 20 respectively. In general, FIG. 19 illustrates an example of user plane protocol stacks for UE-to-UE Relay communication according to one embodiment, and FIG. 20 illustrates an example of control plane protocol stacks for UE-to-UE Relay communication according to one embodiment.

Figure 21:
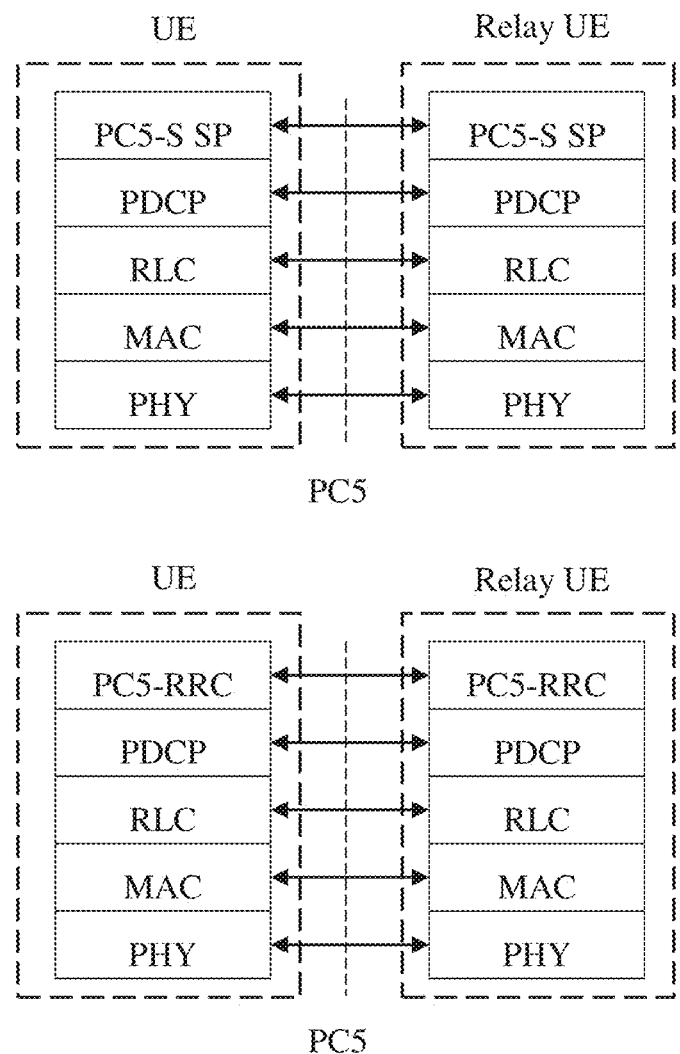
FIG. 21 illustrates an example of control plane protocol stacks for UE-to-UE Relay communication according with one exemplary embodiment.

Furthermore, some PC5-S signalling and/or PC5-RRC signalling could be protected by a security context established between a relay UE and each of the two UEs. For example, UE1 and a Relay UE could establish a first security context for protecting some PC5-S signalling and/or PC5-RRC signalling used for control or maintenance of a first leg in a UE-to-UE Relay communication, while UE2 and the Relay UE could establish a second security context for protecting some PC5-S signalling and/or PC5-RRC signalling used for control or maintenance of a second leg in the UE-to-UE Relay communication. Examples of protocol stacks for these cases could be illustrated in FIG. 21. In general, FIG. 21 illustrates an example of control plane protocol stacks for UE-to-UE Relay communication according with one embodiment.

Based on above working assumptions, how to support the relay communication on top of the current sidelink communication should be considered.

Scenario: Switch from "Direct Communication Mode" to "Relay Communication Mode"

Basically, session transfer between the two UEs may start from PC5 unicast link communication. Possibly, the two UEs may move when they are performing the PC5 unicast link communication. And the two UEs may become too far to successfully receive sidelink packets from peer UE. In this situation, transmissions of Radio Link Control (RLC) Packet Data Units (PDUs) will achieve the maximum retransmission times. To this end, sidelink radio link failure (RLF) will be declared, and a PC5-RRC connection between the two UEs will be released due to sidelink RLF. And then, the release of the PC5-RRC connection will be indicated to upper layers of the two UEs. Currently, the upper layers consider the PC5 unicast link communication is not available so that the upper layers stop the traffic session over the PC5 unicast link.

In case of supporting relay communication mode (two UEs communicate each other via a Relay UE), when direct communication mode (two UEs communicate each other directly) becomes unavailable, the traffic session could be continued on relay communication mode. Switching to relay communication mode may be triggered by e.g. distance between the two UEs. According to 3GPP TS 23.752, one or more than one Relay UEs could be known by other UEs in the proximity beforehand through, for example, a notification message or discovery broadcasted by these Relay UEs, and these Relay UEs may be available for supporting relay communication. UE1 and UE2 could perform a procedure used to determine a Relay UE for their relay communication.

After a candidate Relay UE is selected or determined, UE1 and UE2 could further perform a procedure used for connecting Relay UE. Since the both UEs have known the selected candidate Relay UE, each of the both UEs can perform the procedure used for connecting Relay UE independently. When each of the both UEs completes the procedure used for connecting Relay UE, the upper layers (e.g. V2X layer or SL Layer) of each UE could pass a Layer-2 ID of this UE and a Layer-2 ID of the selected candidate Relay UE to lower layers (including, for example, Radio Resource Control (RRC) layer, Service Data Adaptation Protocol (SDAP) layer, Packet Data Convergence Protocol (PDCP) layer, Radio Link Control (RLC) layer, Medium Access Control (MAC) layer, and/or Physical (PHY) layer) for transmission and/or reception sidelink packets between this UE and the selected candidate Relay UE.

According to 3GPP TS 38.331, a UE transmits a PC5 Radio Resource Control (RRC) Reconfiguration message (e.g. RRCReconfigurationSidelink) to a peer UE for configuring one or more sidelink Data Radio Bearers (DRBs) if the UE has sidelink packets to be transmitted to the peer UE. More specifically, each of these sidelink DRBs (established by the UE) is associated with one sidelink logical channel, and this sidelink DRB or sidelink logical channel uses one sidelink logical channel identity which is assigned by the UE. For UE-to-UE Relay communication, each sidelink packet transmitted from UE1 to UE2 via a Relay UE will be protected by security context established between UE1 and UE2. When ciphering these sidelink packets to be transmitted to UE2 via the Relay UE, UE1 could require some other information in addition to a security key in the security context. For example, the other information could include sidelink logical channel identity (associated with one sidelink radio bearer used for transmission of these sidelink packets).

Similarly, UE2 also requires this information to decipher these received sidelink packets. Since these sidelink packets are transmitted from UE1 to the Relay UE on a first sidelink radio bearer or logical channel and then transmitted from the Relay UE to UE2 on a second sidelink radio bearer or logical channel, the sidelink logical channel identity of the first sidelink radio bearer or logical channel should be the same as the sidelink logical channel identity of the second radio bearer or logical channel. Therefore, when the Relay UE configures UE2 to establish the second sidelink radio bearer or logical channel (through RRCReconfigurationSidelink sent from the Relay UE to UE2), the Relay UE cannot assign a new sidelink logical channel identity for the second sidelink radio bearer or logical channel. Instead, the Relay UE could still assign the sidelink logical channel identity of the first sidelink radio bearer or logical channel for the second sidelink radio bearer or logical channel. More specifically, UE1 may send a first RRCReconfigurationSidelink message to the Relay UE to establish the first sidelink radio bearer or logical channel.

The first RRCReconfigurationSidelink message sent from UE to the Relay UE could include one Sidelink Radio Bearer (SLRB) configuration of the first sidelink radio bearer or logical channel and a sidelink logical channel identity assigned (by UE1) to the first sidelink radio bearer or logical channel. More specifically, the Relay UE may send a second RRCReconfigurationSidelink message to UE2 to establish the second sidelink radio bearer or logical channel.

The second RRCReconfigurationSidelink message sent from the Relay UE to UE2 could include one SLRB configuration of the second sidelink radio bearer or logical channel and the second sidelink radio bearer or logical channel could be assigned to or set to the sidelink logical channel identity of the first sidelink radio bearer or logical channel. More specifically, the first sidelink radio bearer or logical channel may have been configured and/or established before configuring the second sidelink radio bearer or logical channel. Such SLRB configuration could include, for example, SDAP configuration, PDCP configuration, RLC configuration and/or MAC configuration for the associated sidelink radio bearer or logical channel. Such sidelink packet could be a IP packet, a non-IP packet, a SDAP PDU and/or a PDCP PDU.

Figure 22:
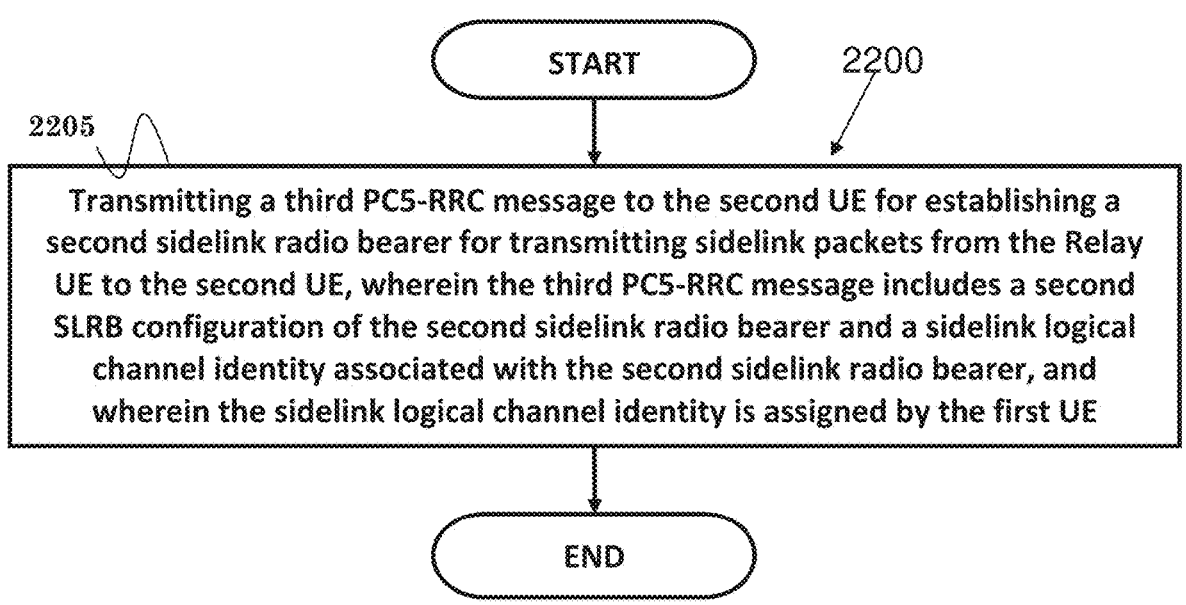
FIG. 22 is a flow chart according to one exemplary embodiment.

FIG. 22 is a flow chart 2200 according to one exemplary embodiment from the perspective of a Relay UE for establishing one or more sidelink radio bearers for forwarding sidelink packets from a first UE to a second UE. In step 2205, the Relay UE transmits a third PC5-RRC message to the second UE for establishing a second sidelink radio bearer for transmitting sidelink packets from the Relay UE to the second UE, wherein the third PC5-RRC message includes a second SLRB configuration of the second sidelink radio bearer and a sidelink logical channel identity associated with the second sidelink radio bearer, and wherein the sidelink logical channel identity is assigned by the first UE.

In one embodiment, the Relay UE could receive a first PC5-RRC message from the first UE for establishing a first sidelink radio bearer for transmitting sidelink packets from the first UE to the Relay UE, wherein the first PC5-RRC message includes a first SLRB configuration of the first sidelink radio bearer and the sidelink logical channel identity associated with the first sidelink radio bearer. Furthermore, the Relay UE could transmit a second PC5-RRC message to the first UE, wherein the second PC5-RRC message is used to confirm that the Relay UE complies with the first PC5-RRC message. In addition, the Relay UE could receive a fourth PC5-RRC message from the second UE, wherein the fourth PC5-RRC message is used to confirm that the second UE complies with the third PC5-RRC message.

In one embodiment, the second PC5-RRC message could be sent after the fourth PC5-RRC message is received. The second PC5-RRC message could also be sent before the fourth PC5-RRC message is received. Furthermore, the first PC5-RRC message could be received before the third PC5-RRC message is sent.

In one embodiment, the first sidelink radio bearer and the second sidelink radio bearer could be associated with the same sidelink logical channel identity. The first or third PC5-RRC message could be RRCReconfigurationSidelink. The second or fourth PC5-RRC message could be RRCReconfigurationCompleteSidelink.

In one embodiment, the sidelink packets received on the first sidelink radio bearer could be transmitted on the second sidelink radio bearer. The first or second sidelink radio bearer could be a Sidelink (SL) DRB.

Referring back to FIGS. 3 and 4, in one exemplary embodiment of a first UE for establishing a first sidelink radio bearer for transmitting sidelink packets from the first UE to the Relay UE, wherein the first PC5-RRC message includes a first SLRB configuration of the first sidelink radio bearer and the sidelink logical channel identity associated with the first sidelink radio bearer. The first UE 300 includes a program code 312 stored in the memory 310. The CPU 308 could execute program code 312 to enable the first UE to transmit a third PC5-RRC message to the second UE for establishing a second sidelink radio bearer for transmitting sidelink packets from the Relay UE to the second UE, wherein the third PC5-RRC message includes a second SLRB configuration of the second sidelink radio bearer and a sidelink logical channel identity associated with the second sidelink radio bearer, and wherein the sidelink logical channel identity is assigned by the first UE. Furthermore, the CPU 308 can execute the program code 312 to perform all of the above-described actions and steps or others described herein.

Figure 23:
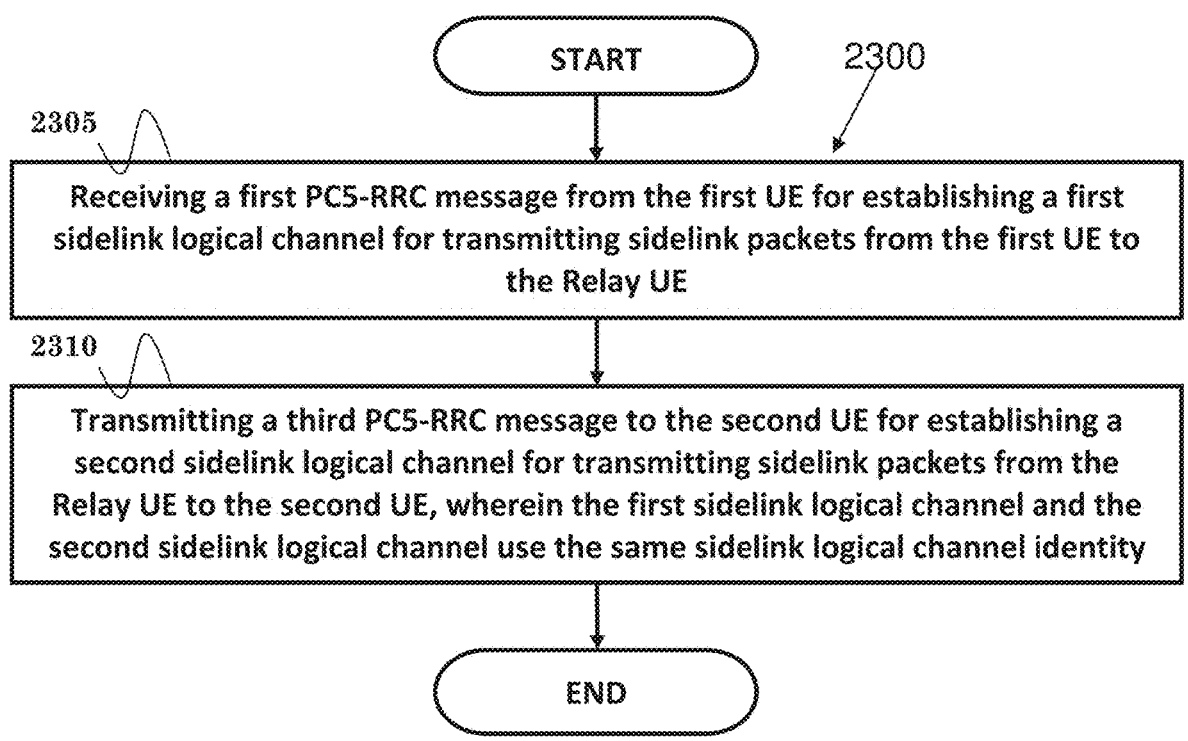
FIG. 23 is a flow chart according to one exemplary embodiment.

FIG. 23 is a flow chart 2300 according to one exemplary embodiment from the perspective of a Relay UE for establishing one or more sidelink logical channels for forwarding sidelink packets from a first UE to a second UE. In step 2305, the Relay UE receives a first PC5-RRC message from the first UE for establishing a first sidelink logical channel for transmitting sidelink packets from the first UE to the Relay UE. In step 2310, the Relay UE transmits a third PC5-RRC message to the second UE for establishing a second sidelink logical channel for transmitting sidelink packets from the Relay UE to the second UE, wherein the first sidelink logical channel and the second sidelink logical channel use the same sidelink logical channel identity.

Referring back to FIGS. 3 and 4, in one exemplary embodiment of a Relay UE for establishing one or more sidelink logical channels for forwarding sidelink packets from a first UE to a second UE. The Relay UE 300 includes a program code 312 stored in the memory 310. The CPU 308 could execute program code 312 to enable the Relay UE (i) to receive a first PC5-RRC message from the first UE for establishing a first sidelink logical channel for transmitting sidelink packets from the first UE to the Relay UE, and (ii)

to transmit a third PC5-RRC message to the second UE for establishing a second sidelink logical channel for transmitting sidelink packets from the Relay UE to the second UE, wherein the first sidelink logical channel and the second sidelink logical channel use the same sidelink logical channel identity. Furthermore, the CPU 308 can execute the program code 312 to perform all of the above-described actions and steps or others described herein.

Figure 24:
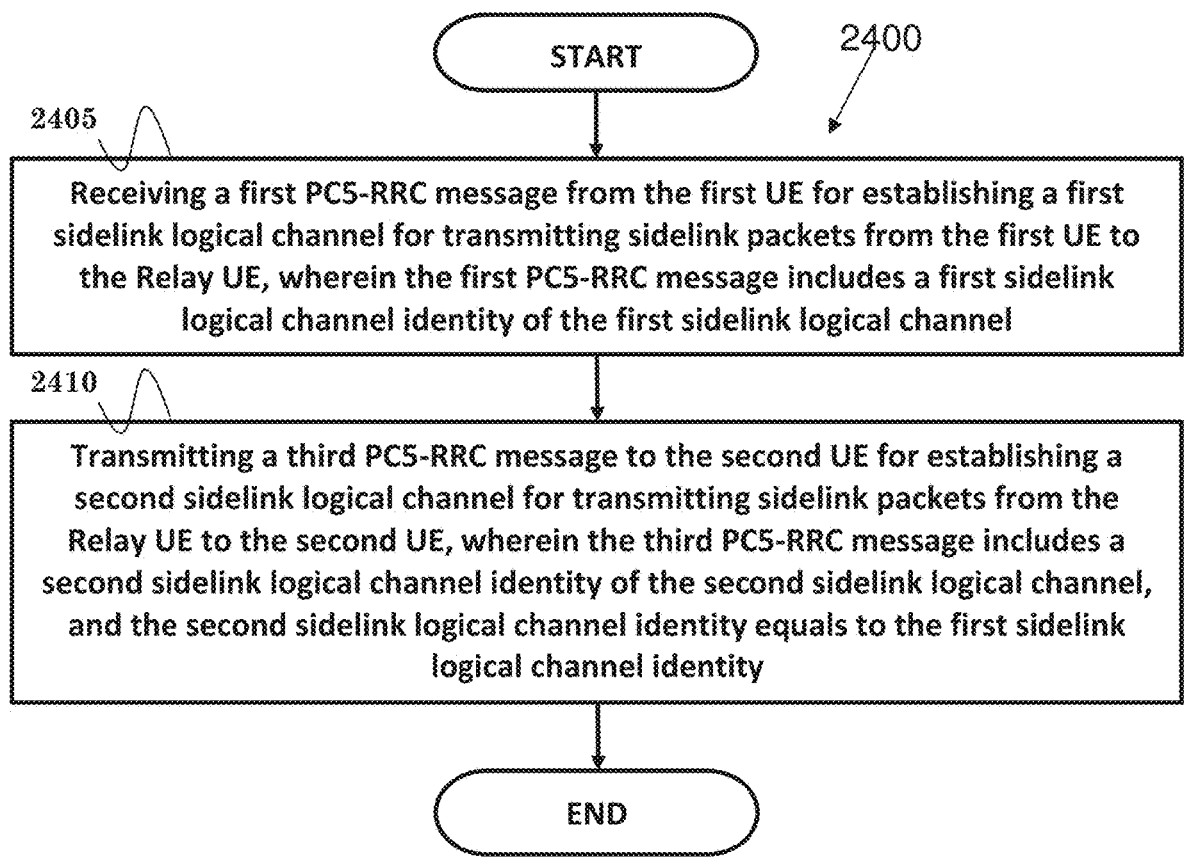
FIG. 24 is a flow chart according to one exemplary embodiment.

FIG. 24 is a flow chart 2400 according to one exemplary embodiment from the perspective of a Relay UE for establishing one or more sidelink logical channels for forwarding sidelink packets from a first UE to a second UE. In step 2405, the Relay UE receives a first PC5-RRC message from the first UE for establishing a first sidelink logical channel for transmitting sidelink packets from the first UE to the Relay UE, wherein the first PC5-RRC message includes a first sidelink logical channel identity of the first sidelink logical channel. In step 2410, the Relay UE transmits a third PC5-RRC message to the second UE for establishing a second sidelink logical channel for transmitting sidelink packets from the Relay UE to the second UE, wherein the third PC5-RRC message includes a second sidelink logical channel identity of the second sidelink logical channel, and the second sidelink logical channel identity equals to the first sidelink logical channel identity.

Referring back to FIGS. 3 and 4, in one exemplary embodiment of a Relay UE for establishing one or more sidelink logical channels for forwarding sidelink packets from a first UE to a second UE. The Relay UE 300 includes a program code 312 stored in the memory 310. The CPU 308 could execute program code 312 to enable the Relay UE (i) to receive a first PC5-RRC message from the first UE for establishing a first sidelink logical channel for transmitting sidelink packets from the first UE to the Relay UE, wherein the first PC5-RRC message includes a first sidelink logical channel identity of the first sidelink logical channel, and (ii) to transmit a third PC5-RRC message to the second UE for establishing a second sidelink logical channel for transmitting sidelink packets from the Relay UE to the second UE, wherein the third PC5-RRC message includes a second sidelink logical channel identity of the second sidelink logical channel, and the second sidelink logical channel identity equals to the first sidelink logical channel identity. Furthermore, the CPU 308 can execute the program code 312 to perform all of the above-described actions and steps or others described herein.

In the context of the embodiments illustrated in FIGS. 23 and 24 and described above, in one embodiment, the Relay UE could transmit a second PC5-RRC message to the first UE, wherein the second PC5-RRC message is used to confirm that the Relay UE complies with the first PC5-RRC message. Furthermore, the Relay UE could receive a fourth PC5-RRC message from the second UE, wherein the fourth PC5-RRC message is used to confirm that the second UE complies with the third PC5-RRC message.

In one embodiment, the first PC5-RRC message may include a first SLRB configuration of the first sidelink logical channel. The third PC5-RRC message may include a second SLRB configuration of the second sidelink logical channel.

In one embodiment, the first PC5-RRC message may include a sl-LogicalChannelIdentity of the first sidelink logical channel set to a value. The third PC5-RRC message may include a sl-LogicalChannelIdentity of the second sidelink logical channel set to the value.

In one embodiment, the first PC5-RRC message could be received before the third PC5-RRC message is sent. The first sidelink logical channel and the second sidelink logical channel could use the same sidelink logical channel identity. The first or third PC5-RRC message could be RRCReconfigurationSidelink. The second or fourth PC5-RRC message could be RRCReconfigurationCompleteSidelink.

In one embodiment, the Relay UE could receive the sidelink packets on the first sidelink logical channel from the first UE, and could then forward them to the second UE via the second sidelink logical channel.

According to 3GPP TS 38.331, a UE transmits a PC5 RRC Reconfiguration message (e.g. RRCReconfigurationSidelink) to a peer UE for configuring one or more sidelink DRBs if the UE has sidelink packets to be transmitted to the peer UE. Each SL DRB is terminated at UE1 and UE2. More specifically, each of these sidelink DRBs (established by the UE) is associated with one sidelink logical channel, and this logical channel uses one sidelink logical channel identity which is assigned by the UE. For UE-to-UE Relay communication, each sidelink packet transmitted from UE1 to UE2 via a Relay UE will be protected by security context established between UE1 and UE2. When ciphering these sidelink packets to be transmitted to UE2 via the Relay UE, UE1 could require some other information in addition to a security key in the security context.

For example, the other information could include sidelink logical channel identity (associated with one sidelink radio bearer used for transmission of these sidelink packets) according to 3GPP TS 38.323. Similarly, UE2 also requires this information to decipher these received sidelink packets. According to 3GPP TR 38.836, adaptation layer at $1^{st}$ hop and $2^{nd}$ hop will be supported for UE-to-UE Relay communication. If more than one SL DRBs are mapped to single $1^{st}$ hop SL RLC channel, the $1^{st}$ hop adaptation layer in UE1 will be responsible to delivering packets from a SL DRB to a particular $1^{st}$ hop SL RLC channel when sending these packets from UE1 to UE2 via Relay UE. Accordingly, UE2 will receive these packets from Relay UE, and the $2^{nd}$ hop adaptation layer in UE2 will be responsible to delivering the received packets from a $2^{nd}$ hop SL RLC channel to a particular SL DRB.

Since these sidelink packets are transmitted from UE1 to the Relay UE on a $1^{st}$ hop SL RLC channel and then transmitted from the Relay UE to UE2 on a 2nd hop SL RLC channel, UE1 may cipher the sidelink packets with the sidelink logical channel identity (LCID) of the $1^{st}$ hop SL RLC channel while UE2 may decipher the received sidelink packets with the LCID of the $2^{nd}$ hop SL RLC channel. It is possible that the LCID of the $1^{st}$ hop SL RLC channel may be different from the LCID of the $2^{nd}$ hop SL RLC channel. In this situation, the deciphered result would be wrong. Ways to solve this issue should be considered.

In one alternative, UE1 may use an identity of this SL DRB (i.e. a Radio Bearer (RB) Identity (ID)), instead of the LCID, to cipher the sidelink packets and UE2 also use the same RB ID to decipher the received sidelink packets. In this alternative, the SL DRB at UE1 could be associated with the identity of the SL DRB (for purpose of ciphering on the SL DRB) and is mapped to the $1^{st}$ hop SL RLC channel. In one embodiment, the RB ID may be included in the header of an adaptation layer PDU so that UE2 can know the RB ID associated with the received sidelink packet when receiving from Relay UE an adaptation layer PDU which includes the received sidelink packet, wherein the adaptation layer PDU includes at least the header and the sidelink packet.

More specifically, the identity of the SL DRB for ciphering or deciphering on the SL DRB could be assigned by UE1 or a base station (e.g. gNB) serving UE1. It could also be feasible to use an index of sidelink DRB configuration of the SL DRB (e.g. SLRB-Uu-ConfigIndex or SLRB-PC5-ConfigIndex) to replace the RB ID for ciphering or deciphering as described above. And, the index of sidelink DRB configuration could be included in the header of an adaptation layer PDU.

Alternatively, the sidelink channel or bearer identity used for ciphering on a SL DRB mapped to a $1^{st}$ hop SL RLC channel could be an identity of a $2^{nd}$ hop SL RLC channel (i.e. a LCID of the $2^{nd}$ hop SL RLC channel). UE2 could decipher sidelink packets on the SL DRB mapped to the $2^{nd}$ hop SL RLC channel based on the identity of the $2^{nd}$ hop SL RLC channel. In this alternative, the LCID of the $2^{nd}$ hop SL RLC channel should be sent to UE1 by the Relay UE e.g. via a PC5 RRC message.

More specifically, the LCID of the $2^{nd}$ hop SL RLC channel could be assigned by Relay UE or a base station (e.g. gNB) serving this Relay UE. It could be also feasible to use an index of sidelink logical channel configuration used for establishing the $2^{nd}$ hop SL RLC channel for ciphering or deciphering as described above.

Alternatively, the sidelink channel or bearer identity used for ciphering on a SL DRB mapped to a $1^{st}$ hop SL RLC channel could be an identity of the $1^{st}$ hop SL RLC channel (i.e. a LCID of the $1^{st}$ SL RLC channel). UE2 could decipher sidelink packets on the SL DRB mapped to the $2^{nd}$ hop SL RLC channel based on the identity of the $1^{st}$ hop SL RLC channel. In this alternative, the LCID of the $1^{st}$ hop SL RLC channel should be sent to UE2 by the Relay UE e.g. via a PC5 RRC message.

More specifically, the LCID of the $1^{st}$ hop SL RLC channel could be assigned by UE1 or a base station (e.g. gNB) serving UE1. It could also be feasible to use an index of sidelink logical channel configuration used for establishing the $1^{st}$ hop SL RLC channel for ciphering or deciphering as described above.

More specifically, UE1 may send a first RRCReconfigurationSidelink message to the Relay UE to establish the $1^{st}$ hop SL RLC channel. The first RRCReconfigurationSidelink message sent from UE1 to the Relay UE could include the RB ID of the SL DRB and/or the LCID of the $1^{st}$ hop SL RLC channel.

More specifically, the Relay UE may send a second RRCReconfigurationSidelink message to UE2 to establish the $2^{nd}$ hop SL RLC channel. The second RRCReconfigurationSidelink message sent from the Relay UE to UE2 could include the RB ID of the SL DRB and/or the LCID of the $2^{nd}$ hop SL RLC channel. The second RRCReconfigurationSidelink message could also include the LCID of the $1^{st}$ hop SL RLC channel.

More specifically, the Relay UE may send a third RRCReconfigurationSidelink message to UE1 where the third RRCReconfigurationSidelink message could include the LCID of the $2^{nd}$ hop SL RLC channel. More specifically, the LCID of the $1^{st}$ hop SL RLC channel could be the same as or different from the LCID of the $2^{nd}$ hop SL RLC channel. Such sidelink packet could be a IP packet, a non-IP packet, a SDAP PDU, and/or a PDCP PDU.

In one embodiment, the Relay UE mentioned above could be a Layer-2 (based) relay.

Figure 25:
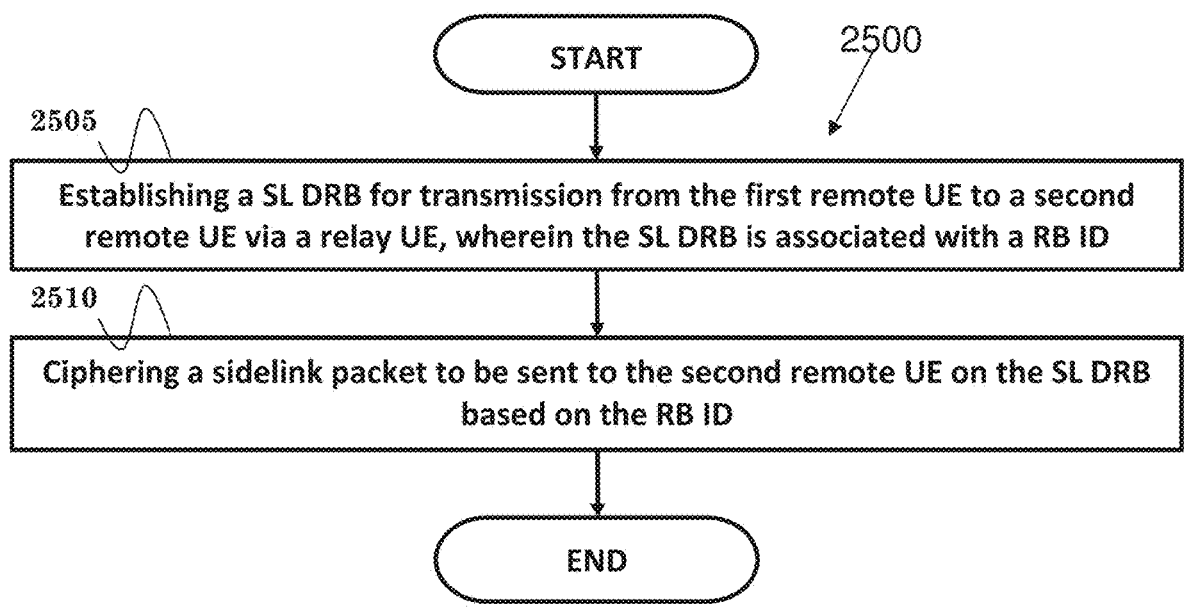
FIG. 25 is a flow chart according to one exemplary embodiment.

FIG. 25 is a flow chart 2500 according to one exemplary embodiment from the perspective of a first remote UE. In step 2505, the first remote UE establishes a SL DRB for transmission from the first remote UE to a second remote UE via a relay UE, wherein the SL DRB is associated with a RB ID. In step 2510, the first remote UE ciphers a sidelink packet to be sent to the second remote UE on the SL DRB based on the RB ID.

In one embodiment, the first remote UE could establish a first SL RLC channel for transmission from the first remote UE to the relay UE, wherein the first SL RLC channel is identified by a first LCID.

Referring back to FIGS. 3 and 4, in one exemplary embodiment of a first remote UE. The first remote UE 300 includes a program code 312 stored in the memory 310. The CPU 308 could execute program code 312 to enable the first remote UE (i) to establish a SL DRB for transmission from the first remote UE to a second remote UE via a relay UE, wherein the SL DRB is associated with a RB ID, and (ii) to cipher a sidelink packet to be sent to the second remote UE on the SL DRB based on the RB ID. Furthermore, the CPU 308 can execute the program code 312 to perform all of the above-described actions and steps or others described herein.

Figure 26:
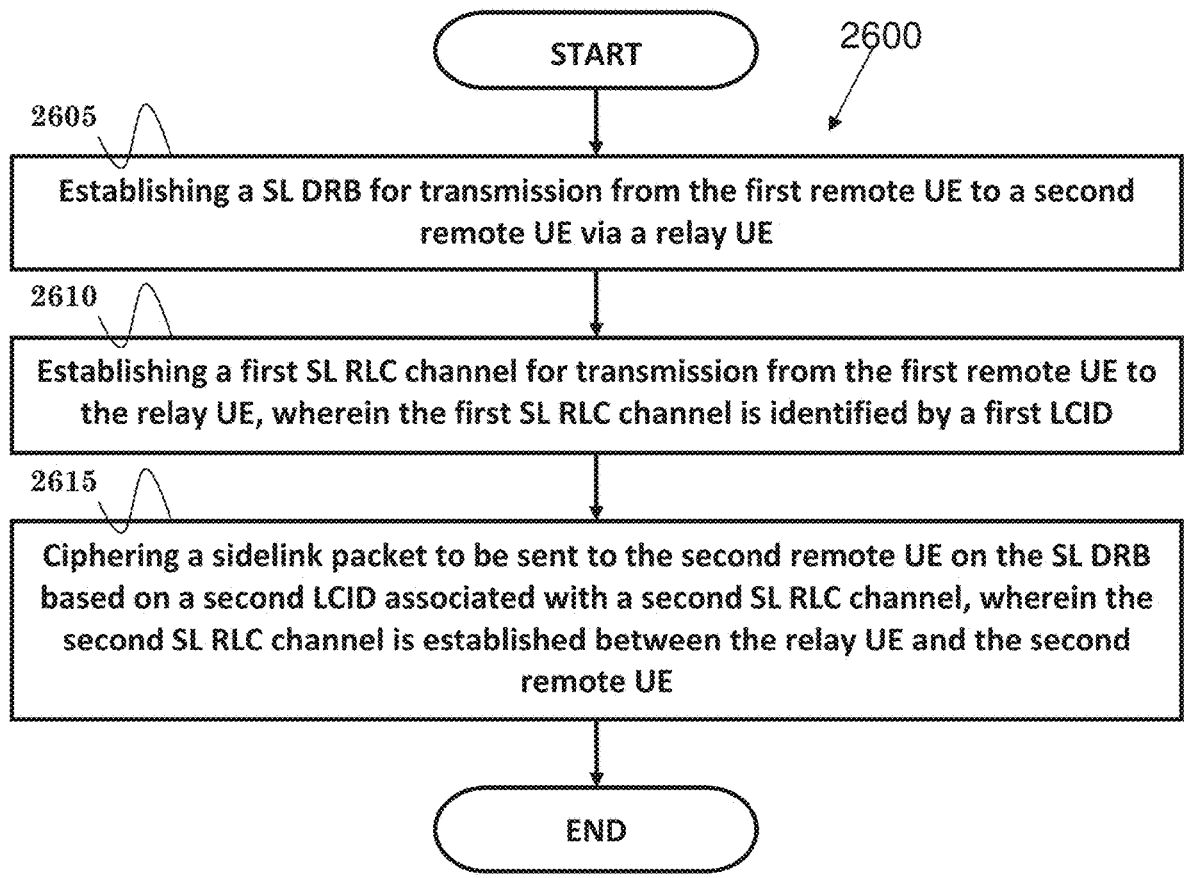
FIG. 26 is a flow chart according to one exemplary embodiment.

FIG. 26 is a flow chart 2600 according to one exemplary embodiment from the perspective of a first remote UE. In step 2605, the first remote UE establishes a SL DRB for transmission from the first remote UE to a second remote UE via a relay UE. In step 2610, the first remote UE establishes a first SL RLC channel for transmission from the first remote UE to the relay UE, wherein the first SL RLC channel is identified by a first LCID. In step 2615, the first remote UE ciphers a sidelink packet to be sent to the second remote UE on the SL DRB based on a second LCID associated with a second SL RLC channel, wherein the second SL RLC channel is established between the relay UE and the second remote UE.

Referring back to FIGS. 3 and 4, in one exemplary embodiment of a first remote UE. The first remote UE 300 includes a program code 312 stored in the memory 310. The CPU 308 could execute program code 312 to enable the first remote UE (i) to establish a SL DRB for transmission from the first remote UE to a second remote UE via a relay UE, (ii) to establish a first SL RLC channel for transmission from the first remote UE to the relay UE, wherein the first SL RLC channel is identified by a first LCID, and (iii) to cipher a sidelink packet to be sent to the second remote UE on the SL DRB based on a second LCID associated with a second SL RLC channel, wherein the second SL RLC channel is established between the relay UE and the second remote UE. Furthermore, the CPU 308 can execute the program code 312 to perform all of the above-described actions and steps or others described herein.

In the context of the embodiments illustrated in FIGS. 25 and 26 and described above, in one embodiment, the first remote UE could deliver the sidelink packet from the SL DRB to the first SL RLC channel based on a mapping of the RB ID and the first LCID. The SL DRB could be mapped to the first SL RLC channel. The sidelink packet could be sent on the first SL RLC channel from the first remote UE to the relay UE, and then forwarded from the relay UE to the second remote UE on the second SL RLC channel. The RB ID could be included in a header of an adaptation layer PDU.

In one embodiment, the header and the sidelink packet could be included in the adaptation layer PDU. The relay UE could be a Layer-2 (based) relay.

Figure 27:
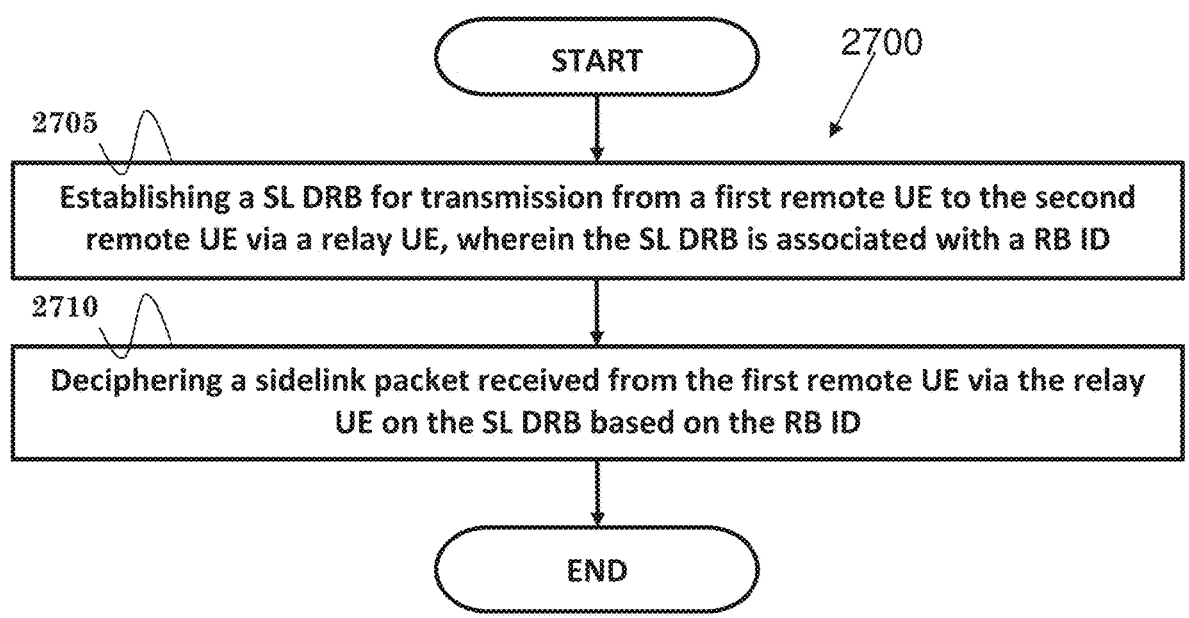
FIG. 27 is a flow chart according to one exemplary embodiment.

FIG. 27 is a flow chart 2700 according to one exemplary embodiment from the perspective of a second remote UE. In step 2705, the second remote UE establishes a SL DRB for transmission from a first remote UE to the second remote UE via a relay UE, wherein the SL DRB is associated with a RB ID. In step 2710, the second remote UE deciphers a sidelink packet received from the first remote UE via the relay UE on the SL DRB based on the RB ID.

In one embodiment, the second remote UE could establish a second SL RLC channel for reception from the relay UE, wherein the second SL RLC channel is identified by a second LCID.

Referring back to FIGS. 3 and 4, in one exemplary embodiment of a second remote UE. The second remote UE 300 includes a program code 312 stored in the memory 310. The CPU 308 could execute program code 312 to enable the second remote UE (i) to establish a SL DRB for transmission from a first remote UE to the second remote UE via a relay UE, wherein the SL DRB is associated with a RB ID, and (ii) to decipher a sidelink packet received from the first remote UE via the relay UE on the SL DRB based on the RB ID. Furthermore, the CPU 308 can execute the program code 312 to perform all of the above-described actions and steps or others described herein.

Figure 28:
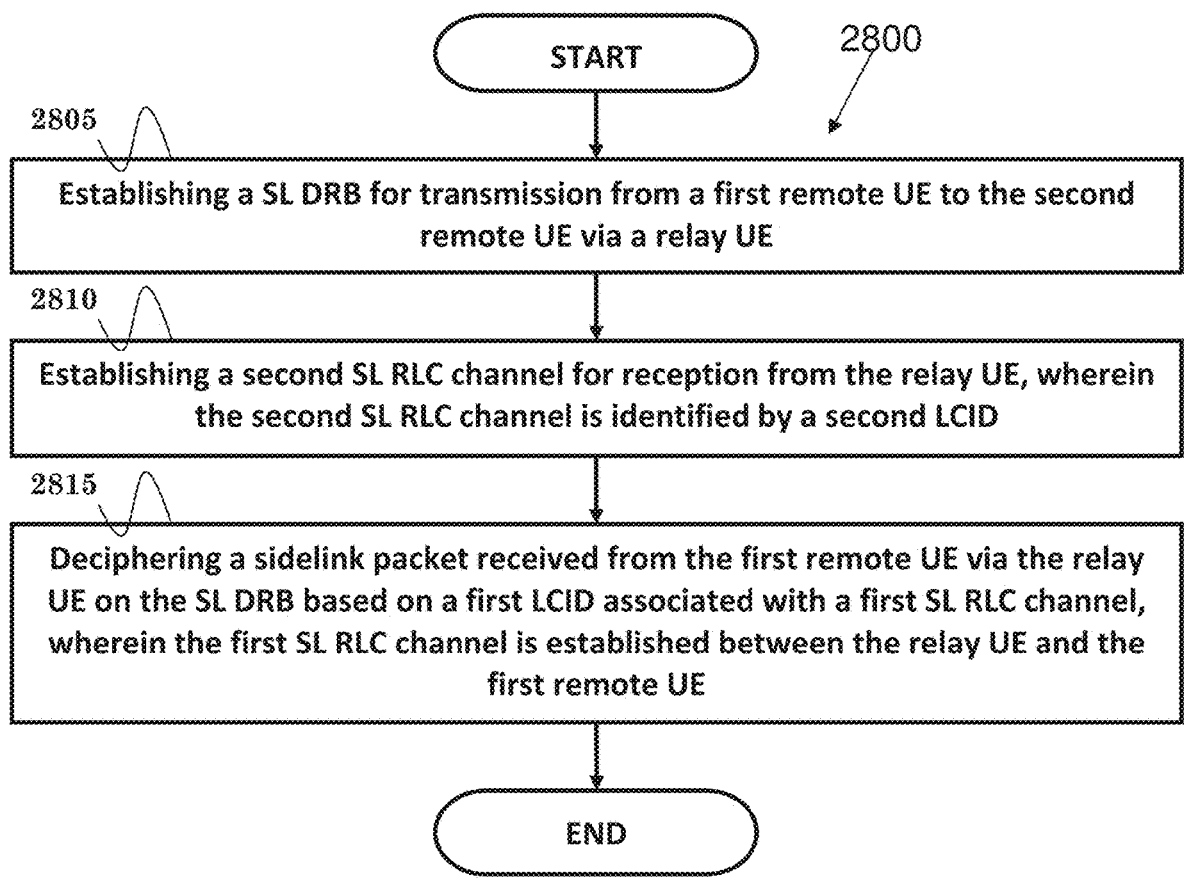
FIG. 28 is a flow chart according to one exemplary embodiment.

FIG. 28 is a flow chart 2800 according to one exemplary embodiment from the perspective of a second remote UE. In step 2805, the second remote UE establishes a SL DRB for transmission from a first remote UE to the second remote UE via a relay UE. In step 2810, the second remote UE establishes a second SL RLC channel for reception from the relay UE, wherein the second SL RLC channel is identified by a second LCID. In step 2815, the second remote UE deciphers a sidelink packet received from the first remote UE via the relay UE on the SL DRB based on a first LCID associated with a first SL RLC channel, wherein the first SL RLC channel is established between the relay UE and the first remote UE.

Referring back to FIGS. 3 and 4, in one exemplary embodiment of a second remote UE. The second remote UE 300 includes a program code 312 stored in the memory 310. The CPU 308 could execute program code 312 to enable the second remote UE (i) to establish a SL DRB for transmission from a first remote UE to the second remote UE via a relay UE, (ii) to establish a second SL RLC channel for reception from the relay UE, wherein the second SL RLC channel is identified by a second LCID, and (iii) to decipher a sidelink packet received from the first remote UE via the relay UE on the SL DRB based on a first LCID associated with a first SL RLC channel, wherein the first SL RLC channel is established between the relay UE and the first remote UE. Furthermore, the CPU 308 can execute the program code 312 to perform all of the above-described actions and steps or others described herein.

In the context of the embodiments illustrated in FIGS. 27 and 28 and described above, in one embodiment, the sidelink packet could be sent on the first SL RLC channel from the first remote UE to the relay UE, and then could be forwarded from the relay UE to the second remote UE on the second SL RLC channel. The RB ID could be included in a header of an adaptation layer PDU. The header and the sidelink packet could be included in the adaptation layer PDU. The relay UE could be a Layer-2 (based) relay.

Figure 29:
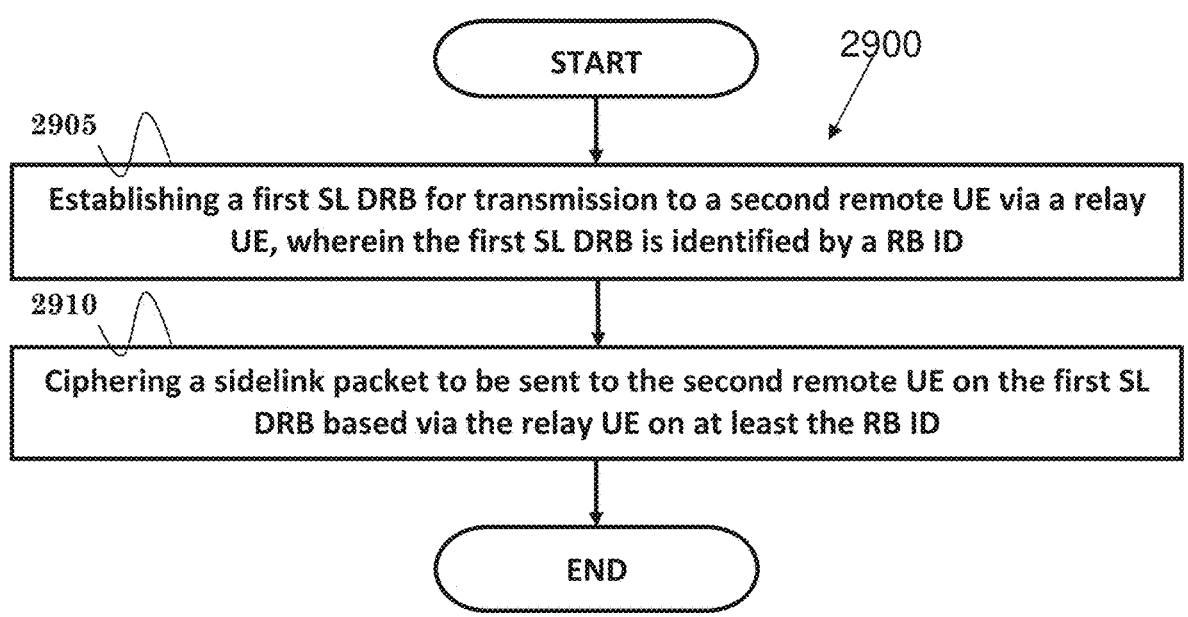
FIG. 29 is a flow chart according to one exemplary embodiment.

FIG. 29 is a flow chart 2900 according to one exemplary embodiment from the perspective of a first remote UE. In step 2905, the first remote UE establishes a first SL DRB for transmission to a second remote UE via a relay UE, wherein the first SL DRB is identified by a RB ID. In step 2910, the first remote UE ciphers a sidelink packet to be sent to the second remote UE via the relay UE on the first SL DRB based on at least the RB ID.

In one embodiment, the first remote UE could establish a first SL RLC channel for transmission to the relay UE, wherein the first SL RLC channel is identified by a first LCID and the SL DRB is mapped to the first SL RLC channel.

In one embodiment, the RB ID could be included in a header of an adaptation layer PDU. The header and the sidelink packet could be included in the adaptation layer PDU.

In one embodiment, the first remote UE could establish a second SL DRB for direct transmission to a third UE, wherein the second SL DRB is mapped to a second SL RLC channel and the second SL RLC channel is identified by a second LCID. The first remote UE could also cipher a sidelink packet to be sent to the third UE on the second SL DRB based on at least the second LCID.

Referring back to FIGS. 3 and 4, in one exemplary embodiment of a first remote UE. The first remote UE 300 includes a program code 312 stored in the memory 310. The CPU 308 could execute program code 312 to enable the first remote UE (i) to establish a first SL DRB for transmission to a second remote UE via a relay UE, wherein the first SL DRB is identified by a RB ID, and (ii) to cipher a sidelink packet to be sent to the second remote UE via the relay UE on the first SL DRB based on at least the RB ID. Furthermore, the CPU 308 can execute the program code 312 to perform all of the above-described actions and steps or others described herein.

Figure 30:
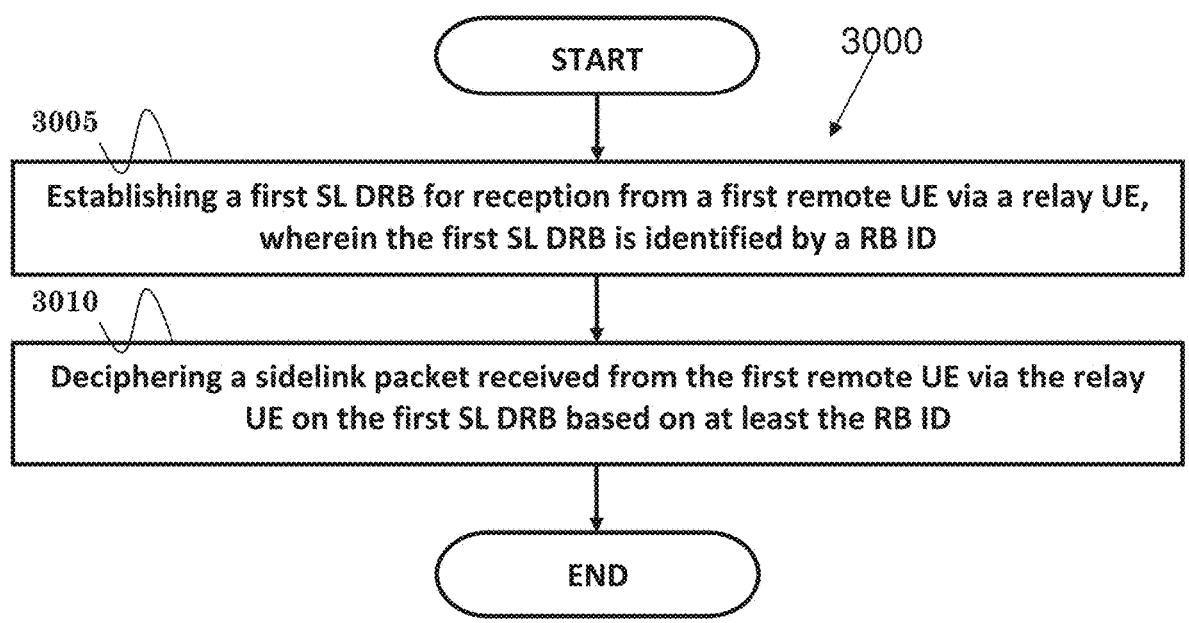
FIG. 30 is a flow chart according to one exemplary embodiment.

FIG. 30 is a flow chart 3000 according to one exemplary embodiment from the perspective of a second remote UE. In step 3005, the second remote UE establishes a first SL DRB for reception from a first remote UE via a relay UE, wherein the first SL DRB is identified by a RB ID. In step 3010, the second remote UE deciphers a sidelink packet received from the first remote UE via the relay UE on the first SL DRB based on at least the RB ID.

In one embodiment, the second remote UE could establish a first SL RLC channel for reception from the relay UE, wherein the first SL RLC channel is identified by a first LCID and the first SL DRB is mapped to the first SL RLC channel.

In one embodiment, the RB ID could be included in a header of an adaptation layer PDU. The header and the sidelink packet could be included in the adaptation layer PDU.

In one embodiment, the second remote UE could establish a second SL DRB for direct reception from a third UE, wherein the second SL DRB is mapped to a second SL RLC channel and the second SL RLC channel is identified by a second LCID. The second remote UE could also decipher a sidelink packet received from the third UE on the second SL DRB based on at least the second LCID.

Referring back to FIGS. 3 and 4, in one exemplary embodiment of a second remote UE. The second remote UE 300 includes a program code 312 stored in the memory 310. The CPU 308 could execute program code 312 to enable the second remote UE (i) to establish a first SL DRB for reception from a first remote UE via a relay UE, wherein the first SL DRB is identified by a RB ID, and (ii) to decipher a sidelink packet received from the first remote UE via the relay UE on the first SL DRB based on at least the RB ID. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE), comprising:
    establishing a Sidelink (SL) Data Radio Bearer (DRB) for transmission to a second UE directly or via a relay UE, wherein a configuration of the SL DRB is identified by a configuration index, and the SL DRB is mapped to a SL Radio Link Control (RLC) channel established between the first UE and the second UE or between the first UE and the relay UE, and wherein the SL RLC channel is identified by a logical channel identity (LCID);
    ciphering, using at least the LCID as input to ciphering algorithm, a sidelink packet to be sent to the second UE on the SL DRB if the SL DRB is established for transmission to the second UE directly; and
    ciphering, using at least the configuration index as input to ciphering algorithm, the sidelink packet to be sent to the second UE on the SL DRB if the SL DRB is established for transmission to the second UE via the relay UE.

2. The method of claim 1, wherein the configuration index is included in a header of an adaptation layer Protocol Data Unit (PDU).

3. The method of claim 2, wherein the header and the sidelink packet are included in the adaptation layer PDU.

4. A method for a second User Equipment (UE), comprising:

establishing a Sidelink (SL) Data Radio Bearer (DRB) for reception from a first UE directly or via a relay UE, wherein a configuration of the SL DRB is identified by a configuration index, and the SL DRB is mapped to a SL Radio Link Control (RLC) channel established between the first UE and the second UE or between the second UE and the relay UE, and wherein the SL RLC channel is identified by a logical channel identity (LCID);

deciphering, using at least the LCID as input to deciphering algorithm, a sidelink packet received from the first UE on the SL DRB if the SL DRB is established for reception from the first UE directly; and deciphering, using at least the configuration index as input to deciphering algorithm, the sidelink packet received from the first UE on the SL DRB if the SL DRB is established for reception from the first UE via the relay UE.

5. The method of claim 4, wherein the configuration index is included in a header of an adaptation layer Protocol Data Unit (PDU).

6. The method of claim 5, wherein the header and the sidelink packet are included in the adaptation layer PDU.

7. A first UE (User Equipment), comprising:

a processor; and a memory operatively coupled to the processor, wherein the processor is configured to execute a program code to: establish a Sidelink (SL) Data Radio Bearer (DRB) for transmission to a second UE directly or via a relay UE, wherein a configuration of the SL DRB is identified by a configuration index, and the SL DRB is mapped to a SL Radio Link Control (RLC) channel established between the first UE and the second UE or between the first UE and the relay UE, and wherein the SL RLC channel is identified by a logical channel identity (LCID);

cipher, using at least the LCID as input to ciphering algorithm, a sidelink packet to be sent to the second UE via the relay UE on the SL DRB if the SL DRB is established for transmission to the second UE directly; and cipher, using at least the configuration index as input to ciphering algorithm, the sidelink packet to be sent to the second UE on the SL DRB if the SL DRB is established for transmission to the second UE via the relay UE.

8. The first UE of claim 7, wherein the configuration index is included in a header of an adaptation layer Protocol Data Unit (PDU).

9. The first UE of claim 8, wherein the header and the sidelink packet are included in the adaptation layer PDU.

* * * * *